United States Patent
Ebrahimi Afrouzi et al.

(10) Patent No.: US 11,037,320 B1
(45) Date of Patent: Jun. 15, 2021

(54) METHOD FOR ESTIMATING DISTANCE USING POINT MEASUREMENT AND COLOR DEPTH

(71) Applicants: Ali Ebrahimi Afrouzi, San Diego, CA (US); Soroush Mehrnia, Soeborg (DK)

(72) Inventors: Ali Ebrahimi Afrouzi, San Diego, CA (US); Soroush Mehrnia, Soeborg (DK)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/932,495

(22) Filed: Jul. 17, 2020

Related U.S. Application Data

(63) Continuation-in-part of application No. 16/393,921, filed on Apr. 24, 2019, now Pat. No. 10,755,430, which is a continuation of application No. 15/447,122, filed on Mar. 2, 2017, now Pat. No. 10,311,590.

(60) Provisional application No. 63/037,465, filed on Jun. 10, 2020, provisional application No. 62/986,946, filed on Mar. 9, 2020, provisional application No. 62/952,384, filed on Dec. 22, 2019, provisional application No. 62/952,376, filed on Dec. 22, 2019, provisional application No. 62/942,237, filed on Dec. 2, 2019, provisional application No. 62/933,882, filed on Nov. 11, 2019, provisional application No. 62/914,190, filed on Oct. 11, 2019, provisional application No. 62/302,095, filed on Mar. 1, 2016.

(51) Int. Cl.
| | |
|---|---|
| *H04N 7/18* | (2006.01) |
| *G06T 7/60* | (2017.01) |
| *G01C 3/08* | (2006.01) |
| *G06T 7/521* | (2017.01) |
| *G06T 7/90* | (2017.01) |

(52) U.S. Cl.
CPC ............... *G06T 7/60* (2013.01); *G01C 3/08* (2013.01); *G06T 7/521* (2017.01); *G06T 7/90* (2017.01); *H04N 7/18* (2013.01); *G06T 2207/10024* (2013.01); *G06T 2207/10028* (2013.01)

(58) Field of Classification Search
CPC .. H04N 7/18; G06T 7/60; G06T 7/521; G06T 7/90; G06T 2207/10024; G06T 2207/10028; G01C 3/08
USPC ......... 348/135; 382/106, 291, 199, 281, 153
See application file for complete search history.

(56) References Cited

U.S. PATENT DOCUMENTS

| | | |
|---|---|---|
| 5,521,695 A | 5/1996 | Cathey |
| 6,057,909 A | 5/2000 | Yahav |
| 6,308,114 B1 * | 10/2001 | Kim ........................ G01S 5/22 340/679 |
| 6,847,435 B2 | 1/2005 | Honda |
| 7,386,163 B2 | 6/2008 | Sabe |
| 7,706,573 B1 | 4/2010 | Motamedi |
| 7,865,267 B2 | 1/2011 | Sabe |

(Continued)

*Primary Examiner* — Trang U Tran

(57) ABSTRACT

A method including detecting an object in a line of sight of at least one sensor; adjusting a current path of the robot to include a detour path around the object, instructing the robot to resume along the current path after avoiding the object, discarding at least some data collected by sensors of the robot in overlapping areas covered, inferring previously visited areas and unvisited areas, generating a planar representation of a workspace of the robot by stitching data collected by at least some sensors of the robot at overlapping points, and presenting at least the planar representation and coverage statistics on an application of a communication device.

20 Claims, 9 Drawing Sheets

(56) References Cited

U.S. PATENT DOCUMENTS

| | | |
|---|---|---|
| 8,140,395 B2 | 3/2012 | Murphy |
| 8,164,628 B2 | 4/2012 | Stein |
| 8,265,425 B2 * | 9/2012 | Ng-Thow-Hing ........ G06T 7/73 382/291 |
| 8,467,578 B2 | 6/2013 | Chang |
| 8,705,792 B2 * | 4/2014 | James ..................... G06T 7/246 382/103 |
| 8,705,801 B2 | 4/2014 | Kawamura |
| 8,737,686 B2 * | 5/2014 | Yoon ....................... G06T 7/251 382/103 |
| 8,797,385 B2 * | 8/2014 | Tsuboi ................. H04N 13/254 348/46 |
| 9,429,438 B2 * | 8/2016 | Weng ................. G01C 21/3811 |
| 9,990,540 B2 * | 6/2018 | Ariizumi ............... B25J 9/1697 |
| 10,196,104 B1 * | 2/2019 | Kagami ................... B25J 13/08 |
| 2010/0118142 A1 | 1/2010 | Ohsawa |

* cited by examiner

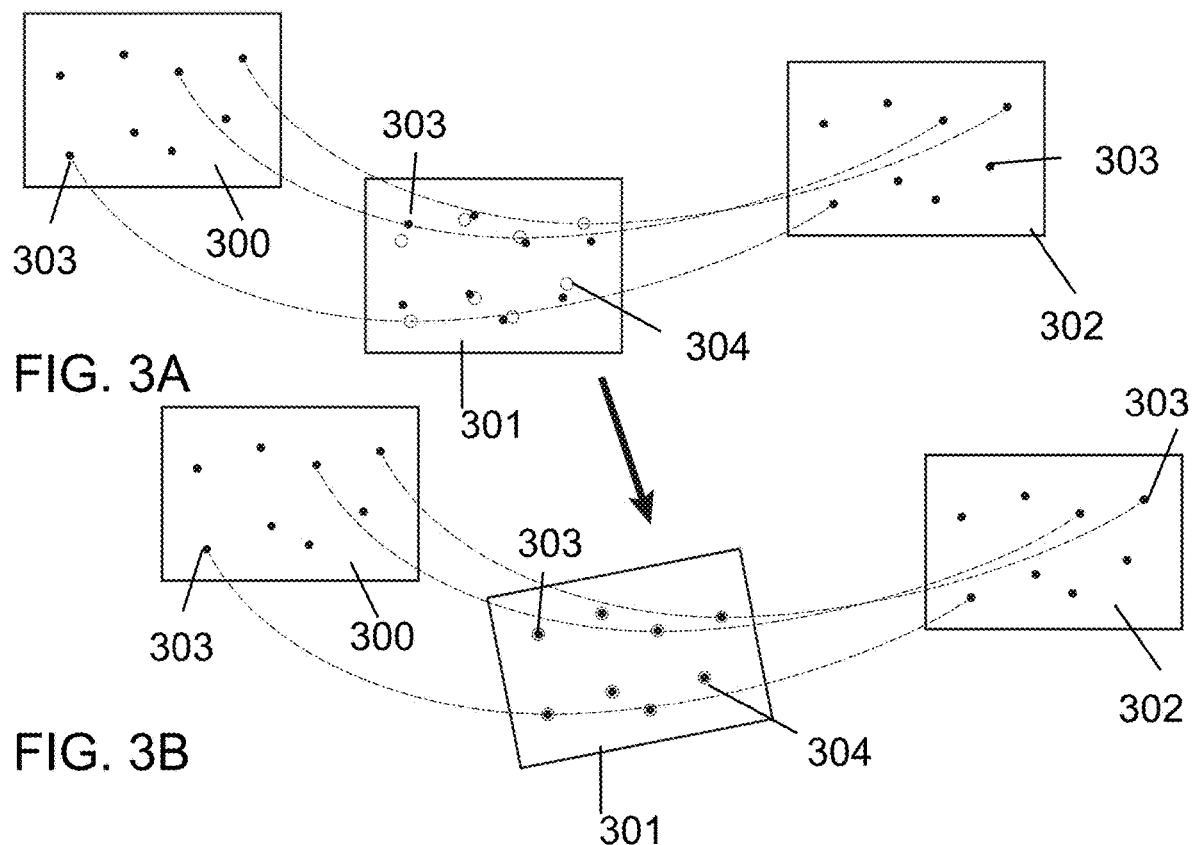
FIG. 3A
FIG. 3B
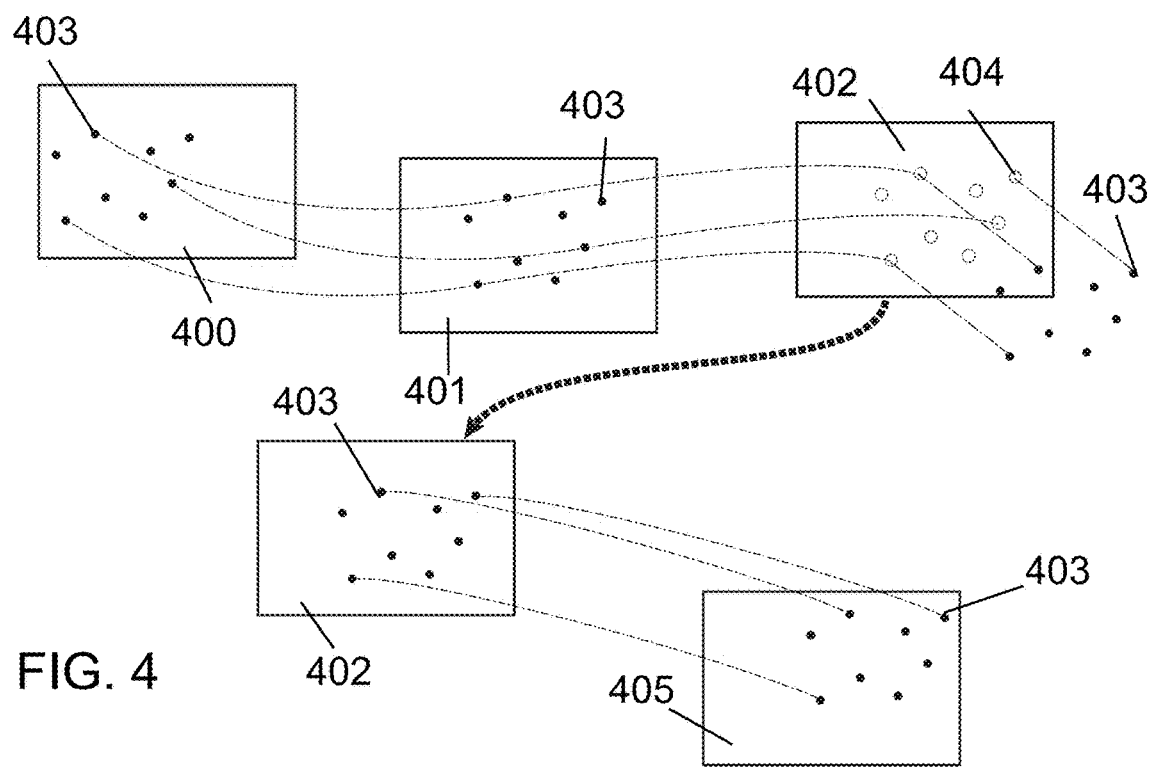
FIG. 4

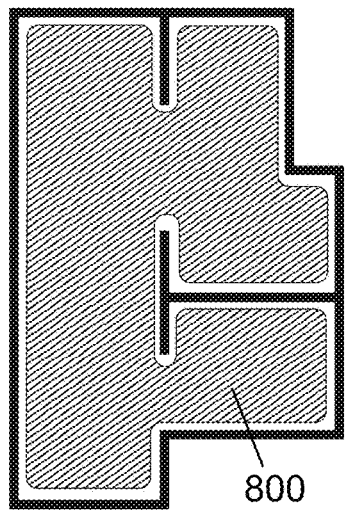
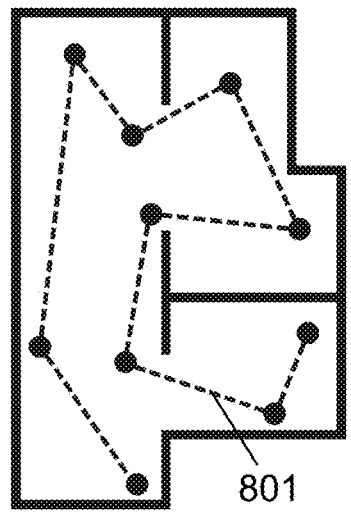
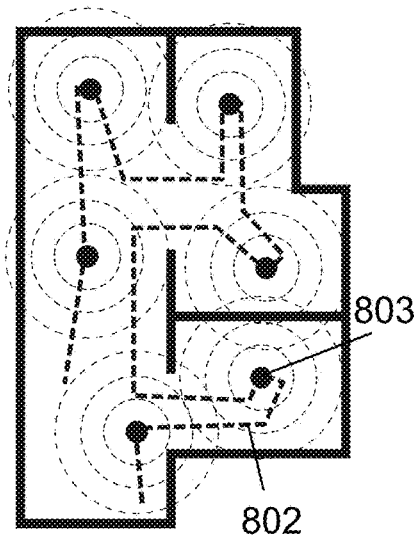
FIG. 8A    FIG. 8B    FIG. 8C
FIG. 9A    FIG. 9B
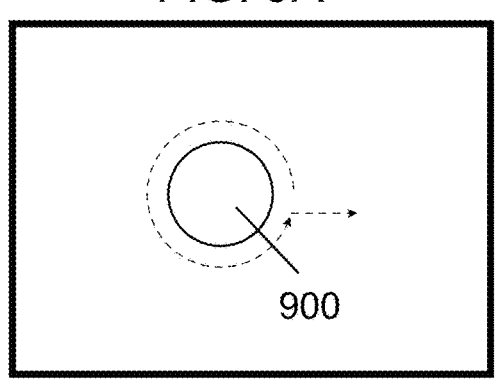
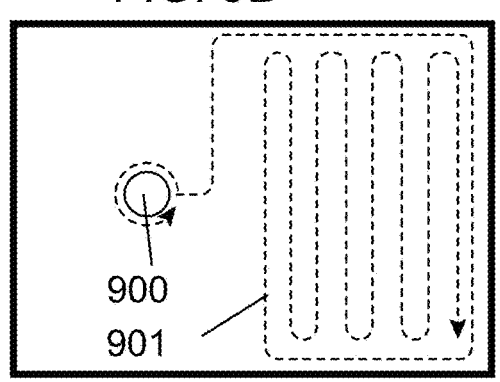
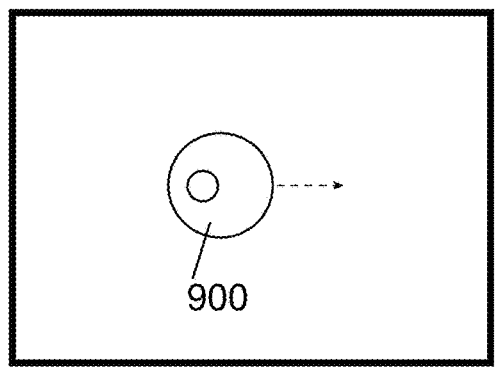
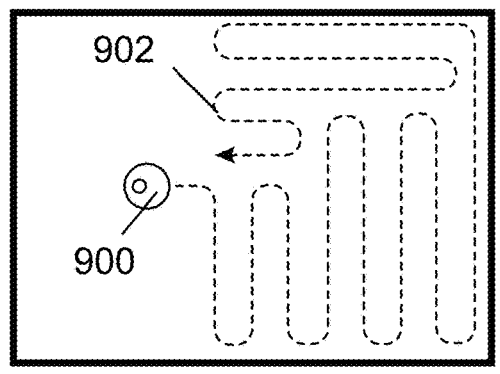
FIG. 9C    FIG. 9D

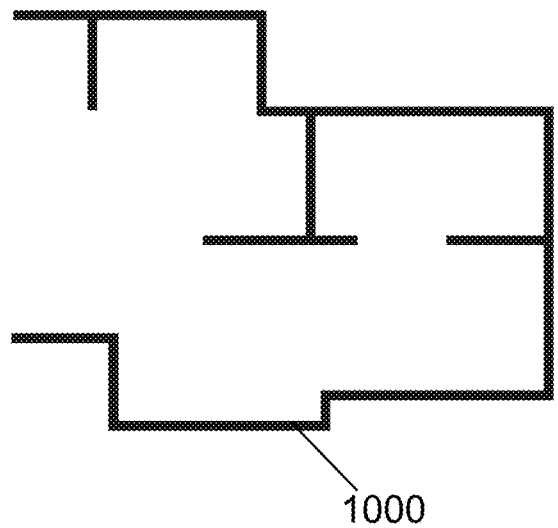
FIG. 10A
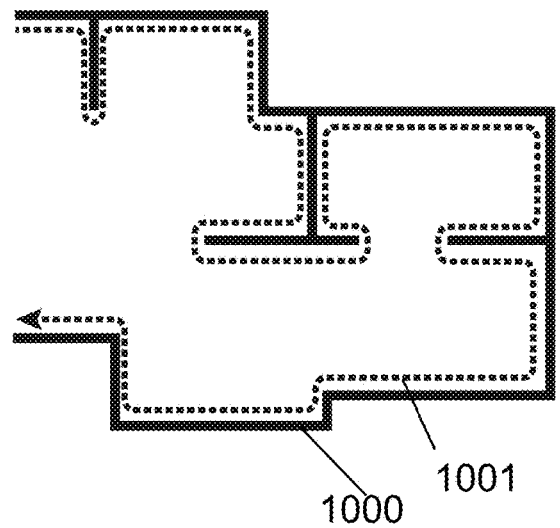
FIG. 10B
FIG. 11A
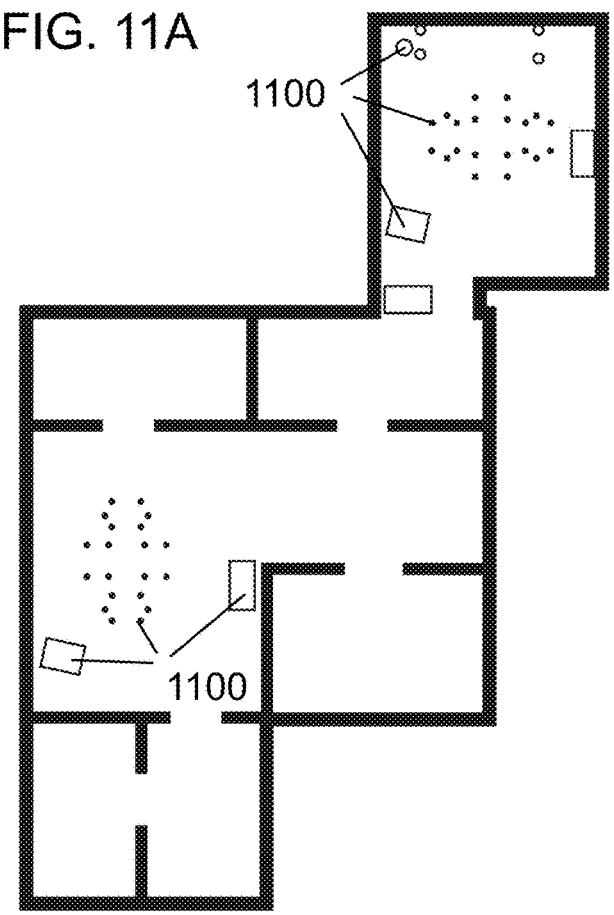
FIG. 11B
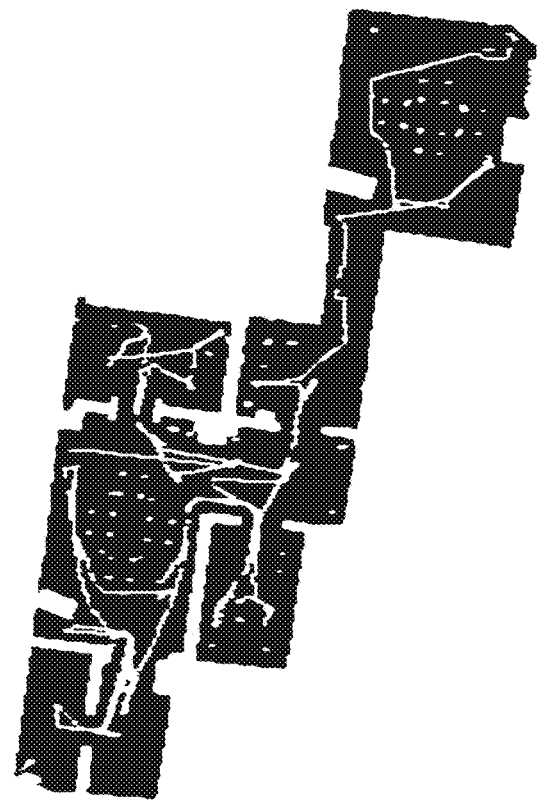

METHOD FOR ESTIMATING DISTANCE USING POINT MEASUREMENT AND COLOR DEPTH

CROSS-REFERENCE TO RELATED APPLICATIONS

This application is a Continuation in Part of U.S. patent application Ser. No. 16/393,921, filed Apr. 24, 2019, which is a Continuation of patent application Ser. No. 15/447,122, filed Mar. 2, 2017, which claims the benefit of the Provisional Patent Application No. 62/302,095, filed Mar. 1, 2016. This application claims the benefit of U.S. Provisional Patent Application Nos. 62/914,190, filed Oct. 11, 2019; 62/933,882, filed Nov. 11, 2019; 62/942,237, filed Dec. 2, 2019; 62/952,376, filed Dec. 22, 2019; 62/952,384, filed Dec. 22, 2019; 62/986,946, filed Mar. 9, 2020; and 63/037,465, filed Jun. 10, 2020, each of which is hereby incorporated herein by reference.

In this patent, certain U.S. patents, U.S. patent applications, or other materials (e.g., articles) have been incorporated by reference. Specifically, U.S. patent application Ser. Nos. 15/272,752, 15/949,708, 16/667,461, 16/277,991, 16/048,179, 16/048,185, 16/163,541, 16/851,614, 16/163,562, 16/597,945, 16/724,328, 16/163,508, 16/185,000, 16/109,617, 16/051,328, 15/449,660, 16/667,206, 16/041,286, 16/422,234, 15/406,890, 16/796,719, 14/673,633, 15/676,888, 16/558,047, 15/449,531, 16/446,574, 16/219,647, 16/163,530, 16/297,508, 16/418,988, 15/614,284, 16/554,040, 15/955,480, 15/425,130, 15/955,344, 15/243,783, 15/954,335, 15/954,410, 16/832,221, 15/257,798, 16/525,137, 15/674,310, 15/224,442, 15/683,255, 16/880,644, 15/048,827, 14/817,952, 15/619,449, 16/198,393, 16/599,169, 15/981,643, 16/747,334, 15/986,670, 16/568,367, 15/444,966, 15/447,623, 15/951,096, 16/270,489, 16/130,880, 14/948,620, 16/402,122, 16/127,038, 14/922,143, 15/878,228, 15/924,176, 16/024,263, 16/203,385, 15/647,472, 15/462,839, 16/239,410, 16/230,805, 16/411,771, 16/578,549, 16/129,757, 16/245,998, 16/127,038, 16/243,524, 16/244,833, 16/751,115, 16/353,019, 15/447,122, 16/393,921, 16/389,797, 16/509,099, 16/440,904, 15/673,176, 16/058,026, 14/970,791, 16/375,968, 15/432,722, 16/238,314, 14/941,385, 16/279,699, 16/041,470, 15/410,624, 16/504,012, 16/389,797, 15/917,096, 15/706,523, 16/241,436, 15/377,674, 16/883,327, 16/427,317, 16/850,269, 16/179,855, 15/071,069, 16/186,499, 15/976,853, 15/442,992, 16/570,242, 16/832,180, 16/399,368, 14/997,801, 16/726,471, 15/924,174, 16/212,463, 16/212,468, 14/820,505, 16/221,425, and 15/986,670, are hereby incorporated herein by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robots.

BACKGROUND

Autonomous or semi-autonomous robotic devices are increasingly used within consumer homes and commercial establishments. Such robotic devices may include a drone, a robotic vacuum cleaner, a robotic lawn mower, a robotic mop, or other robotic devices. To operate autonomously or with minimal (or less than fully manual) input and/or external control within an environment, methods such as mapping, localization, object recognition, and path planning methods, among others, are required such that robotic devices may autonomously create a map of the environment, subsequently use the map for navigation, and devise intelligent path and task plans for efficient navigation and task completion.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments include a method for coverage by a robot, including: detecting, with a plurality of sensors of the robot, an object in a line of sight of at least one of the plurality of sensors; adjusting, with a processor of the robot, a current path of the robot to include a detour path around the object, wherein: the current path includes at least one segment parallel to a wall; each of the at least one segment parallel to the wall is positioned a predetermined distance from the wall; each of the at least one segment parallel to the wall is positioned such that areas covered by the robot when driving along two adjacent segments parallel to the wall partially overlap; instructing, with the processor of the robot, the robot to resume along the current path after avoiding the object; discarding, with the processor of the robot, at least some data collected by sensors of the robot in overlapping areas covered; inferring, with the processor of the robot, previously visited areas and unvisited areas; generating, with the processor of the robot, a planar representation of a workspace of the robot by stitching data collected by at least some sensors of the robot at overlapping points; and presenting, with an application of a communication device, at least the planar representation and coverage statistics.

Some embodiments provide a robot implementing the above described method.

BRIEF DESCRIPTION OF DRAWINGS

FIGS. 3A, 3B, and 4 illustrate examples of images captured by a sensor of the robot during navigation of the robot, according to some embodiments.

FIGS. 8A-8C illustrate examples of coverage functionalities of a robot, according to some embodiments.

FIGS. 9A-9D illustrate examples of coverage by a robot, according to some embodiments.

FIGS. 10A, 10B, 11A, and 11B illustrate examples of spatial representations of an environment, according to some embodiments.

DETAILED DESCRIPTION OF SOME EMBODIMENTS

Figure 1:
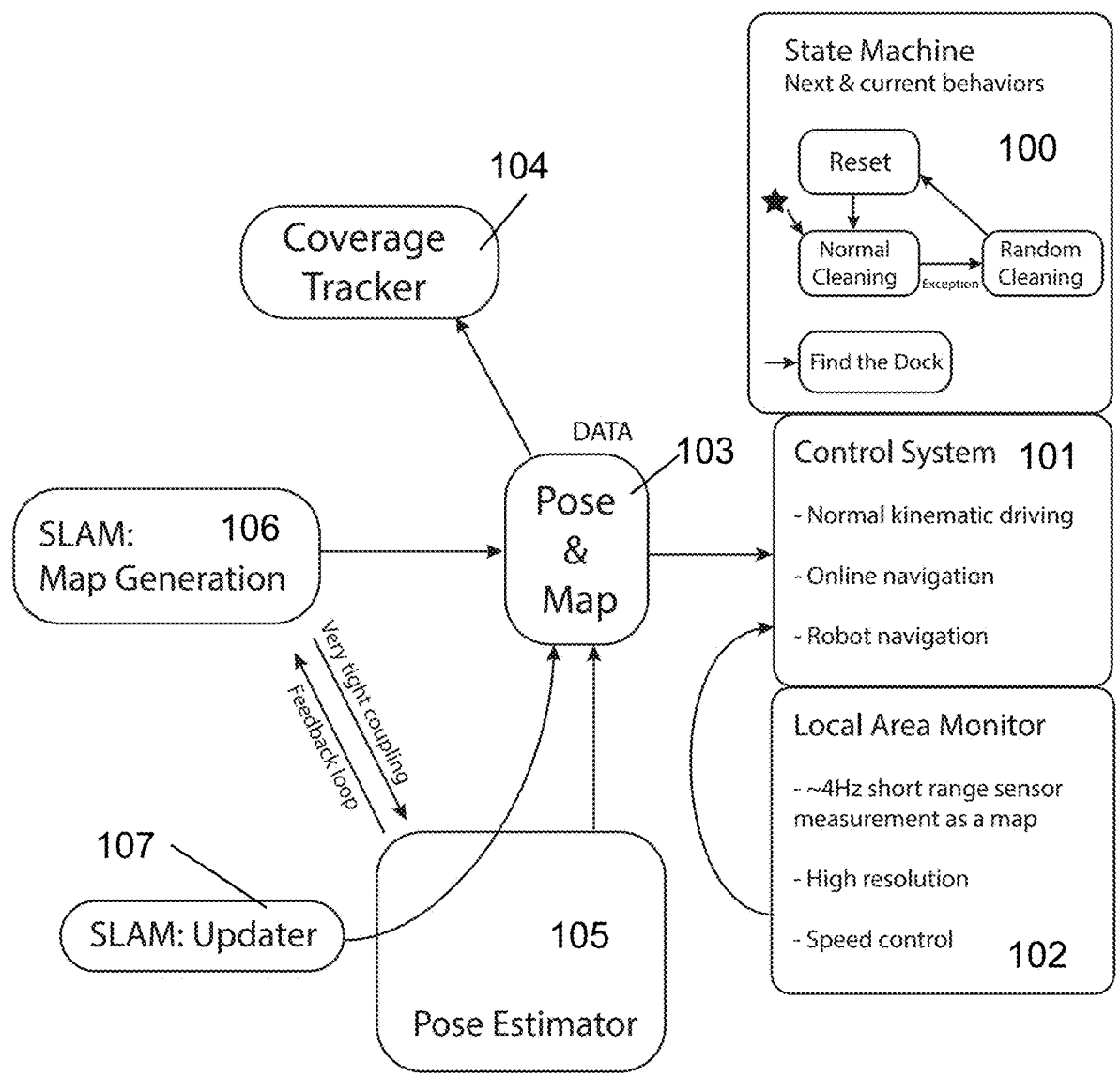
FIG. 1 illustrates an example of a visualization of a Light Weight Real Time SLAM Navigational Stack algorithm, according to some embodiments.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments may provide an autonomous or semi-autonomous robot including communication, mobility, actuation, and processing elements. In some embodiments, the robot may be wheeled (e.g., rigidly fixed, suspended fixed, steerable, suspended steerable, caster, or suspended caster), legged, or tank tracked. In some embodiments, the wheels, legs, tracks, etc. of the robot may be controlled individually or controlled in pairs (e.g., like cars) or in groups of other sizes, such as three or four as in omnidirectional wheels. In some embodiments, the robot may use differential-drive wherein two fixed wheels have a common axis of rotation and angular velocities of the two wheels are equal and opposite such that the robot may rotate on the spot. In some embodiments, the robot may include a terminal device such as those on computers, mobile phones, tablets, or smart wearable devices. In some embodiments, the robot may include one or more of a casing, a chassis including a set of wheels, a motor to drive the wheels, a receiver that acquires signals transmitted from, for example, a transmitting beacon, a transmitter for transmitting signals, a processor, a memory storing instructions that when executed by the processor effectuates robotic operations, a controller, a plurality of sensors (e.g., tactile sensor, obstacle sensor, temperature sensor, imaging sensor, light detection and ranging (LIDAR) sensor, camera, depth sensor, time-of-flight (TOF) sensor, TSSP sensor, optical tracking sensor, sonar sensor, ultrasound sensor, laser sensor, light emitting diode (LED) sensor, etc.), network or wireless communications, radio frequency (RF) communications, power management such as a rechargeable battery, solar panels, or fuel, and one or more clock or synchronizing devices. In some embodiments, the robot may include sensors to detect or sense acceleration, angular and linear movement, motion, static and dynamic obstacles, temperature, humidity, water, pollution, particles in the air, supplied power, proximity, external motion, device motion, sound signals, ultrasound signals, light signals, fire, smoke, carbon monoxide, global-positioning-satellite (GPS) signals, radio-frequency (RF) signals, other electromagnetic signals or fields, visual features, textures, optical character recognition (OCR) signals, acoustic signals, speech, spectrum meters, system status, cliffs or edges, types of flooring, and the like. In some cases, the robot may include communication means such as Wi-Fi, Worldwide Interoperability for Microwave Access (WiMax), WiMax mobile, wireless, cellular, Bluetooth, RF, etc. In some cases, the robot may support the use of a 360 degrees LIDAR and a depth camera with limited field of view. In some cases, the robot may support proprioceptive sensors (e.g., independently or in fusion), odometry devices, optical tracking sensors, inertial measurement unit (IMU), and gyroscopes. In some cases, the robot may include at least one cleaning tool (e.g., disinfectant sprayer, brush, mop, scrubber, steam mop, cleaning pad, ultraviolet (UV) sterilizer, etc.). The processor may, for example, receive and process data from internal or external sensors, execute commands based on data received, control motors such as wheel motors, map the environment, localize the robot, determine division of the environment into zones, and determine movement paths. In some cases, the robot may include a microcontroller on which computer code required for executing the methods and techniques described herein may be stored.

Some embodiments may provide a Light Weight Real Time SLAM Navigational Stack configured to provide a variety of functions. In embodiments, the Light Weight Real Time SLAM Navigational Stack may reduce computational burden, and consequently may free the hardware (HW) for functions such as object recognition, face recognition, voice recognition, and other artificial intelligence (AI) applications. Additionally, the boot up time of a robot using the real time navigational stack may be faster than prior art methods. In general, the Light Weight Real Time SLAM Navigational Stack may allow more tasks and features to be packed into a single device while reducing battery consumption and environmental impact. The collection of the advantages of the Light Weight Real Time SLAM Navigational Stack consequently improve performance and reduce costs, thereby paving the road forward for mass adoption of robots within homes, offices, small warehouses, and commercial spaces. In embodiments, the real time navigational stack may be used with various different types of systems, such as Real Time Operating System (RTOS), Robot Operating System (ROS), and Linux.

Some embodiments may use a Microcontroller Unit (MCU) (e.g., SAM70S MC) including built in 300 MHz clock, 8 MB Random Access Memory (RAM), and 2 MB flash memory. In some embodiments, the internal flash memory may be split into two or more blocks. For example, a lower block may be used as default storage for program code and constant data. In some embodiments, the static RAM (SRAM) may be split into two or more blocks. In embodiments, other types of MCUs or CPUs may be used. A person skilled in the art would understand the pros and cons of different available options and would be able to choose from available silicon chips to best take advantage of their manufactured capabilities for the intended application.

In embodiments, the core processing of the Light Weight Real Time SLAM Navigational Stack occurs in real time. In some embodiments, a variation RTOS may be used (e.g., Free-RTOS). In some embodiments, a proprietary code may act as an interface to providing access to the HW of the CPU. In either case, AI algorithms such as SLAM and path planning, peripherals, actuators, and sensors communicate in real time and take maximum advantage of the HW capabilities that are available in advance computing silicon. In some embodiments, the real time navigation stack may take full advantage of thread mode and handler mode support provided by the silicon chip to achieve better stability of the system. In some embodiments, an interrupt may occur by a peripheral, and as a result, the interrupt may cause an exception vector to be fetched and the MCU (or in some cases CPU) may be converted to handler mode by taking the MCU to an entry point of the address space of the interrupt service routine (ISR). In some embodiments, a Microprocessor Unit (MPU) may control access to various regions of the address space depending on the operating mode. In some cases, the real time navigational system may be compatible with systems that do not operate in real time for the purposes of testing, proof of concepts, or for use in alternative applications. In some embodiments, a mechanism may be used to create a modular architecture that keeps the stack intact and only requires modification of the interface code when the navigation stack needs to be ported. In some embodiments, an Application Programming Interface (API) may be used to interface between the navigational stack and customers to provide indirect secure access to modify some parameters in the stack.

In some embodiments, the processor of the robot may use Light Weight Real Time SLAM Navigational Stack to map the environment and localize the robot. In some embodiments, Light Weight Real Time SLAM Navigational Stack may include a state machine portion, a control system portion, a local area monitor portion, and a pose and maps portion. FIG. 1 provides a visualization of an example of a Light Weight Real Time SLAM Navigational Stack algorithm. The state machine 100 may determine current and next behaviors. At a high level, the state machine 100 may include the behaviors reset, normal cleaning, random cleaning, and find the dock. The control system 101 may determine normal kinematic driving, online navigation (i.e., real time navigation), and robust navigation (i.e., navigation in high obstacle density areas). The local area monitor 102 may generate a high resolution map based on short range sensor measurements and control speed of the robot. The control system 101 may receive information from the local area monitor 102 that may be used in navigation decisions. The pose and maps portion 103 may include a coverage tracker 104, a pose estimator 105, SLAM 106, and a SLAM updater 107. The pose estimator 105 may include an Extended Kalman Filter (EKF) that uses odometry, IMU, and LIDAR data. SLAM 106 may build a map based on scan matching. The pose estimator 105 and SLAM 106 may pass information to one another in a feedback loop. The SLAM updater 107 may estimate the pose of the robot. The coverage tracker 104 may track internal coverage and exported coverage. The coverage tracker 104 may receive information from the pose estimator 105, SLAM 106, and SLAM updated 107 that it may use in tracking coverage. In one embodiment, the coverage tracker 104 may run at 2.4 Hz. In other indoor embodiments, the coverage tracker may run at between 1-50 Hz. For outdoor robots, the frequency may increase depending on the speed of the robot and the speed of data collection. A person in the art would be able to calculate the frequency of data collection, data usage, and data transmission to control system. The control system 101 may receive information from the pose and maps portion 103 that may be used for navigation decisions. Further details of a robot system that may be used is described in U.S. patent application Ser. No. 16/920,328, the entire contents of which is hereby incorporated by reference.

In some embodiments, it may desirable for the processor of the robot (particularly a service robot) to map the environment as soon as possible without having to visit various parts of the environment redundantly. For instance, a map complete with a minimum percentage of coverage to entire coverable area may provide better performance. Traditional SLAM techniques require over an hour and some virtual SLAM (VSLAM) solutions require the complete coverage of areas to generate a complete map. In addition, with traditional SLAM, robots may be required to perform perimeter tracing (or partial perimeter tracing) to discover or confirm an area within which the robot is to perform work in. Such SLAM solutions may be unideal for, for example, service oriented tasks, such as popular brands of robotic vacuums. It is more beneficial and elegant when the robot begins to work immediately without having to do perimeter tracing first. In some applications, the processor of the robot may not get a chance to build a complete map of an area before the robot is expected to perform a task. However, in such situations, it is useful to map as much of the area as possible in relation to the amount of the area covered by the robot as a more complete map may result in better decision making. In coverage applications, the robot may be expected to complete coverage of an entire area as soon as possible. The time to map the entire area and the percentage of area covered are much less with Light Weight Real Time SLAM Navigational Stack, requiring only minutes and a fraction of the space to be covered to generate a complete map.

In embodiments, the real time navigational system of the robot may be compatible with a 360 degrees LIDAR and a limited Field of View (FOV) depth camera. This is unlike robots in prior art that are only compatible with either the 360 degrees LIDAR or the limited FOV depth camera. In addition, navigation systems of robots described in prior art require calibration of the gyroscope and IMU and must be provided wheel parameters of the robot. In contrast, some embodiments of the real time navigational system described herein may autonomously learn calibration of the gyroscope and IMU and the wheel parameters.

In embodiments, the camera of the robot may be a charge-coupled device (CCD) or a complementary metal-oxide semiconductor (CMOS). In some embodiments, the camera may receive ambient light from the environment or a combination of ambient light and a light pattern projected into the surroundings by an LED, IR light, projector, etc., either directly or through a lens. In some embodiments, the processor may convert the captured light into data representing an image, depth, heat, presence of objects, etc. In some embodiments, the camera may include various optical and non-optical imaging devices, like a depth camera, stereovision camera, time-of-flight camera, or any other type of camera that outputs data from which depth to objects can be inferred over a field of view, or any other type of camera capable of generating a pixmap, or any device whose output data may be used in perceiving the environment. The camera may also be combined with an infrared (IR) illuminator (such as a structured light projector), and depth to objects may be inferred from images captured of objects onto which IR light is projected (e.g., based on distortions in a pattern of structured light). Examples of methods for estimating depths to objects that may be used are detailed in U.S. patent application Ser. Nos. 15/243,783, 15/954,335, 15/954,410, 16/832,221, 15/257,798, 16/525,137, 15/674,310, 15/224,442, 15/683,255, 16/880,644, 15/447,122, and 16/393,921, the entire contents of which are hereby incorporated by reference. Other imaging devices capable of observing depth to objects may also be used, such as ultrasonic sensors, sonar, LIDAR, and LADAR devices. Thus, various combinations of one or more cameras and sensors may be used. Further details of cameras and depth measurement devices that may be used are described in U.S. patent application Ser. No. 16/920,328, the entire contents of which is hereby incorporated by reference.

In some embodiments, the robot may include a tiered sensing system, wherein data of a first sensor may be used to initially infer a result and data of a second sensor, complementary to the first sensor, may be used to confirm the inferred result. In some embodiments, a Hebbian based sensing method may be used to create correlations between different types of sensing. In some embodiments, a sensor of the robot (e.g., two-and-a-half dimensional LIDAR) observes the environment in layers. In some embodiments, sensor may be conditioned. Further details of methods of collecting, processing, and interpreting sensor data that may be used are described in U.S. patent application Ser. No. 16/920,328, the entire contents of which is hereby incorporated by reference.

In some embodiments, the robot may include a wheel suspension system, such as those described in U.S. patent application Ser. Nos. 15/951,096, 16/270,489, and 16/389,797, the entire contents of which is hereby incorporated by reference. In some embodiments, the robot may include wheels, such as those described in Ser. Nos. 15/444,966 and 15/447,623, the entire contents of which are hereby incorporated by reference. In some embodiments, the robot may include an integrated bumper, such as those described in U.S. patent application Ser. Nos. 15/924,174, 16/212,463, 16/212,468, the entire contents of which are hereby incorporated by reference. In some embodiments, the robot may include floor sensors for detecting cliffs, floor type, depth, etc. based on data collected by the floor sensors. Examples of floor sensors that may be used are described in U.S. patent application Ser. Nos. 14/941,385, 16/279,699, and 16/041,470, the entire contents of which are hereby incorporated by reference. In some embodiments, the robot may include a touch screen such as that described in U.S. patent application Ser. No. 16/920,328, the entire contents of which are hereby incorporated by reference.

In some embodiments, the robot may be a robotic cleaner, such as the robotic cleaners described in U.S. patent application Ser. Nos. 16/920,328, 15/673,176, 16/058,026, 14/970,791, 16/375,968, 15/432,722, and 16/238,314, the entire contents of which is hereby incorporated by reference. In some embodiments, the robot may include side brushes and a main brush, such as those described in U.S. patent application Ser. Nos. 15/924,176, 16/024,263, 16/203,385, 15/647,472, 14/922,143, 15/878,228, and 15/462,839, the entire contents of which are hereby incorporated by reference. In some embodiments, the robot may include a vacuum and/or a mop for simultaneous and independent vacuuming and mopping. In some embodiments, the mop is built in, while in other embodiments the mop is an attachable extension. Examples of mopping mechanisms that may be used are described in U.S. patent application Ser. Nos. 16/440,904, 15/673,176, 16/058,026, 14/970,791, 16/375,968, 15/432,722, 16/238,314, the entire contents of which are hereby incorporated by reference. In some embodiments, the robot may include a washable dustbin, such as that described in U.S. patent application Ser. No. 16/186,499, the entire contents of which are hereby incorporated by reference.

Figure 2A:
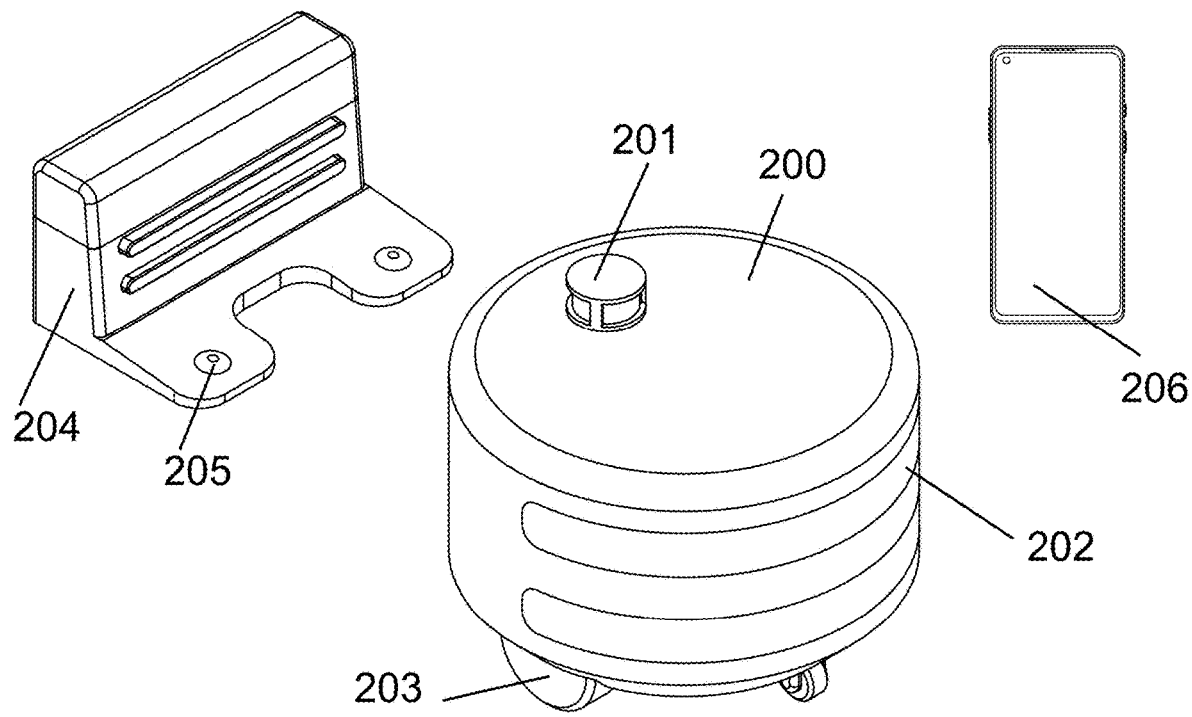
FIGS. 2A and 2B illustrate an example of a robot, an application of a communication device, and a charging station, according to some embodiments.
Figure 2B:
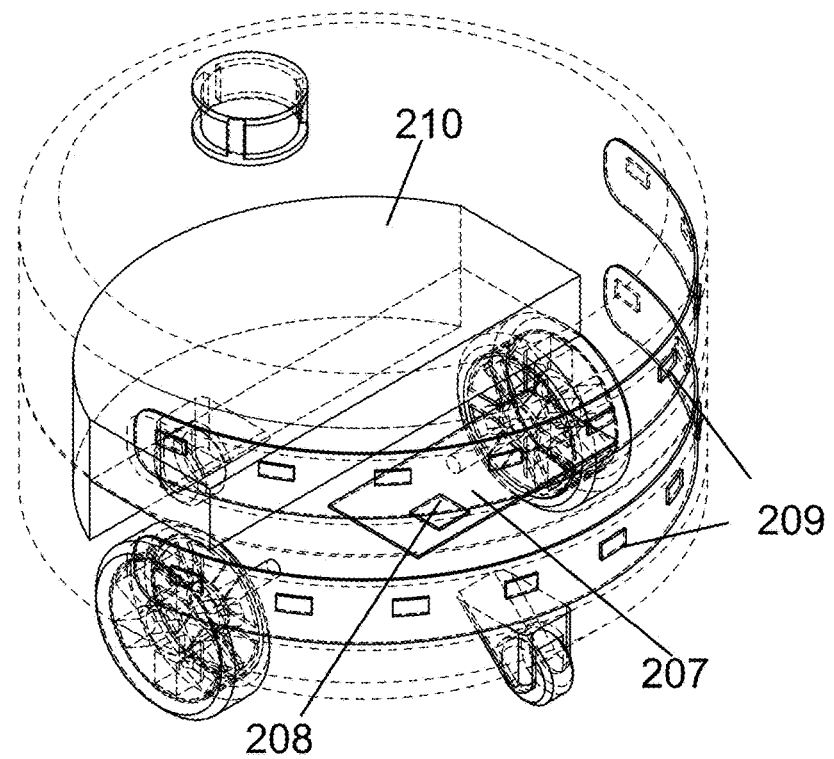

FIG. 2A illustrates an example of a robot including a casing 200, LIDAR 201, sensor windows 202 behind which sensors are positioned (e.g., camera, TOF, TSSP, etc.), and drive wheels 203 (castor wheel in front) and a charging station 204 of the robot including charging contacts 205. In some cases, an application of a communication device 206 is paired with the robot, as described further herein. FIG. 2B illustrates internal components of the robot includes at least a board 207 including a processor 208, memory, sensors 209 behind sensor windows 202, and battery 210.

In some embodiments, the robot may charge at a charging station, such as those described in U.S. patent application Ser. Nos. 15/071,069, 15/917,096, 15/706,523, 16/241,436, 15/377,674, 16/920,328, and 16/883,327, the entire contents of which are hereby incorporated by reference. In some embodiments, the charging station may be built into an area of an environment (e.g., kitchen, living room, laundry room, mud room, parking lot, office space, etc.). In some embodiments, a dustbin of the robot may directly connect to and may be directly emptied into a central vacuum system of the environment. In some embodiments, the robot may be docked at a charging station while simultaneously connected to the central vacuum system. In some embodiments, the contents of the dustbin of the robot may be emptied at a charging station of the robot. In some embodiments, a fluid reservoir of the robot may be refilled at the charging station. In some embodiments, the robot may be serviced in various wats at a charging station (e.g., part replacement). In some embodiments, the processor of the robot identifies and marks a location of the charging station in a map of the environment.

In some embodiments, the processor of the robot uses data from various sensors, such as cameras, LIDAR, and other depth sensing devices (or depth perceiving devices), to generate a map (or otherwise planar representation, spatial representation, or other equivalent) of the surroundings (or otherwise environment, workspace, or other equivalent). In some embodiments, a camera captures spatial data while the robot moves within the surroundings. In some embodiments, the robot moves back and forth across the environment in straight lines, such as in a boustrophedon pattern. In some embodiments, the camera captures spatial data while the robot rotates 360 degrees. In some embodiments, spatial data of the surroundings are captured continuously as the robot moves around the surroundings or rotates in one or more different positions in the surroundings. In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In one embodiment, the camera measures vectors from the camera to objects in the surroundings and the processor calculates the L2 norm of the vectors using $\|x\|_P = (\Sigma_i |x_i|^P)^{1/P}$ with P=2 to estimate depths to objects. In some embodiments, the camera rotates to observe a second field of view partly overlapping the first field of view and captures a depth image of objects within the second field of view (e.g., differing from the first field of view due to a difference in camera pose). In some embodiments, the processor compares the depth readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, the processor infers the angular disposition of the Robot from the size of the area of overlap and uses the angular disposition to adjust odometer information to overcome the inherent noise of an odometer.

Prior to measuring vectors from the camera to objects within each new field of view and estimating depths, the processor may adjust previous readings to account for the measured movement of the robot as it moves from observing one field of view to the next (e.g., differing from one another due to a difference in camera pose). This adjustment accounts for the movement of the coordinate system observed by the camera with respect to a stationary coordinate system that may or may not coincide with the first field of view of the camera. In instances wherein the camera and robot move as a single unit, the observed coordinate system of the camera moves with respect to the stationary coordinate system as the robot moves. In some embodiments, a movement measuring device such as an odometer, gyroscope, optical flow sensor, etc. measures the movement of the robot and hence the camera (assuming the two move as a single unit) as the camera moves to observe new fields of view with corresponding new observed coordinate systems. In some embodiments, the processor stores the movement data in a movement vector and transforms all perimeter and object coordinates to correspond to, for example, the initial coordinate system observed by the camera coinciding with the stationary coordinate system. For example, in an embodiment wherein C is a stationary Cartesian coordinate system, C0 may be the observed coordinate system of the camera fixed to the robot at time t0 with state S and coinciding with stationary coordinate system C. The robot with attached camera displaces and the camera observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results may be achieved for most home environments. With a holistic, stationary, or global coordinate system in which the camera of the robot observes a local coordinate system, a function that relates the local observations of the camera to the stationary or global observation may be created. A challenge may be estimating a reliable function that can provide high accuracy. For example, accounting for scenarios wherein the surface on which the robot operates is unlevelled whereby the odometer may measure a depth greater or smaller than the true 2D displacement. Methods for eradicating such issues have been suggested in U.S. patent application Ser. No. 15/683,255, the entire contents of which are hereby incorporated by reference, whereby the processor monitors declining depth measurements as a depth measurement device of the robot moves towards a stationary object. If the steady decline of measurements is interrupted by a predetermined number of measurements that are a predetermined percentage greater than the measurements immediately before and after the interruption, the processor discards the interrupting measurements.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix may be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, may be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an inertial measurement unit (IMU). In some embodiments, the translation and rotation of the camera between frames is measured by two separate movement measurement devices (e.g., optical encoder and gyroscope of the robot) and the movement of the robot is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

In some embodiments, the area of overlap between readings taken within the two field of views is estimated based on the measured movement of the robot and is used as a method of verifying the identified area of overlap. In some embodiments, measured movement may be used as the primary method of identifying the area of overlap. In some embodiments, devices such as an odometer, gyroscope, and optical flow sensor may be used to measure movement. For example, the angular displacement provided by an odometer and gyroscope and/or the mathematical convolution of the two may be used to estimate the area of overlap. In some embodiments, the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, the robot may have more than one movement measuring device in order to measure movement between each time step or fields of view observed. For example, the robot may have gyroscopes and odometers that simultaneously provide redundant information. In many implementations, only one set of information is used by the processor of the robot while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the robot by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the robot to compensate for the lack of precision between the measurements from the first and second device. By way of further example, the processor may use minimum mean squared error to provide a more precise estimate of the movement of the robot. The processor may also use other mathematical methods to further process measured movement of the robot by the first and second device, such as split and merge algorithm, incremental algorithm, Hough Transform, line regression, Random Sample Consensus, Expectation-Maximization algorithm, or curve fitting, for example, to estimate more realistic movement of the robot. In another embodiment, the processor may use the k-nearest neighbors algorithm where each movement measurement is calculated as the average of its k-nearest neighbors.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

In some embodiments, the processor may connect images to generate a spatial representation based on the same objects identified in captured images. In some embodiments, the processor of the robot may insert image data information at locations within the map from which the image data was captured from. In some embodiments, the same objects in the captured images may be identified based on distances to objects in the captured images and the movement of the robot in between captured images and/or the position and orientation of the robot at the time the images were captured. In some cases, images used to generate a spatial representation of the environment may not be accurately connected when connected based on the measured movement of the robot as the actual trajectory of the robot may not be the same as the intended trajectory of the robot. In some embodiments, the processor may localize the robot and correct the position and orientation of the robot. FIG. 3A illustrates three images 300, 301, and 302 captured by an image sensor of the robot during navigation with same points 303 in each image. Based on the intended trajectory of the robot, same points 303 are expected to be positioned in locations 304. However, the actual trajectory resulted in captured image 301 with same points 303 positioned in unexpected locations. Based on localization of the robot during navigation, the processor may correct the position and orientation of the robot, resulting in FIG. 3B of captured image 301 with the locations of same points 303 aligning with their expected locations 304 given the correction in position and orientation of the robot. In some cases, the robot may lose localization during navigation due to, for example, a push or slippage. In some embodiments, the processor may relocalize the robot and as a result images may be accurately connected. FIG. 4 illustrates three images 400, 401, and 402 captured by an image sensor of the robot during navigation with same points 403 in each image. Based on the intended trajectory of the robot, same points 403 are expected to be positioned at locations 404 in image 402, however, due to loss of localization, same points 403 are located elsewhere. The processor of the robot may relocalize and readjust the locations of same points 403 in image 402 and continue along its intended trajectory while capturing image 405 with same points 403.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the robot occupying the area within which the coordinate is found. If the second set of sensors detects that coordinate is within an area the robot cannot access, the prediction is found true. In some embodiments, this is implemented with a low range sensor array. The second set of sensors may be, but is not limited to, a low range IR sensor, a distance sensor, a tactile sensor, a bumper sensor, or other types of sensors.

The processor of the robot may use the map of the environment to autonomously navigate the environment during operation. In some embodiments, the map (e.g., mapped, e.g., in vector or bitmap form) is stored in memory for future use. Storage of the map may be in temporary memory such that a map is only available during an operational session or in more permanent forms of memory such that the map is available at the next session or startup. In some embodiments, the map is further processed to identify rooms and other segments. In some embodiments, a new map is constructed at each use. In some embodiments, the map may be externally stored on another device such as the docking station or other base station of the robot or in the cloud (e.g., in memory of a server at a remote data center) or other remote storage device.

Figure 5A:
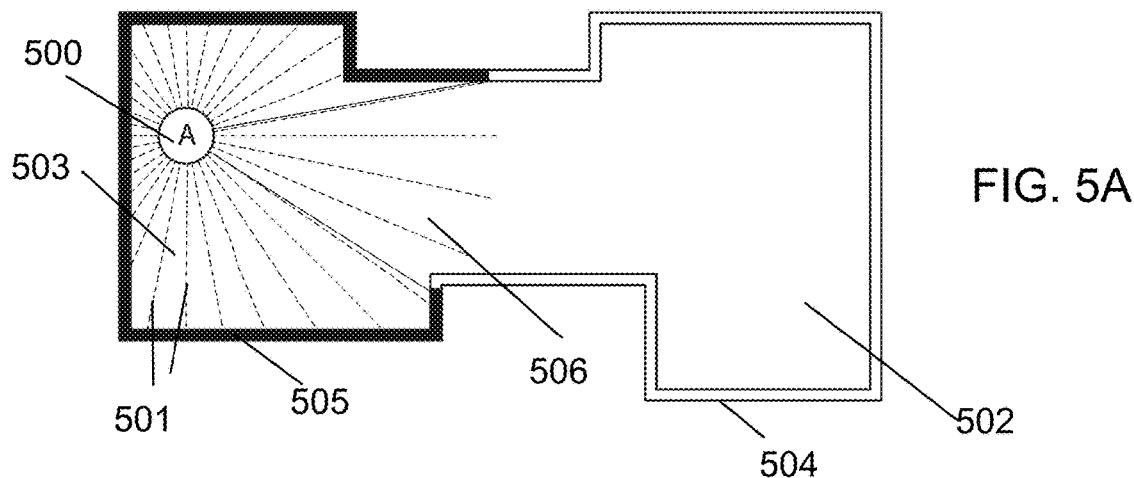
FIGS. 5A-5C illustrate an example of a method for generating a map, according to some embodiments.
Figure 5B:
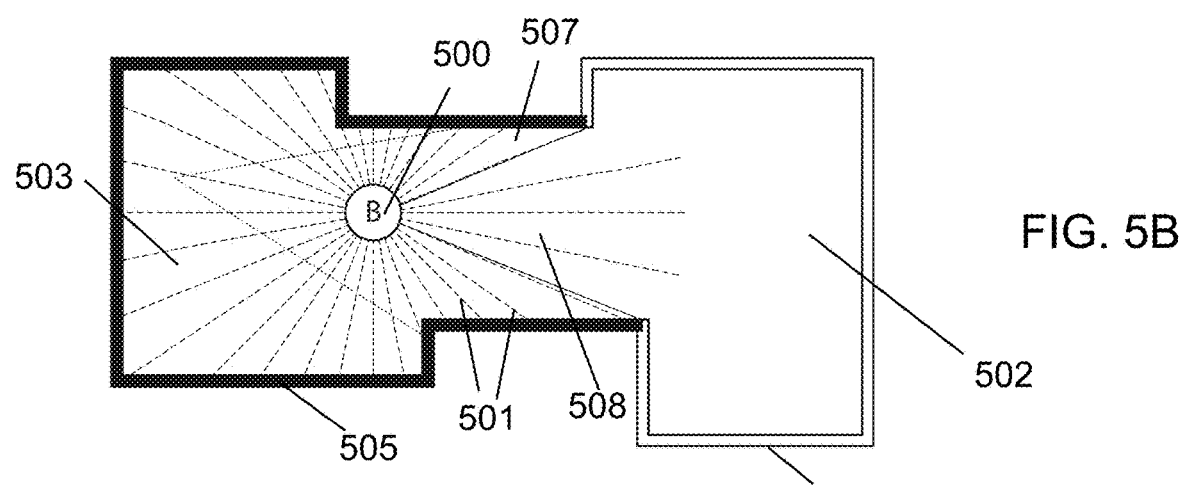
Figure 5C:
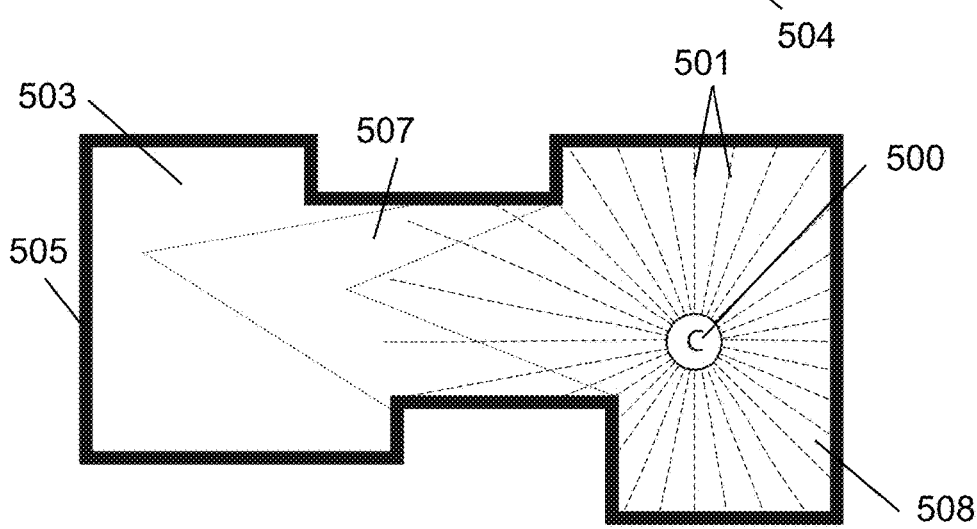

In some embodiments, the processor of the robot progressively generates the map as new sensor data is collected. For example, FIG. 5A illustrates robot 500 at a position A and 360 degrees depth measurements 501 (dashed lines emanating from robot 500) taken by a sensor of the robot 500 of environment 502. Depth measurements 501 within area 503 measure depths to perimeter 504 (thin black line) of the environment, from which the processor generates a partial map 505 (thick black line) with known area 503. Depth measurements 501 within area 506 return maximum or unknown distance as the maximum range of the sensor does not reach a perimeter 504 off of which it may reflect to provide a depth measurement. Therefore, only partial map 505 including known area 503 is generated due limited observation of the surroundings. In some embodiments, the map is generated by stitching images together. In some cases, the processor may assume that area 506, wherein depth measurements 501 return maximum or unknown distance, is open but cannot be very sure. FIG. 5B illustrates the robot 500 after moving to position B. Depth measurements 501 within area 507 measure depths to perimeter 504, from which the processor updates partial map 505 to also include perimeters 504 within area 507 and area 507 itself. Some depth measurements 501 to perimeter 504 within area 503 are also recorded and may be added to partial map 505 as well. In some cases, the processor stitches the new images captured from positioned B together then stitches the stitched collection of images to partial map 505. In some cases, a multi-scan approach that stitches together consecutive scans and then triggers a map fill may improve map building rather than considering only single scan metrics before filling the map with or discarding sensor data. As before, depth measurements 501 within area 508 and some within previously observed area 503 return maximum or unknown distance as the range of the sensor is limited and does not reach perimeters 501 within area 508. In some cases, information gain is not linear, as illustrated in FIGS. 5A and 5B, wherein the robot first discovers larger area 503 then smaller area 507 after traveling from position A to B. FIG. 5C illustrates the robot 500 at position C. Depth measurements 501 within area 508 measure depths to perimeter 504, from which the processor updates partial map 505 to also include perimeters 504 within area 508 and area 508 itself. Some depth measurements 501 to perimeter 504 within area 507 are also recorded and may be added to partial map 505 as well. In some cases, the processor stitches the new images captured from position C together then stitches the stitched collection of images to partial map 505. This results in a full map of the environment. As before, some depth measurements 501 within previously observed area 507 return maximum or unknown distance as the range of the sensor is limited and does not reach some perimeters 501 within area 507. In this example, the map of the environment is generated as the robot navigates within the environment. In some cases, real-time integration of sensor data may reduce accumulated error as there may be less impact from errors in estimated movement of the robot. In some embodiments, the processor of a robot identifies one or more gaps in the map of the environment. In some embodiments, the robot navigates to the area in which the gap exists for further exploration, collecting new data while exploring. New data is collected by the sensors of the robot or another collaborating robot and combined with the existing map at overlapping points until the gap in the map no longer exists. In some embodiments, a gap is an opening in the wall. In some embodiments, the processor determines if the gap is a doorway using door detection methods described in U.S. Patent Application No. U.S. patent application Ser. Nos. 15/614,284, 16/851,614, and 16/163,541, the entire contents of which is hereby incorporated by reference. In some embodiments, the processor may mark the location of doorways within a map of the environment. In some embodiments, the processor uses doorways to segment the environment into two or more subareas. In some embodiments, the robot performs work in discovered areas while simultaneously mapping, thereby discovering previously undiscovered areas. In some embodiments, the robot performs work in newly discovered areas, repeating the process until mapping of the environment is complete.

While the examples and illustrations provided apply the some of the present techniques to the construction of a 2D perimeters using 2D distance measurements, the 2D perimeters may be constructed using 3D distance measurements as well. Furthermore, embodiments may construct 3D perimeters of the map using 3D distance measurements. The 3D perimeters of the map may be plotted using at least one camera, such as a distance measuring camera, capable of taking 3D distance measurements. 3D distance measurements taken within overlapping field of views may be combined at identified areas of overlap where overlapping distance measurements are used as the attachment points. In some embodiments, a 2D perimeters can be extracted from the plotted 3D perimeters.

The resulting plot of the perimeters may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

In some embodiments, the field of view of the sensor may be limited. In such cases, there may not be overlap between measurements captured in consecutive field of views as the robot rotates 360 degrees to scan the environment or executes other movements within the environment. In some embodiments, the robot includes a camera oriented towards the ceiling. The camera captures images of features and the processor monitors how the image of the ceiling changes in each degree of angular displacement. The processor compares consecutively captured images and determines a transpose that transforms a previously captured image into a currently captured image. The processor applies the transpose to all measurements and normalizes them. The transpose may be determined and applied to the measurements at the end of a 360 degrees turn, at every incremental degree, or at a predetermined interval (e.g., an interval corresponding with camera FPS or TOF sensor Hz). In other instances, the camera captures images of other objects such as walls, floors, walls and floors, ceilings and walls, etc. For example, the camera may be oriented to capture images of walls and floors and the processor may determine the transpose of a corner connecting a floor and two walls from one image to another. In some embodiments, the processor determines the change in distance of the feature from an edge of the image.

Some embodiments may implement image processing techniques described in U.S. patent application Ser. No. 16/920,328, the entire contents of which is hereby incorporated by reference. Some examples include image derivative techniques and image de-noising techniques. In another example, the processor may determine correlation between neighborhoods of two images to identify similar features in both images. In one example, the processor may employ unsupervised learning or clustering to organize unlabeled data into groups based on their similarities. In another example, the processor may employ fuzzy clustering or use spectral clustering techniques.

In some embodiments, the path of the robot may overlap while mapping. In some cases, the processor of the robot may discard some overlapping data from the map (or planar work surface). In some embodiments, the processor of the robot may determine overlap in the path based on images captured with a camera of the robot as the robot moves within the environment. In some embodiments, the processor of the robot may generate multiple maps of the environment over multiple working sessions. The maps may be stored in a memory of the robot and may be combined with previously generated maps to keep the map of the environment up to date. In some embodiments, a predetermined map of the environment may be generated and stored in an internal memory of the robot. In some embodiments, the robot may generate a map of the environment during operation in the environment. In some embodiments, the processor may update the internal map of the environment with observations collected during each successive work session. Continuous updates to the map of the environment may help establish the most efficient path of the robot.

In some embodiments, the processor of a robot generates a local map and a global map. Examples of global and local maps that the processor of the robot may generate are further described in U.S. patent application Ser. No. 16/920,328, the entire contents of which are hereby incorporated by reference. In some embodiments, the processor merges the local map and the global map. In some embodiments, the processor only observes a portion of the global map that is local relative to the location of the robot. In some embodiments, the processor generates layers of maps as described in U.S. patent application Ser. No. 16/920,328, the entire contents of which are hereby incorporated by reference. In some cases, different maps may have different resolutions which may be used for different purposes. In some embodiments, the processor superimposes one or more local maps on a global map in a layered fashion. In some instances, the processor combines two or more local maps to create a global map. The processor generates a local map and determines its location based on locating the local map within the global map by detecting similar features between the two maps. In some instances, the processor generates a layered map including two or more layered maps. In some embodiments, the processor of a robot constructs the map of the environment based on local and/or remote sensor data and shares the map of the environment with processors of other robots. In some embodiments, the processors of other robots update the map of the environment constructed by the processor of another robot based on local and/or remote sensor data.

The robot may, for example, use the map to autonomously navigate the environment during operation, e.g., accessing the map to determine that a candidate route is blocked by an obstacle denoted in the map, to select a route with a route-finding algorithm from a current point to a target point, or the like. To avoid false detection of an obstacle, in some embodiments, the processor assigns each location within the map an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, 16/599,169, and 15/619,449, the entire contents of which are hereby incorporated by reference. In some embodiments, a new map is constructed at each use, or an extant map is updated based on newly acquired data.

Figure 6:
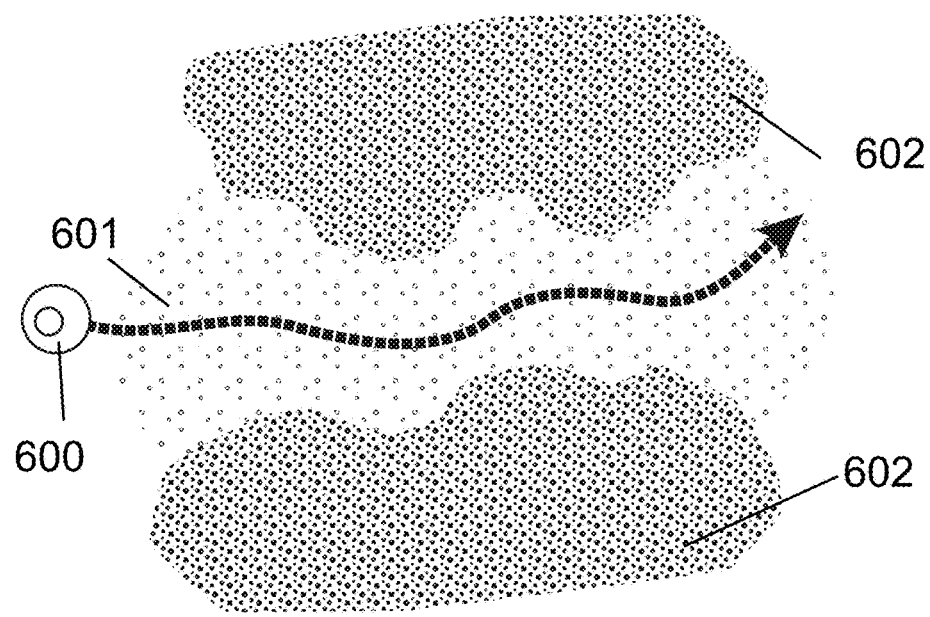
FIG. 6 illustrates an example of a robot navigating through a narrow path, according to some embodiments.

In some embodiments, the processor tracks objects as opposed to or in addition to pixels. In embodiments, tracking objects results in objects at different depths moving in the scene at different speeds. In some embodiments, the processor may detect objects based on features and objects grouped together based on shiny points of structured light emitted onto the object surfaces (as described above). In some embodiments, the processor may determine at which speed the shiny points in the images move. Since the shiny points of the emitted structured light move within the scene when the robot moves, each of the shiny points create a motion, such as Brownian Motion. According to Brownian motion, when speed of movement of the robot increases, the entropy increases. In some embodiments, the processor may categorize areas with higher entropy with different depths than areas with low entropy. In some embodiments, the processor may categorize areas with similar entropy as having the same depths from the robot. In some embodiments, the processor may determine areas the robot may traverse based on the entropy information. For example, FIG. 6 illustrates a robot 600 tasked with passing through a narrow path 601 with obstacles 602 on both sides. The processor of the robot 600 may know where to direct the robot 600 based on the entropy information. Obstacles 602 on the two sides of the path 601 have similar entropies while the path 601 has a different entropy than the obstacles as the path 601 is open ended, resulting in the entropy presenting as far objects which is opposite than the entropy of obstacles 602 presenting as near objects.

It should be emphasized, that embodiments are not limited to techniques that construct maps as described herein, as the present techniques may also be used for plane finding in augmented reality, barrier detection in virtual reality applications, outdoor mapping with autonomous drones, and other similar applications, which is not to suggest that any other description is limiting. Further details of mapping methods (e.g., data collection, data processing, combing data from a same or different sensor of a same or different robot or device (e.g., wearable device such as glasses or smart watch) to synthesize the map, updating and modifying the map, map storage, using the map (e.g., for navigation, localization, zone division, path planning, etc.), etc.) that may be used are described in U.S. patent application Ser. Nos. 16/048,179, 16/048,185, 16/594,923, 16/920,328, 16/163,541, 16/851,614, 16/163,562, 16/597,945, 16/724,328, 16/163,508, and 16/185,000, the entire contents of which are hereby incorporated by reference.

In some embodiments, more than one camera may be used to improve accuracy of the map. For example, a plurality of distance measuring cameras (e.g., carried by the robot) may be used simultaneously (or concurrently) to more accurately determine the perimeters of the map. The use of a plurality of distance measuring cameras is expected to allow for the collection of distance measurements from different perspectives and angles, for example. Where more than one distance measuring camera is used, triangulation or others suitable methods may be used for further data refinement and accuracy. In some embodiments, a 360-degree LIDAR is used to create perimeters of the map.

Various distance measurement devices that may be used in perceiving depth are described in U.S. patent application Ser. Nos. 15/243,783, 15/954,335, 15/954,410, 16/832,221, 15/257,798, 16/525,137, 15/674,310, 15/224,442, 15/683,255, 16/880,644, 15/447,122, 16/920,328, and 16/393,921, the entire contents of which are hereby incorporated by reference. For example, a distance measurement device may include two laser rangefinders, a camera, and an image processing unit disposed on a main housing. In some embodiments, the camera and two laser rangefinders may be positioned such that the laser rangefinders analyze predetermined lines of sight within the camera's image frame. In some embodiments, the laser rangefinders may measure the distance to the first encountered obstacle in their respective lines of sight. Each line of sight may intersect with an obstacle at an arbitrary point, which shall be referred to herein as the first and second points. In some embodiments, the camera may capture an image of the area. In some embodiments, the image processing unit may determine the color depths at the first and second points. In some embodiments, color depth may comprise a pixel intensity or a depth inferred based on the pixel intensity. In some embodiments, the image processing unit may determine the color depth of the pixels that form a straight line between the first and second points (referred to herein as the connecting line) and may compare the color depth of the pixels with the color depths of the first and second points. In some embodiments, if the color depth of all the pixels along the connecting line is consistent with (or within a preset range of) the color depths of the first and second points, the processor may determine that the distances of all the pixels within that region are within a threshold from the distances measured by the laser rangefinder at the first and second points. In some embodiments, when the color depth of the pixels along the connecting line is within a preset range of the color depths of the first and second points, the processor may determine that the surface or obstacle being analyzed is a substantially flat surface. In some embodiments, the processor may use the color depth of pixels in captured images to determine overlap of captured images. In some embodiments, the processor may combine captured images at overlapping points to generate a spatial model of the environment.

In some embodiments, the laser rangefinders may be positioned such that they diverge from each other at a predetermined angle relative to a vertical plane. In other embodiments, laser rangefinders may also be positioned to diverge from each other at a predetermined angle relative to a horizontal plane. This may allow the processor to analyze a greater distance between the first and second points. In embodiments in which the laser rangefinders are positioned such that they diverge from each other at preset angles, triangulation may be used to aid in building a map of the area being analyzed. In such embodiments, the laser rangefinders may be positioned at substantially a single origin point such that the lines of sight thereof, together with the connecting line, form a triangle. If the color depth along the connecting line is within the preset range of the first and second points, then the triangle formed by the laser rangefinders and the substantially flat surface may be analyzed. The point of origin of the laser rangefinders, together with the points where each line of sight intersects with an obstacle, form three vertices of a triangle. In some embodiments, the length of the two sides of the triangle that are the lines of sights of the laser rangefinders may be measured by the laser rangefinders, and the angle between them is known, therefore the remaining angles and triangle side may be determined by triangulation. Thus, the length of the connecting line may be determined, and this information may be used by the processor in mapping the environment. Further, the angle of the detected flat surface may be estimated through triangulation and used in mapping the environment or for any other purpose. For example, a mobile robotic device may adjust its heading with respect to the angle of a wall when orientation is relevant to work performed.

Figure 7A:
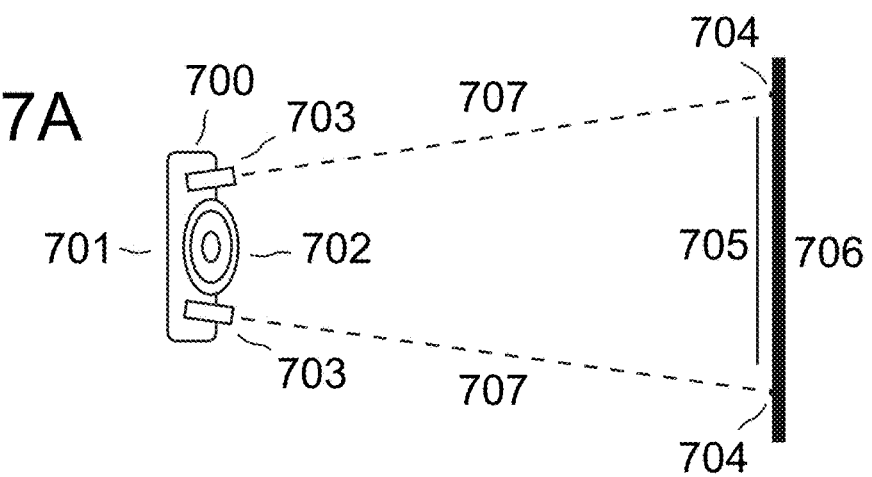
FIGS. 7A and 7B illustrate an example of a distance measurement device, according to some embodiments.
Figure 7B:
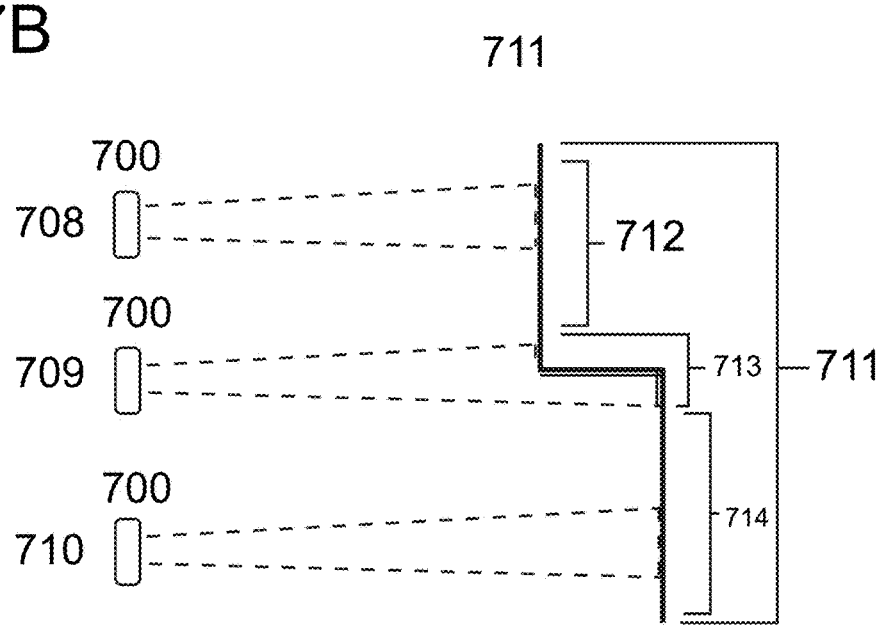

FIG. 7A illustrates an overhead view of an example of a distance measurement method. A distance measurement device 700 has a main body 701, a camera 702, and two laser rangefinders 703. The laser rangefinders 703 measure the distance to the first obstacle, in this case wall 706. The intersection of each laser rangefinder line of sight 707 with the obstacle 706 results in the first and second points 704. In a next step, the camera captures an image of the area and transmits it to the image processing unit. The image processing unit extracts color depth information at the points 704. Then, the image processing unit extracts the color depth information from the pixels that form the straight line 705 between the points 704. In a next step, the system compares the color depth of the pixels in line 705 with the color depth of the points 704. If the color depth falls within a predetermined threshold, the distance of the area in between the points 704 can be assumed to be within a predetermined range of the measured distances to the points 704. FIG. 7B illustrates an overhead view of an example of a distance measurement method. A wall 711 has two substantially flat portions 712, 714 and a portion 713 that is not flat. At location 708, distance measurement device 700 works in the same way as described above and detects a substantially flat surface. At location 709, the color depths at the two points will be substantially different from each other, so the system concludes that the surface between them is not flat. At location 710, the distance measurement device 700 analyzes the second flat portion 714 of the wall 711 and identifies it as flat.

In some embodiments, the memory of the robot may include an internal database of obstacles likely to be encountered within the environment. In some embodiments, an obstacle encountered in the environment may be identified using various sensors to capture features of the obstacle and the processor may determine the type of obstacle based on the internal database. The processor may note the increased likelihood of that type of obstacle being located in the region of the environment in which it was encountered. In some embodiments, the processor may mark the location in the map. For example, images sensors of the robot continuously capture images, and if the robot encounters a wire on the floor, the processor analyzes images of the wire to extract features of the obstacle and compares them with features of obstacles within the internal database to determine that it is a wire. The processor may mark the region in which the wire was encountered within an internal map as a region with increased likelihood of containing a wire. In some embodiments, the processor may further determine if an obstacle may be overcome by the robot. For example, the processor may determine if the wire is an obstacle that may be overcome by the robot by, for example, driving over the wire. If so, the robot may attempt to drive over the obstacle. If, however, the robot encounters a large obstacle, such as a chair or table, the processor may determine that it cannot overcome the obstacle and may attempt to maneuver around the obstacle and continue along its path. In some embodiments, regions wherein obstacles are consistently encountered may be classified by the processor as a high obstacle density area and may be marked in the map of the environment. In some embodiments, the processor may attempt to alter its path to avoid high obstacle density areas. In some embodiments, the processor may alert a user when an unanticipated obstacle blocking the path of the robot is encountered, particularly when the robot may not overcome the obstacle by maneuvering around or driving over the obstacle. The robot may alert the user by generating a noise, sending a message to an application of a communication device (e.g., mobile phone, tablet, laptop, smart devices such as smart watch and smart TV, etc.) paired with the robot or any other device paired with the robot, displaying a message on a screen of the robot, illuminating lights, and the like.

In some embodiments, the processor may mark the locations of static (e.g., furniture) and dynamic (e.g., cars, humans, pets, etc.) objects encountered in the map. In some embodiments, the location of different types of objects and/or object density may be included in the map of the environment that may be viewed using an application of a communication device. In some embodiments, the processor may determine probabilities of existence of objects and display the probability in the map. In some embodiments, the processor of the robot may detect a type of object using methods such as those described in U.S. patent application Ser. No. 16/920,328. Examples of object type include cables, cords, wires, toys, jewelry, garments, socks, shoes, shoelaces, feces, liquids, keys, food items, remote controls, plastic bags, purses, backpacks, earphones, cell phones, tablets, laptops, chargers, animals, fridges, televisions, chairs, tables, light fixtures, lamps, fan fixtures, cutlery, dishware, dishwashers, microwaves, coffee makers, smoke alarms, plants, books, washing machines, dryers, watches, blood pressure monitors, blood glucose monitors, first aid items, and Wi-Fi routers. In some embodiments, the processor may store an object type of an object identified by a user using the application of a communication device in an object types dictionary for future recognition. In some embodiments, the processor may determine a location, a height, a width, and a depth of an object based on sensor data. In some embodiments, the processor of the robot may determine a path of the robot based on the location of objects within the environment. In some embodiments, the processor may adjust the path of the robot to avoid the object. In some embodiments, the processor uses the object detection, object identification, object analysis, and post object detection/identification (e.g., actions taken after object detection/identification) methods and techniques described in U.S. patent application Ser. No. 16/920,328, the entire contents of which are hereby incorporated by reference. For example, the processor of the robot may adjust a current path of the robot to include a detour path around a detected object and may resume along the current path after avoiding the object. In some cases, the current path may include a segment parallel to a wall and each segment of the current path parallel to the wall may be positioned a predetermined distance from the wall. In some cases, each of the segments parallel to the wall may be positioned such that areas covered by the robot when driving along two adjacent segments parallel to the wall partially overlap. This may be beneficial for a robot that provides smaller coverage (e.g., coverage equivalent to the length of main brush of a vacuum robot) relative to the width of the robot. In some cases, the processor may discard data collected by sensors in overlapping areas covered. U.S. Non-Provisional patent application Ser. Nos. 15/976,853, 15/442,992, 16/570,242, 16/219,647 and 16/832,180 describe additional object recognition methods that may be used, the entire contents of which are hereby incorporated by reference. In some embodiments, the processor of the robot uses the facial recognition and post-facial recognition (e.g., actions taken after facial identification) methods described in U.S. patent application Ser. No. 16/920,328, the entire contents of which are hereby incorporated by reference.

In some embodiments, the robot includes a first exteroceptive sensor (e.g., depth sensor) and a second proprioceptive sensor (e.g., gyroscope, such as in a three or six axis inertial measurement unit (IMU), the data of which the processor uses simultaneously and interchangeably for mapping and localization of the robot. In some embodiments, data from one sensor is used in a primary method for mapping and localization while data from the other sensor is used in a secondary method for mapping and localization. The processor uses the secondary method for mapping and localization when, for example, the sensor used in the primary method for mapping and localization malfunctions, is occluded or obstructed, becomes unusable or is functionally affected by the environment. For example, in direct sunlight a first exteroceptive sensor, such as a depth camera, may not provide the reliable readings required for a primary method for mapping and localization. In such instances, the processor uses a secondary method for mapping and localization using data from a second proprioceptive sensor, such as a gyroscope, to localize the robot and mark the area covered by the robot such that repeat coverage is avoided. The transition between the primary and secondary method may be seamless (e.g., occurring within less than 10 seconds, less than 1 second, or less than 500 milliseconds, and resulting in less than 1 cm, 10 cm, or 50 cm of error in position over 10 seconds of travel) and may be controlled with a finite state machine. In some embodiments, the processor uses the secondary method to verify output of the primary method. In some embodiments, one sensor is active (e.g., depth sensor emitting light to the environment and measuring reflected light) and the other sensor is passive (e.g., gyroscope measuring movement). For example, data from a digital camera (i.e., passive sensor) is used in a primary method for mapping and localization and data from a wheel encoder (i.e., active sensor) is used in a secondary method for mapping and localization.

In some embodiments, IMU measurements in a multi-channel stream indicative of acceleration along three or six axes may be integrated over time to infer a change in pose of the robot, e.g., with a Kalman filter. In some cases, the change in pose may be expressed as a movement vector in the frame of reference of the room through which the robot moves. Some embodiments may localize the robot or map the room based on this movement vector (and contact sensors in some cases) even if the camera is inoperative or degraded. In some cases, IMU measurements may be combined with image-based (or other exteroceptive) mapping data in a map or localization determination. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, cliffs are marked as obstacles or objects in the map. In some embodiments, cliffs are detected using edge sensors, such as those described in U.S. patent application Ser. Nos. 14/941,385, 16/279,699, and 16/041,470. In some embodiments, the processor of the robot determines a path of the robot based on at least the location of cliffs within the environment. In some embodiments, the cliffs marked as obstacles in the map prevent the robot from visiting the cliff area more than one time. Without the cliffs marked as obstacles in the map, the robot may attempt to visit the cliff area multiple times. Although the cliffs are detected by the edge detection sensors and prevent the robot from moving past the cliff, the processor may not learn that the cliff area is off limits and may try to visit the cliff area multiple times. By adding cliffs to the map as obstacles, the robot may avoid returning to cliff area again during the same work session and in future work sessions if the map is saved. In some embodiments, the processor treats the cliff area as a perimeter of the environment and directs the robot to move along a smooth line parallel to the cliff line as it if was a wall.

In some instances where linear algebra is used, Basic Linear Algebra Subprograms (BLAS) may be implemented to carry out operations such as vector addition, vector norms, scalar multiplication, matrix multiplication, matric transpose, matrix-vector multiplication, linear combinations, dot products, cross products, and the like.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

In some embodiments, the processor localizes itself during mapping or during operation. In some embodiments, methods of localization are inherently independent from mapping and path planning but may be used in tandem with any mapping or path planning method or may be used independently to localize the robot irrespective of the path or map of the environment.

In some embodiments, the processor of a robot localizes the robot within an environment represented by a phase space or Hilbert space. In some embodiments, the space includes all possible states of the robot within the space. In some embodiments, a probability distribution may be used by the processor of the robot to approximate the likelihood of the state of the robot being within a specific region of the space. In some embodiments, the processor of the robot determines a phase space probability distribution over all possible states of the robot within the phase space using a statistical ensemble including a large collection of virtual, independent copies of the robot in various states of the phase space. In some embodiments, the phase space consists of all possible values of position and momentum variables. In some embodiments, the processor represents the statistical ensemble by a phase space probability density function $\rho(p,q,t)$, q and p denoting position and velocity vectors. In some embodiments, the processor uses the phase space probability density function $\rho(p,q,t)$ to determine the probability $\rho(p,q,t)dq\,dp$ that the robot at time t will be found in the infinitesimal phase space volume dqdp. In some embodiments, the phase space probability density function $\rho(p,q,t)$ has the properties $\rho(p,q,t) \geq 0$ and $\int \rho(p,q,t)d(p,q)=1$, $\forall t \geq 0$, and the probability of the position q lying within a position interval a, b is $P[a \leq q \leq b] = \int_a^b \int \rho(p,q,t)dpdq$. Similarly, the probability of the velocity p lying within a velocity interval c,d is $P[c \leq q \leq d] = \int_c^d \int \rho(p,q,t)dqdp$. In some embodiments, the processor determines values by integration over the phase space. For example, the processor determines the expectation value of the position q by $<q> = \int q\rho(p,q,t)d(p,q)$.

In some embodiments, the processor evolves each state within the ensemble over time t according to an equation of motion. In some embodiments, the processor models the motion of the robot using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of the phase space density function $\rho(p,q,t)$ under a Hamiltonian H using the Liouville equation $$\frac{\partial \rho}{\partial t} = -\{\rho, H\},$$

wherein $\{\cdot,\cdot\}$ denotes the Poisson bracket and H is the Hamiltonian of the system. For two functions $f$, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function $\rho(p,q,t)$ over time using the Fokker-Plank equation which describes the time evolution of a probability density function of a particle under drag and random forces. In comparison to the behavior of the robot modeled by both the Hamiltonian and Liouville equations, which are purely deterministic, the Fokker-Planck equation includes stochastic behaviour. Given a stochastic process with $dX_t = \mu(X_t,t)dt + \sigma(X_t,t)dW_t$, wherein $X_t$ and $\mu(X_t,t)$ are M-dimensional vectors, $\sigma(X_t,t)$ is a M×P matrix, and $W_t$ is a P-dimensional standard Wiener process, the probability density $\rho(x,t)$ for $X_t$ satisfies the Fokker-Planck equation $$\frac{\partial \rho(x, t)}{\partial t} = -\sum_{i=1}^{M} \frac{\partial}{\partial x_i}[\mu_i(x, t)\rho(x, t)] + \sum_{i=1}^{M}\sum_{j=1}^{M} \frac{\partial^2}{\partial x_i \partial x_j}[D_{ij}(x, t)\rho(x, t)]$$

with drift vector $\mu=(\mu_1, \ldots, \mu_M)$ and diffusion tensor $D=\frac{1}{2}\sigma\sigma^T$. In some embodiments, the processor adds stochastic forces to the motion of the robot governed by the Hamiltonian H and determines the motion of the robot by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, $\nabla \cdot$ denotes divergence, and $$D = \frac{1}{2}\sigma_N \sigma_N^T$$

is the diffusion tensor.

In other embodiments, the processor incorporates stochastic behaviour by modeling the dynamics of the robot using Langevin dynamics, which models friction forces and perturbation to the system, instead of Hamiltonian dynamics. The Langevian equations are given by $M\ddot{q}=-\nabla_q U(q)-\gamma p+\sqrt{2\gamma k_B T}MR(t)$, wherein $(-\gamma p)$ are friction forces, $R(t)$ are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor of the robot using, for example, finite difference and/or finite element methods. In an example evolving the phase space probability density function over time, the Liouville equation incorporating Hamiltonian dynamics conserved momentum over time and initial density was only distorted in the q-axis (position). In comparison, equations accounting for stochastic forces also had diffusion along the p-axis (velocity). With the Fokker-Planck equation incorporating Hamiltonian dynamics, the density spread more equally as compared to the Fokker-Planck equation incorporating Langevin dynamics wherein the density remained more confined due to the additional friction forces.

In some embodiments, the processor of the robot may update the phase space probability distribution when the processor receives readings (or measurements or observations). Any type of reading that may be represented as a probability distribution that describes the likelihood of the state of the robot being in a particular region of the phase space may be used. Readings may include measurements or observations acquired by sensors of the robot or external devices such as a Wi-Fi camera. Each reading may provide partial information on the likely region of the state of the robot within the phase space and/or may exclude the state of the robot from being within some region of the phase space. For example, a depth sensor of the robot may detect an object in close proximity to the robot. Based on this measurement and using a map of the phase space, the processor of the robot may reduce the likelihood of the state of the robot being any state of the phase space at a great distance from an object. In another example, a reading of a floor sensor of the robot and a floor map may be used by the processor of the robot to adjust the likelihood of the state of the robot being within the particular region of the phase space coinciding with the type of floor sensed. In an additional example, a measured Wi-Fi signal strength and a map of the expected Wi-Fi signal strength within the phase space may be used by the processor of the robot to adjust the phase space probability distribution. As a further example, a Wi-Fi camera or a camera of other robots may observe the absence of the robot within a particular room. Based on this observation the processor of the robot may reduce the likelihood of the state of the robot being any state of the phase space that places the robot within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robot may update the current phase space probability distribution $\rho(p, q, t_i)$ by re-weighting the phase space probability distribution with an observation probability distribution $m(p,q,t_i)$ according to $$\bar{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor of the robot for a reading at time $t_i$ using an inverse sensor model. In some embodiments, wherein the observation probability distribution does not incorporate the confidence or uncertainty of the reading taken, the processor of the robot may incorporate the uncertainty into the observation probability distribution by determining an updated observation probability distribution $$\hat{m} = \frac{1-\alpha}{c} + \alpha m$$

that may be used in re-weighting the current phase space probability distribution, wherein $\alpha$ is the confidence in the reading with a value of $0 \leq \alpha \leq 1$ and $c=\iint dpdq$. At any given time, the processor of the robot may estimate a region of the phase space within which the state of the robot is likely to be given the phase space probability distribution at the particular time.

To further explain the localization methods described, examples are provided. In a first example, the processor uses a two-dimensional phase space of the robot, including position q and velocity p. The processor confines the position of the robot q to an interval [0, 10] and the velocity p to an interval [−5, +5], limited by the top speed of the robot, therefore the phase space (p,q) is the rectangle $D=[-5, 5]\times[0, 10]$. The processor uses a Hamiltonian function $$H = \frac{p^2}{2m},$$

with mass m and resulting equations of motion $\dot{p}=0$ and $$\dot{q} = \frac{p}{m}$$

to delineate the motion of the robot. The processor adds Langevin-style stochastic forces to obtain motion equations $\dot{p}=-\gamma p+\sqrt{2\gamma m k_B T}R(t)$ and $$\dot{q} = \frac{p}{m},$$

wherein R (t) denotes random forces and m=1. The processor of the robot initially generates a uniform phase space probability distribution over the phase space D. In this example, the processor of the robot evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $\{\rho, H\} = p\frac{\partial \rho}{\partial q}$ and $m = 1$.

Thus, the processor solves $$\frac{\partial \rho}{\partial t} = -p\frac{\partial \rho}{\partial q} + \gamma\left(\rho + p\frac{\partial \rho}{\partial p}\right) + \gamma k_B T \frac{\partial^2 \rho}{\partial p^2} \text{ for } t > 0$$

with initial condition $\rho(p, q, 0) = \rho_0$ and homogenous Neumann perimeter conditions. The perimeter conditions govern what happens when the robot reaches an extreme state. In the position state, this may correspond to the robot reaching a wall, and in the velocity state, it may correspond to the motor limit. The processor of the robot updates the phase space probability distribution each time a new reading is received by the processor based on an observation probability distribution. For example, odometry data may have a narrow Gaussian observation probability distribution for velocity p, reflecting an accurate odometry sensor, and uniform probability distribution for position q as odometry data does not indicate position. Or, a depth sensor may have a bimodal observation probability distribution for position q including uncertainty for an environment with a wall at q=0 and q=10. Therefore, for a distance measurement of four, the robot is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the robot may determine an observation probability distribution of a reading using an inverse sensor model and the phase space probability distribution may be updated by the processor by re-weighting it with the observation probability distribution of the reading.

The example described may be extended to a four-dimensional phase space with position q=(x,y) and velocity p=($p_x$,$p_y$). The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

with M=$I_2$ (2D identity matrix), T=0.1, $\gamma$=0.1, and $k_B$=1. In alternative embodiments, the processor uses the Fokker-Planck equation without Hamiltonian and velocity and applies velocity drift field directly through odometry which reduces the dimension by a factor of two. The map of the environment describes the domain for $q_1$, $q_2 \in D$. In this example, the velocity is limited to $p_1$, $p_2 \in [-1,1]$. The processor models the initial probability density $\rho(p, q, 0)$ as Gaussian, wherein $\rho$ is a four-dimensional function. The evolution of $\rho$ is reduced to the $q_1$, $q_2$ space (i.e., the density integrated over $p_1$, $p_2$, $\rho_{red} = \iint \rho(p_1,p_2,q_1,q_2)dp_1dp_2$). With increased time, the initial density reduced to the $q_1$, $q_2$ space focused in the middle of the map starts to flow into other rooms. The evolution of $\rho$ reduced to the $p_1$, $q_1$ space and to the $p_2$, $q_2$ space show velocity evolving over time with position. The four-dimensional example may be extended to include the addition of floor sensor data observations, wherein the map of the environment indicates different floor types with respect to $q_1$, $q_2$. Given that the sensor has no error, the processor may strongly predict the area within which the robot is located based on the measured floor type, at which point all other hypothesized locations of the robot become invalid. For example, the processor may use the distribution $$m(p_1, p_2, q_1, q_2) = \begin{cases} const > 0, & q_1, q_2 \text{ with the observed floor type} \\ 0, & \text{else} \end{cases}.$$

If the sensor has an average error rate $\epsilon$, the processor may use the distribution $$m(p_1, p_2, q_1, q_2) = \begin{cases} c_1 > 0, & q_1, q_2 \text{ with the observed floor type} \\ c_2 > 0, & \text{else} \end{cases}$$

with $c_1$, $c_2$ chosen such that $\int_p \int_{D_{obs}} m(q_1,q_2)d(p_1,p_2)=1-\epsilon$ and $\int_p \int_{D_{obs}^c} m(q_1,q_2)d(p_1,p_2)=\epsilon$. $D_{obs}$ is the $q_1$, $q_2$ with the observed floor type and $D_{obs}^c$ is its complement. By construction, the distribution m has a probability $1-\epsilon$ for $q_1,q_2 \in D_{obs}$ and probability $\epsilon$ for $q_1,q_2 \in D_{obs}^c$. Given that the floor sensor measures a particular floor type, the processor updates the probability distribution for position. Next, Wi-Fi signal strength observations may also be considered. Given a map of the expected signal strength, the processor may generate a density describing the possible location of the robot based on a measured Wi-Fi signal strength. For wall distance measurements, a wall distance map may be used by the processor to approximate the area of the robot given a distance measured. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

In another example, the robot navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q \in [-10, 10]$ and $p \in [-5, 5]$. The floor has three doors at $q_0=-2.5$, $q_1=0$, and $q_2=5.0$ m the processor of the robot is capable of determining when it is located at a door based on sensor data observed, and the momentum of the robot is constant, but unknown. Initially the location of the robot is unknown, therefore the processor generates an initial uniform state density. When the processor determines the robot is in front of a door, the possible location of the robot is narrowed down, but not the momentum and the processor may update the probability density to reflect that. The processor evolves the probability density, and after five seconds the uncertainty in the position space has spread out again given that the momentum is unknown. However, the evolved probability density keeps track of the correlation between position and momentum. When the processor determines the robot is in front of a door again, the probability density is updated to reflect that, wherein the density has significantly narrowed down, indicating a number of peaks representing possible location and momentum combinations of the robot. For the left door, there is equal likelihood for $p=0$, $p=-0.5$, and $p=-1.5$. These momentum values correspond with the robot travelling from one of the three doors in five seconds. This is also the case for the other two doors as well.

In some embodiments, the processor models motion of the robot using equations $\dot{x}=v\cos\omega$, $\dot{y}=v\sin\omega$, and $\dot{\theta}=\omega$, wherein v and $\omega$ are translational and rotational velocities, respectively. In some embodiments, translational and rotational velocities of the robot are computed using observed wheel angular velocities $\omega_l$ and $\omega_r$ using $$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor of the robot evolves the probability density $\rho=(x, y, \theta, \omega_l, \omega_r)$ using $$\frac{\partial \rho}{\partial t} = -\begin{pmatrix} v\cos\theta \\ v\cos\theta \\ \omega \end{pmatrix} \cdot \nabla_q \rho + \nabla_p \cdot (D\nabla_p \rho)$$

wherein $$D = \frac{1}{2}\sigma_N \sigma_N^T$$

is a 2-by-2 diffusion tensor, $q=(x, y, \theta)$ and $p=(\omega_l, \omega_r)$. In some embodiments, the domain is obtained by choosing x, y in the map of the environment, $\theta \in [0, 2\pi)$, and $\omega_l, \omega_r$ as per the robot specifications. In some embodiments, solving the equation may be a challenge given it is five-dimensional. In some embodiments, the model may be reduced by replacing odometry by Gaussian density with mean and variance. This reduces the model to a three-dimensional density $\rho=(x, y, \theta)$. In some embodiments, independent equations may be formed for $\omega_l$, $\omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \bar{v}\cos\theta \\ \bar{v}\cos\theta \\ \bar{\omega} \end{pmatrix} \cdot \nabla \rho + \nabla \cdot (D\nabla \rho), t > 0$$

$(D\nabla \rho)$, $t>0$ wherein $$D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\bar{v}$, $\bar{\omega}$ represent the current mean velocities, and dv, d$\omega$ the current deviation. In some embodiments, the processor determines $\bar{v}$, $\bar{\omega}$ from the mean and deviation of the left and right wheel velocities $\omega_L$ an $\omega_R$ using $$\begin{pmatrix} \bar{v} \\ \bar{\omega} \end{pmatrix} = J \begin{pmatrix} \bar{\omega}_L \\ \bar{\omega}_R \end{pmatrix}.$$

In some embodiments, the processor uses Neumann perimeter conditions for x, y and periodic perimeter conditions for $\theta$.

In one example, the processor localizes the robot with position coordinate $q=(x,y)$ and momentum coordinate $p=(p_x,p_y)$. For simplification, the mass of the robot is 1.0, the earth is assumed to be planar, and q is a position with reference to some arbitrary point and distance. Thus, the processor evolves the probability density $\rho$ over time according to $$\frac{\partial \rho}{\partial t} = -p \cdot \nabla_q \rho + \nabla_p \cdot (D\nabla_p \rho),$$

$(D\nabla_p \rho)$, wherein D is as defined above. The processor uses a moving grid, wherein the general location of the robot is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval $[-15, 15]\times[-15, 15]$, corresponding to maximum speed of 15 m/s in each spatial direction. The processor uses velocity and GPS position observations to increase accuracy of approximated localization of the robot. Velocity measurements provide no information on position, but provide information on $p_x^2+p_y^2$, the circular probability distribution in the p space, with $|p|=10$ and large uncertainty. GPS position measurements provide no direct momentum information but provides a position density. The processor further uses a map to exclude impossible states of the robot. For instance, it is impossible to drive through walls and if the velocity is high there is a higher likelihood that the robot is in specific areas. A map indicating low object density areas and high object density areas may be used by the processor, wherein the maximum speed in high object density areas is ±5 m/s. In combining the map information with the velocity observations, the processor determines that it is highly unlikely that with an odometry measurement of |p|=10 that the robot is in a position with high object density. In some embodiments, other types of information may be used to improve accuracy of localization. For example, a map to correlate position and velocity, distance to and probability density of other robots using similar technology, Wi-Fi map to extract position, and video footage to extract position. For example, the processor of the robot may receive phase space probability distributions of other robots and exclude or reduce the likelihood of the robot being located at positions that other robots have high likelihood of being positioned at.

In some embodiments, the processor uses finite differences methods (FDM) to numerically approximate partial differential equations of the form $$\frac{\partial \rho}{\partial t} = -\{p, H\} + \nabla_p \cdot (D\nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x,t) with velocity v, diffusion coefficient a, $$\frac{\partial u}{\partial t} = a\frac{\partial^2 u}{\partial x^2} - v\frac{\partial u}{\partial x}$$

on a mesh $x_0, \ldots, x_j$, and times $t_0, \ldots, t_N$ may be approximated by a recurrence equation of the form $$\frac{u_j^{n+1} - u_j^n}{k} = a\frac{u_{j+1}^n - 2u_j^n + u_{j-1}^n}{h^2} - v\frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2}, \text{ and}$$

$$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $t_{n+1/2}$, the recurrence equation is $$\frac{u_j^{n+1} - u_j^n}{k} = \frac{1}{2}\left(a\frac{u_{j+1}^{n+1} - 2u_j^{n+1} + u_{j-1}^{n+1}}{h^2} - v\frac{u_{j+1}^{n+1} - u_{j-1}^{n+1}}{2h} + a\frac{u_{j+1}^n - 2u_j^n + u_{j-1}^n}{h^2} - v\frac{u_{j+1}^n - u_{j-1}^n}{2h}\right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a\frac{u_{j+1}^{n+1} - 2u_j^{n+1} + u_{j-1}^{n+1}}{h^2} - v\frac{u_{j+1}^{n+1} - u_{j-1}^{n+1}}{2h},$$

which is unconditionally stable for a time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{p, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $L=-\{\bullet,H\}+\nabla_p\cdot(D\nabla_p)$. The processor discretizes the abstract equation in space (e.g., by FEM or $$FDM) \frac{\partial \overline{\rho}}{\partial t} = \overline{L}\overline{\rho},$$

wherein $\overline{\rho}, \overline{L}$ are the projections of $\rho$, $L$ on the discretized space. The processor discretizes the equation in time using a numerical time integrator (e.g., Crank-Nicolson)

$$\frac{\overline{\rho}^{n+1} - \overline{\rho}^n}{h} = \frac{1}{2}(\overline{L}\overline{\rho}^{n+1} + \overline{L}\overline{\rho}^{-n}),$$

leading to the equation $$\left(I - \frac{h}{2}\overline{L}\right)\overline{\rho}^{n+1} = \left(I + \frac{h}{2}\overline{L}\right)\overline{\rho}^{-n},$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio of advection to diffusion) is larger than 2 or smaller than −2.

Perimeter conditions are essential in solving the partial differential equations. Perimeter conditions are a set of constraints that determine what happens at the perimeters of the domain while the partial differential equation describes the behaviour within the domain. In some embodiments, the processor uses one or more the following perimeter conditions: reflecting, zero-flux (i.e., homogenous Neumann perimeter conditions)

$$\frac{\partial \rho}{\partial \vec{n}} = 0 \text{ for } p, q \in \partial D, \vec{n}$$

$\vec{n}$ unit normal vector on perimeters; absorbing perimeter conditions (i.e., homogenous Dirichlet perimeter conditions) $\rho=0$ for p, $q \in \partial D$; and constant concentration perimeter conditions (i.e., Dirichlet) $\rho=\rho_0$ for p,$q \in \partial D$. To integrate the perimeter conditions into FDM, the processor modifies the difference equations on the perimeters, and when using FEM, they become part of the weak form (i.e., integration by parts) or are integrated in the solution space. In some embodiments, the processor uses Fenics for an efficient solution to partial differential equations.

In some embodiments, the processor uses quantum methods to localize the robot. In some embodiments, the processor of the robot may determine a probability density over all possible states of the robot using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\Psi(\vec{r},t)|^2$. In some embodiments, the processor of the robot normalizes the wave function which is equal to the total probability of finding the particle, or in this case the robot, somewhere. The total probability of finding the robot somewhere adds up to unity $\int|\Psi(\vec{r},t)|^2 dr=1$. In some embodiments, the processor of the robot may apply Fourier transform to the wave function $\Psi(\vec{r},t)$ to yield the wave function $\Phi(\vec{r},t)$ in the momentum space, with associated momentum probability distribution $\sigma(\vec{p},t)=|\Phi(\vec{p},t)|^2$. In some embodiments, the processor may evolve the wave function $\Psi(\vec{r},t)$ using Schrödinger equation $$i\hbar \frac{\partial}{\partial t} \Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, $\hbar$ is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$, explaining why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function $$\left(\text{e.g., }\Psi(\vec{r},\ t) = \Phi(\vec{r})e^{-\frac{iEt}{\hbar}}\right),$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r},t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $\varphi_k$, $$|c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\Psi(\vec{r},t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int\phi^*\psi d\tau=\langle\phi|\cdot|\psi\rangle\equiv\langle\phi|\psi\rangle$. In some embodiments, $\langle\phi|$ and $|\psi\rangle$ are state vectors of a system and the processor determines the probability of finding $\langle\phi|$ in state $|\psi\rangle$ using $p(\langle\phi|,|\psi\rangle)=|\langle\phi|\psi\rangle|^2$. For a Hermitian operator $\hat{A}$ eigenkets and eigenvalues are denoted $\hat{A}|n\rangle=a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|\hat{A}=\langle n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor determines the probability of obtaining $a_n$ as an outcome of a measurement of A using $p(a_n)=|\langle n|\phi\rangle|^2$. In some embodiments, the processor evolves the time-dependent Schrodinger equation using $$i\hbar\frac{\partial|\psi\rangle}{\partial t} = \hat{H}|\psi\rangle.$$

Given a state $|\phi\rangle$ and a measurement of the observable A, the processor determines the expectation value of A using $\langle A\rangle=\langle\phi|A|\phi\rangle$, corresponding to $$\langle A\rangle = \frac{\int\phi^*\hat{A}\phi d\tau}{\int\phi^*\phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robot, the processor evolves the wave function $\Psi(\vec{r},t)$ using the Schrodinger equation $$i\hbar\frac{\partial}{\partial t}\Psi(\vec{r},t) = \left[-\frac{\hbar^2}{2m}\nabla^2 + V(\vec{r})\right]\Psi(\vec{r},t).$$

In some embodiments, a solution is written in terms of eigenfunctions $\psi_n$ with eigenvalues $E_n$ of the time-independent Schrodinger equation $H\psi_n=E_n\psi_n$, wherein $\Psi(\vec{r},t)=\Sigma_{c_n}c_n e^{-iE_n t/\hbar}\psi_n$ and $c_n=\int\Psi(\vec{r},0)\psi_n^* dr$. In some embodiments, the time evolution is expressed as a time evolution via a unitary operator U(t), $\Psi(\vec{r},t)=U(t)\Psi(\vec{r},0)$ wherein $U(t)=e^{-iHt/\hbar}$. In some embodiments, the probability density may be updated by the processor of the robot each time an observation or measurement is received by the processor of the robot. For each observation with observation operator A the processor of the robot may perform an eigen-decomposition $A\omega_n=a_n\omega_n$, wherein the eigenvalue corresponds to the observed quantity. In some embodiments, the processor observes a value a with probability $0\le p\le 1$. In some embodiments, wherein the operator has a finite spectrum or a single eigenvalue is observed, the processor of the robot may collapse to the eigenfunction(s) with corresponding probability $$\Psi(\vec{r},t) \to \gamma\sum_{n=1}^N p(a_n)d_n\omega_n,$$

wherein $d_n=\int\omega_n^*\Psi dr$, p(a) is the probability of observing value a, and $\gamma$ is a normalization constant. In some embodiments, wherein the operator has continuous spectrum, the summation may be replaced by an integration $\Psi(\vec{r},t)\to\gamma\int p(a)d_n\omega_n da$, wherein $d_n=\int\omega_n^*\Psi dr$.

For example, consider a robot confined to move within an interval $$\left[-\frac{1}{2},\frac{1}{2}\right].$$

For simplicity, the processor sets $\hbar=m=1$, and an infinite well potential and the regular kinetic energy term are assumed. The processor solves the time-independent Schrodinger equations, resulting in wave functions $$\psi_n = \begin{cases} \sqrt{2}\sin\left(k_n\left(x-\frac{1}{2}\right)\right)e^{-i\omega_n t}, & -\frac{1}{2} < x < \frac{1}{2} \\ 0, & \text{otherwise} \end{cases},$$

wherein $k_n = n\pi$ and $E_n = \omega_n = n^2\pi^2$. In the momentum space this corresponds to the wave functions $$\phi_n(p,t) = \frac{1}{\sqrt{2\pi}}\int_{-\infty}^{\infty}\psi_n(x,t)e^{-ipx}dx = \frac{1}{\sqrt{\pi}}\frac{n\pi}{n\pi+p}\text{sinc}\left(\frac{1}{2}(n\pi-p)\right).$$

The processor takes suitable functions and computes an expansion in eigenfunctions. Given a vector of coefficients, the processor computes the time evolution of that wave function in eigenbasis. In another example, consider a robot free to move on an x-axis. For simplicity, the processor sets $\hbar=m=1$. The processor solves the time-independent Schrodinger equations, resulting in wave functions $$\psi_E(x,t) = Ae^{\frac{i(px-Et)}{\hbar}},$$

wherein energy $$E = \frac{\hbar^2 k^2}{2m}$$

and momentum $p=\hbar k$. For energy E there are two independent, valid functions with $\pm p$. Given the wave function in the position space, in the momentum space, the corresponding wave functions are $$\phi_E(p,t) = e^{\frac{i(px-Et)}{\hbar}},$$

which are the same as the energy eigenfunctions. For a given initial wave function $\psi(x,0)$, the processor expands the wave function into momentum/energy eigenfunctions $$\phi(p) = \frac{1}{\sqrt{2\pi\hbar}}\int \psi(x,0)e^{-\frac{ipx}{\hbar}}dx,$$

then the processor gets time dependence by taking the inverse Fourier resulting in $$\psi(x,t) = \frac{1}{\sqrt{2\pi\hbar}}\int \phi(p)e^{\frac{ipx}{\hbar}}e^{-\frac{iEt}{\hbar}}dp.$$

An example of a common type of initial wave function is a Gaussian wave packet, consisting of momentum eigenfunctions multiplied by a Gaussian in position space $$\psi(x) = Ae^{-\left(\frac{x}{a}\right)^2}e^{\frac{ip_0 x}{\hbar}},$$

wherein $p_0$ is the wave function's average momentum value and a is a rough measure of the width of the packet. In the momentum space, this wave function has the form $$\phi(p) = Be^{-\left(\frac{a(p-p_0)}{2\hbar}\right)^2},$$

which is a Gaussian function of momentum, centered on $p_0$ with approximate width $2\hbar/a$. Note Heisenberg's uncertainty principle wherein in the position space width is $\sim a$, and in the momentum space is $\sim 1/a$. For example, consider a wave packet at a first time point for $\psi(x)$ and $\phi(p)$, with $x_0, p_0=0$, 2, $\hbar=0.1$, m=1, and a=3. As time passes, the peak moves with constant velocity $$\frac{p_0}{m}$$

and the width of the wave packet in the position space increases. This happens because the different momentum components of the packet move with different velocities. In the momentum space, the probability density $|\phi(p,t)|^2$ stays constant over time.

When modeling the robot using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with $\sigma=0.05$, a strong assumption that the momentum is 2.5. Since the observation operator is the momentum operators, the wave function expressed in terms of the eigenfunctions of the observation operator is $\phi(p,t)$. The processor projects $\phi(p,t)$ into the observation space with probability $f$ by determining $\tilde{\phi}(p,t)=f(p)\phi(p,t)$. The processor normalizes the updated $\tilde{\phi}$ and takes the inverse Fourier transform to obtain the wave function in the position space. In this example, the wave function in the position space concludes that the position has spread further out from the original wave function in the position space. This is unexpected after observing a very narrow momentum density, however, this effect is due to Heisenberg's uncertainty principle. With decreasing $\hbar$ this effect diminishes. Similar to observing momentum, position may also be observed and incorporated.

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robot navigates along a one-dimensional floor that includes three doors at doors at $x_0=-2.5$, $x_1=0$, and $x_2=5.0$, the processor of the robot is capable of determining when it is located at a door based on sensor data observe, and the momentum of the robot is constant, but unknown. Initially the location of the robot is unknown, therefore the processor generates initial wave functions of the state. When the processor determines the robot is in front of a door, the possible position of the robot is narrowed down to three possible positions, but not the momentum. The processor evolves the wave functions with a Hamiltonian operator, and after five seconds the wave functions show that the position space has spread out again given that the momentum is unknown. However, the evolved probability density keeps track of the correlation between position and momentum. When the processor determines the robot is in front of a door again, the wave functions are updated, wherein the wave functions have significantly narrowed down, indicating a number of peaks representing possible position and momentum combinations of the robot. And in fact, if the processor observes another observation, such as momentum $p=1.0$ at $t=5.0$, the wave function in the position space also collapses to the only remaining possible combination, the location near $x=5.0$. The processor collapses the momentum wave function accordingly. Also, the processor reduces the position wave function to a peak at $x=5.0$. Given constant momentum, the momentum observation of $p=1.0$, and that the two door observations were 5 seconds apart, the position $x=5.0$ is the only remaining valid position hypothesis.

In some embodiments, the processor of the robot considers multiple possible scenarios wherein the robot is located in other likely locations in addition to the location estimated by the processor. As the robot moves within the environment, the processor gains information of its surroundings from sensory devices (local and/or remote) which it uses to eliminate less likely scenarios. For example, consider the processor of a robot estimating itself to be 100 cm away from a wall. To account for measurement noise the processor considers additional likely scenarios wherein the robot is, for example, 102, 101, 99 and 98 cm away from the wall. The processor considers these scenarios as possibly being the actual true distance from the wall and therefore reduces the speed of the robot after traveling 98 cm towards the wall. If the robot does not bump into the wall after traveling 98 cm towards the wall it eliminates the possibility of it having been 98 cm away from the wall and the likelihood of the robot being 99, 100, 101 and 102 cm away from the wall increases. This way as the robot travels within the environment, the processor adjusts its confidence of its location with respect to other robots and the environment based on observations and information gained of the surroundings. In some cases, such a method reduces collisions. In an alternative visualization of this approach the processor inflates the surface area occupied by the robot such that it is hypothesized that the robot occupies all state spaces falling within the borders of the inflated surface area. Since the error of perceived position of the robot increases with movement, the processor inflates the surface area occupied by the robot with every movement. The processor deflates the surface area occupied by the robot when occupancy of a hypothesized state space falling within the borders of the surface area is proven to be false, thereby reducing the number of state spaces and hence area occupied by the robot. In this example, wherein the surface area occupied by the robot is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc. In some embodiments, the processor adjusts the shape of the area within which the robot is assumed to be located within based on deviation between the measured and true heading and translation of the robot as it moves. In some embodiments, the processor uses information on linear and angular undershoot and overshoot to help determine the shape of the area within which the robot is assumed to be located within. Force is needed to cause linear and angular acceleration and a given amount of force can either be spent on linear overshooting or angular overshooting. If the robot overshoots linearly it undershoots angularly and vice versa.

In some embodiments, wherein the state of the robot within a space is initially unknown, the processor of the robot may generate a uniform probability distribution over the space. In other instances, any other probability distribution may be generated depending on the information known about the state of the robot and the certainty of the information. Over time and as more measurements and observations are received by the processor of the robot, the probability distribution over all possible states of the robot in the space evolves.

In some embodiments, the processor uses quantum refining. In some embodiments, the processor simulates multiple robots located in different possible locations within the environment. In some embodiments, the processor may view the environment from the perspective of each different simulated robot. In some embodiments, the collection of simulated robots form an ensemble. In some embodiments, the processor evolves the location of each simulated robot or the ensemble over time. In some embodiments, the processor evolves the ensemble according to an equation of motion as described above. In some embodiments, the range of movement of each simulated robot may be different. In some embodiments, the processor may view the environment from the FOV of each simulated robot, each simulated robot having a slightly different map of the environment based on their simulated location and FOV. In some embodiments, the collection of simulated robots form an approximate region within which the robot is truly located. In some embodiments, the true location of the robot is one of the simulated robots. In some embodiments, when a measurement of the environment is taken, the processor checks the measurement of the environment against the map of the environment of each of the simulated robots. In some embodiments, the processor predicts the robot is truly located in the location of the simulated robot having a map that best matches the measurement of the environment. In some embodiments, the simulated robot which the processor believes to be the true robot may change or may remain the same as new measurements are taken and the ensemble evolves over time. In some embodiments, the ensemble of simulated robots remain together as the ensemble evolves over time. In some embodiments, the overall energy of the collection of simulated robots remains constant in each timestamp, however the distribution of energy to move each simulated robot forward during evolution may not be distributed evenly among the simulated robots. For example, in one instance a simulated robot may end up much further away than the remaining simulated robots or too far to the right or left, however in future instances and as the ensemble evolves, may become close to the group of simulated robots again. In some embodiments, the ensemble evolves to most closely match the sensor readings, such as a gyroscope or optical sensor. In some embodiments, the evolution of the locations of simulated robots is limited based on characteristics of the physical robot. For example, a robot may have limited speed and limited rotation of the wheels, therefor it would be impossible for the robot to move two meters, for example, in between time steps. In another example, the robot may only be located in areas of an environment where objects do not exist. In some embodiments, this method of quantum refining may be used to hold back certain elements or modify the overall understanding of the environment. For example, when the processor examines a total of ten simulated robots one by one against a measurement, and selects one simulated robot as the true robot, the processor filters out nine simulated robots, thus filtering ten quanta to one quantum.

In some embodiments, the FOV of each simulated robot may not include the exact same features as one another. In some embodiments, the processor saves the FOV of each of the simulated robots in memory. In some embodiments, the processor combines the FOV of each simulated robot to create a FOV of the ensemble using methods such as least squares methods. This method is described above for creating a map by aligning sensor data to create one representation of the environment, which may be more accurate than each individual FOV. In some embodiments, the processor tracks the FOV of each of the simulated robots individually and the FOV of the entire ensemble. In some embodiments, other methods may be used to create the FOV of the ensemble (or a portion of the ensemble). For example, a classifier AI algorithm may be used, such as Naive Bayes classifier, least squares support vector machines, k-nearest neighbor, decision trees, and neural networks. In some embodiments, more than one FOV of the ensemble may be generated and tracked by the processor, each FOV created using a different method. For example, the processor may track the FOV of ten simulated robots and ten differently generated FOVs of the ensemble. At each measurement timestamp, the processor may examine the measurement against the FOV of the ten simulated robots and/or the ten differently generated FOVs of the ensemble and may choose any of these 20 possible FOVs as the ground truth. In some embodiments, the processor may examine the 20 FOVs instead of the FOVs of all the simulated robots and choose a derivative as the ground truth. The number of simulated robots and/or the number of generated FOVs may vary. During mapping for example, the processor may take a first field of view of the camera and calculate a FOV for the ensemble or each individual observer (simulated robot) within the ensemble and combine it with the second field of view captured by the camera or the FOV of the ensemble or each individual observer within the ensemble. In some embodiments, the processor switches between the FOV of each observer (e.g., like multiple CCTV cameras in an environment that an operator may switch between) and/or one or more FOVs of the ensemble and chooses the FOVs that are more probable to be close to ground truth. At each time iteration, the FOV of each observer and/or the ensemble evolves into being closer to ground truth.

In some embodiments, simulated robots may be divided in two or more classes. For example, simulated robots may be classified based on their reliability, such as good reliability, bad reliability, or average reliability or based on their speed, such as fast and slow. Classes that move to a side a lot may be used. Any classification system may be created, such as linear classifiers like Fisher's linear discriminant, logistic regression, Naive Bayes classifier and perceptron, support vector machines like least squares support vector machines, quadratic classifiers, kernel estimation like k-nearest neighbor, boosting (meta-algorithm), decision trees like random forests, neural networks, and learning vector quantization. In some embodiments, each of the classes evolve differently. For example, for fast speed and slow speed classes, each of the classes moves differently wherein the simulated robots in the fast class will move very fast and will be ahead of the other simulated robots in the slow class that move slower and fall behind. For example, given a gyroscope that shows two meters of movement and classes X, Y, and Z, at each evolution over time, class X moves the fastest, and hence furthest, as it belongs to the fastest speed class. In other words, when a force is applied at each time stamp to evolve the classes over time, the force moves class X more than the rest of the classes. This may be due to class X being lighter than the rest of the simulated robots. The kind and time of evolution may have different impact on different simulated robots within the ensemble. The evolution of the ensemble as a whole may or may not remain the same. The ensemble may be homogenous or non-homogenous.

In some embodiments, samples are taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the robot increases, more samples are taken. Or more samples are taken when the robot is traveling on rough terrain. In a machine learned system, the frequency of sampling may depend on predicted drift. For example, if in previous timestamps the measurements taken indicate that the robot has reached the intended position fairly well, the frequency of sampling is reduced. In some embodiments, the above explained dynamic system may be equally used to determine the size of the ensemble. If, for example, in previous timestamps the measurements taken indicate that the robot has reached the intended position fairly well, a smaller ensemble may be used to correct the knowledge of where the robot is. In some embodiments, the ensemble is regenerated at each interval. In some embodiments, a portion of the ensemble is regenerated. In some embodiments, a portion of the ensemble that is more likely to depict ground truth may be preserved and the other portion regenerated. In some embodiments, the ensemble may not be regenerated but one of the observers (simulated robots) in the ensemble that is more likely to be ground truth is chosen as the most feasible representation of the true robot. In some embodiments, observers (simulated robots) in the ensemble take part in becoming the most feasible representation of the true robot based on how their individual description of the surrounding fits with the measurement taken.

In some embodiments, the processor generates an ensemble of hypothetical positions of various simulated robots within the environment. In some embodiments, the processor generates a simulated representation of the environment for each hypothetical position of the robot from the perspective corresponding with each hypothetical position. In some embodiments, the processor compares a measurement (e.g., from a local or remote source) against each simulated representation of the environment (e.g., a floor type map, a spatial map, a Wi-Fi map, etc.) corresponding with a perspective of each of the hypothetical positions of the robot. In some embodiments, the processor chooses the hypothetical position of the robot that makes the most sense as the most feasible position of the robot. In some embodiments, the processor selects additional hypothetical positions of the robot as a backup to the most feasible position of the robot. In some embodiments, the processor nominates one or more hypothetical positions as a possible leader or otherwise a feasible position of the robot. In some embodiments, the processor nominates a hypothetical position of the robot as a possible leader when the measurement fits well with the simulated representation of the environment corresponding with the perspective of the hypothetical position. In some embodiments, the processor defers a nomination of a hypothetical position to other hypothetical positions of the robot. In some embodiments, the hypothetical positions with the highest numbers of deferrals are chosen as possible leaders. In some embodiments, the process of comparing measurements to simulated representations of the environment corresponding with the perspectives of different hypothetical positions of the robot, nominating hypothetical positions as possible leaders, and choosing the hypothetical position that is the most feasible position of the robot may be iterative. In some cases, the processor selects the hypothetical position with the lowest deviation between the measurement and the simulated representation of the environment corresponding with the perspective of the hypothetical position as the leader. In some embodiments, the processor stores one or more hypothetical positions that are not elected as leader for another round of iteration after another movement of the robot. In other cases, the processor eliminates one or more hypothetical positions that are not elected as leader or eliminates a portion and stores a portion for the next round of iteration. In some cases, the processor chooses the portion of the one or more hypothetical positions that are stored based on one or more criteria (e.g., amount of deviation between the measurement and representation of the environment). In some cases, the processor chooses the portion of hypothetical positions that are stored randomly and based on one or more criteria. In some cases, the processor eliminates some of the hypothetical positions of the robot that pass the one or more criteria. In some embodiments, the processor evolves the ensemble of hypothetical positions of the robot similar to a genetic algorithm. In some embodiments, the processor uses a Markov Decision Process (MDP) to reduce the error between the measurement and the representation of the environment corresponding with each hypothetical position over time, thereby improving the chances of each hypothetical position becoming or remaining leader. In some cases, the processor applies game theory to the hypothetical positions of the robots, such that hypothetical positions compete against one another in becoming or remaining leader. In some embodiments, hypothetical positions compete against one another and the ensemble becomes an equilibrium wherein the leader following a policy (e.g., policy a in a MDP) remains leader while the other hypothetical positions maintain their current positions the majority of the time.

The multi-dimensionality in localization described above provides robustness that may be useful in various applications. In some embodiments, the processor uses localization for controlling the operation, settings, and functionality of the robot. For example, the processor uses localization to control the behavior of the robot in different areas, where for instance, certain functions or settings are desired for different environments. These functions or settings may be triggered once the processor has localized the robot against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robot. If the processor localizes the robot against a perimeter, for example, it may choose to select a path along the perimeter or it may trigger a polymorphic or other type of path planning algorithm. Or, localizing the robot against a perimeter may trigger a path planning algorithm.

In some embodiments, the processor may correct uncertainties as they accumulate during localization. In some embodiments, the processor may use second, third, fourth, etc. different type of measurements to make corrections at every state. For instance, measurements for a LIDAR, depth camera, or CCD camera may be used to correct for drift caused by errors in the reading stream of a first type of sensing. While the method by which corrections are made may be dependent on the type of sensing, the overall concept of correcting an uncertainty caused by actuation using at least one other type of sensing remains the same. For example, measurements collected by a distance sensor may indicate a change in distance measurement to a perimeter or obstacle, while measurements by a camera may indicate a change between two captured frames. While the two types of sensing differ, they may both be used to correct one another for movement. In some embodiments, some readings may be time multiplexed. For example, two or more IR or TOF sensors operating in the same light spectrum may be time multiplexed to avoid cross-talk. In some embodiments, the processor may combine spatial data indicative of the position of the robot within the environment into a block and may processor the spatial data as a block. This may be similarly done with a stream of data indicative of movement of the robot. In some embodiments, the processor may use data binning to reduce the effects of minor observation errors and/or reduce the amount of data to be processed. The processor may replace original data values that fall into a given small interval, i.e. a bin, by a value representative of that bin (e.g., the central value). In image data processing, binning may entail combing a cluster of pixels into a single larger pixel, thereby reducing the number of pixels. This may reduce the amount data to be processor and may reduce the impact of noise.

In some embodiments, the processor of the robot may use depth measurement and/or color to localize, as described in U.S. patent application Ser. No. 16/920,328, the entire contents of which are hereby incorporated by reference.

In some embodiments, the processor of a robot may fail in a localization capacity and may not recognize where the robot is located in the environment. In some embodiments, if localization fails, the robot may begin a new mapping of the environment, operating in a new functional and mapping capacity, visiting each area, such as, each room, and mapping these areas beginning with the area in which localization first failed. In some embodiments, the failure of localization may include the loss of data pertaining to the location of the robot's initial navigational starting point, such as the location of a charging station of the robot to which the robot returns following each work session. In some embodiments, when localization fails the processor of the robot may immediately begin to search for the charging station. In some embodiments, when localization fails the robot may operate and the processor may map areas while simultaneously searching for the charging station. In some embodiments, when localization fails the robot may complete a work session while the processor maps the environment, and return to each area after the work session to search for the charging station. In some embodiments, the processor of the robot may search for the charging station by searching for an IR light emitted by a transmitter of the charging station to be received by the robot which will signal the robot to return to the charging station. In some embodiments, the processor of the robot may search for a charging station by rotating in 360 degrees in each area until a signal from the charging station is received by the robot. In some embodiments, if the robot does not detect a signal from the charging station in an area, the robot may automatically navigate to a different area. In some embodiments, if the robot detects a signal from the charging station in an area, the robot may automatically cease operations and navigate directly to the charging station. In some embodiments, if the robot detects a signal from the charging station in an area, the robot may navigate to a new area before navigating back to the charging station. In some embodiments, if the charging station is detected by the processor of the robot, and the robot thereafter navigates to a new area, a path plan may be set by the processor for navigating back to the charging station. In some embodiments, if a first robot's localization fails, a processor of the first robot may communicate with a centralized control system, a charging station, or processors of other robots or devices to assist with the processor recovering a localization capacity. For example, if a first robot's localization fails, a processor of the first robot may send out, for example, a distress signal indicating that it has lost localization, and a processor of a second robot, may share data such as maps or other beneficial data with the processor of the first robot to assist with recovering some form of a localization capacity. In an additional example, if the localization capacity of the processor of the robot fails, the processor may communicate with a centralized control system, charging station, or processors of other robots or devices to attempt to recover data such as maps or other beneficial data to assist the with recovering some form of a localization capacity. In some embodiments, when localization fails, the robot may detect and mark obstacles encountered in the environment within a new map generated during the work session as the robot navigates in the environment. In some embodiments, features of the charging station may be used by the processor of the robot to distinguish the charging station when searching for the charging station (e.g., unique angles, physical characteristics, printing, painting, patterns, and the like). Further details describing embodiments of localization failure and actions triggered as a result are disclosed in U.S. patent application Ser. No. 16/920,328, the entire contents of which is hereby incorporated by reference.

In some embodiments, the processor of the robot may attempt to regain its localization after losing the localization of the robot. In some embodiments, the processor of the robot may attempt to regain localization multiple times using the same method or alternative methods consecutively. In some embodiments, the processor of the robot may attempt methods that are highly likely to yield a result before trying other, less successful methods. In some embodiments, the processor of the robot may restart mapping and localization if localization cannot be regained.

In some embodiments, the processor associates properties with each room as the robot discovers rooms one by one. In some embodiments, the properties are stored in a graph or a stack, such the processor of the robot may regain localization if the robot becomes lost within a room. For example, if the processor of the robot loses localization within a room, the robot may have to restart coverage within that room, however as soon as the robot exits the room, assuming it exits from the same door it entered, the processor may know the previous room based on the stack structure and thus regain localization. In some embodiments, the processor of the robot may lose localization within a room but still have knowledge of which room it is within. In some embodiments, the processor may execute a new re-localization with respect to the room without performing a new re-localization for the entire environment. In such scenarios, the robot may perform a new complete coverage within the room. Some overlap with previously covered areas within the room may occur, however, after coverage of the room is complete the robot may continue to cover other areas of the environment purposefully. In some embodiments, the processor of the robot may determine if a room is known or unknown. In some embodiments, the processor may compare characteristics of the room against characteristics of known rooms. For example, location of a door in relation to a room, size of a room, or other characteristics may be used to determine if the robot has been in an area or not. In some embodiments, the processor adjusts the orientation of the map prior to performing comparisons. In some embodiments, the processor may use various map resolutions of a room when performing comparisons. For example, possible candidates may be short listed using a low resolution map to allow for fast match finding then may be narrowed down further using higher resolution maps. In some embodiments, a full stack including a room identified by the processor as having been previously visited may be candidates of having been previously visited as well. In such a case, the processor may use a new stack to discover new areas. In some instances, graph theory allows for in depth analytics of these situations.

In some embodiments, the robot may be unexpectedly pushed while executing a movement path. In some embodiments, the robot senses the beginning of the push and moves towards the direction of the push as opposed to resisting the push. In this way, the robot reduces its resistance against the push. In some embodiments, as a result of the push, the processor may lose localization of the robot and the path of the robot may be linearly translated and rotated. In some embodiments, increasing the IMU noise in the localization algorithm such that large fluctuations in the IMU data are acceptable may prevent an incorrect heading after being pushed. Increasing the IMU noise may allow large fluctuations in angular velocity generated from a push to be accepted by the localization algorithm, thereby resulting in the robot resuming its same heading prior to the push. In some embodiments, determining slippage of the robot may prevent linear translation in the path after being pushed. In some embodiments, an algorithm executed by the processor may use optical tracking sensor data to determine slippage of the robot during the push by determining an offset between consecutively captured images of the driving surface. The localization algorithm may receive the slippage as input and account for the push when localizing the robot. In some embodiments, the processor of the robot may relocalize the robot after the push by matching currently observed features with features within a local or global map.

In some embodiments, the robot may not begin performing work from a last location saved in the stored map. Such scenarios may occur when, for example, the robot is not located within a previously stored map. For example, a robot may clean a first floor of a two-story home, and thus the stored map may only reflect the first floor of the home. A user may place the robot on a second floor of the home and the processor may not be able to locate the robot within the stored map. The robot may begin to perform work and the processor may build a new map. Or in another example, a user may lend the robot to another person. In such a case, the processor may not be able to locate the robot within the stored map as it is located within a different home than that of the user. Thus, the robot begins to perform work. In some cases, the processor of the robot may begin building a new map. In some embodiments, a new map may be stored as a separate entry when the difference between a stored map and the new map exceeds a certain threshold. In some embodiments, a cold-start operation includes fetching N maps from the cloud and localizing (or trying to localize) the robot using each of the N maps. In some embodiments, such operations are slow, particularly when performed serially. In some embodiments, the processor uses a localization regain method to localize the robot when cleaning starts. In some embodiments, the localization regain method may be modified to be a global localization regain method. In some embodiments, fast and robust localization regain method may be completed within seconds. In some embodiments, the processor loads a next map after regaining localization fails on a current map and repeats the process of attempting to regain localization. In some embodiments, the saved map may include a bare minimum amount of useful information and may have a lowest acceptable resolution. This may reduce the footprint of the map and may thus reduce computational, size (in terms of latency), and financial (e.g., for cloud services) costs.

In some embodiments, the processor may ignore at least some elements (e.g., confinement line) added to the map by a user when regaining localization in a new work session. In some embodiments, the processor may not consider all features within the environment to reduce confusion with the walls within the environment while regaining localization.

In embodiments, wherein the processor of the robot loses localization of the robot, the processor may re-localize (e.g., globally or locally) using stored maps (e.g., on the cloud, SDRAM, etc.). In some embodiments, maps may be stored on and loaded from an SDRAM as long as the robot has not undergone a cold start or hard reset. In some embodiments, all or a portion of maps may be uploaded to the cloud, such that when the robot has undergone a cold start or hard reset, the maps may be downloaded from the cloud for the robot to re-localize. In some embodiments, the processor executes algorithms for locally storing and loading maps to and from the SDRAM and uploading and downloading maps to and from the cloud. In some embodiments, maps may be compressed for storage and decompressed after loading maps from storage. In some embodiments, storing and loading maps on and from the SDRAM may involve the use of a map handler to manage particular contents of the maps and provide an interface with the SDRAM and cloud and a partition manager for storing and loading map data. In some embodiments, compressing and decompressing a map may involve flattening the map into serialized raw data to save space and reconstructing the map from the raw data. In some embodiments, protocols such as AWS S3 SDK or https may be used in uploading and downloading the map to and from the cloud. In some embodiments, a filename rule may be used to distinguish which map file belongs to each client. In some embodiments, the processor may print the map after loss of localization with the pose estimate at the time of loss of localization and save the confidence of position just before loss of localization to help with re-localization of the robot.

In some embodiments, upon losing localization, the robot may drive to a good spot for re-localization and attempt to re-localize. This may be iterated a few times. If re-localization fails and the processor determines that the robot is in unknown terrain, then the processor may instruct the robot to attempt to return to a known area, map build, and switch back to coverage and exploration. If the re-localization fails and the processor determines the robot is in known terrain, the processor may locally find a good spot for localization, instruct the robot to drive there, attempt to re-localize, and continue with the previous state if re-localization is successful. In some embodiments, the re-localization process may be three-fold: first a scan match attempt using a current best guess from the EKF may be employed to regain localization, if it fails, then local re-localization may be employed to regain localization, and if it fails, then global re-localization may be employed to regain localization. In some embodiments, the local and global re-localization methods may include one or more of: generating a temporary map, navigating the robot to a point equidistant from all obstacles, generating a real map, coarsely matching (e.g., within approximately 1 m) the temporary or real map with a previously stored map (e.g., local or global map stored on the cloud or SDRAM), finely matching the temporary or real map with the previously stored map for re-localization, and resuming the task. In some embodiments, the global or local re-localization methods may include one or more of: building a temporary map, using the temporary map as the new map, attempting to match the temporary map with a previously stored map (e.g., global or local map stored on the cloud or SDRAM) for re-localization, and if unsuccessful, continuing exploration. In some cases, a hidden exploration may be executed (e.g., some coverage and some exploration). In some embodiments, the local and global re-localization methods may determine the best matches within the local or global map with respect to the temporary map and pass them to a full scan matcher algorithm. If the full scan matcher algorithm determines a match is successful then the observed data corresponding with the successful match may be provided to the EKF and localization may thus be recovered.

In some embodiments, a matching algorithm may down sample the previously stored map and temporary map and sample over the state space until confident enough. In some embodiments, the matching algorithm may match structures of free space and obstacles (e.g., Voronoi nodes, structure from room detection and main coverage angle, etc.). In some embodiments, the matching algorithm may use a direct feature detector from computer vision (e.g., FAST, SURF, Eigen, Harris, MSER, etc.). In some embodiments, the matching algorithm may include a hybrid approach. The first prong of the hybrid approach may include feature extraction from both the previously saved map and the temporary map. Features may be corners in a low resolution map (e.g., detected using any corner detector) or walls as they have a location and an orientation and features used must have both. The second prong of the hybrid approach may include matching features from both the previously stored map and the temporary map and using features from both maps to exclude large portions of the state space (e.g., using RMS score to further select and match). In some cases, the matching algorithm may include using a coarser map resolution to reduce the state space, and then adaptively refining the maps for only those comparisons resulting in good matches (e.g., down sample to map resolutions of 1 m or greater). Good matches may be kept and the process may be repeated with a finer map resolution. In some embodiments, the matching algorithm may leverage the tendency of walls to be at right angles to one other. In some cases, the matching algorithm may determine one of the angles that best orients the major lines in the map along parallel and perpendicular lines to reduce the rotation space. For example, the processor may identify long walls and their angle in the global or local map and use them to align the temporary map. In some embodiments, the matching algorithm may employ this strategy by convolving each map (i.e., previously stored global or local map and temporary) with a pair of perpendicular edge-sensing kernels and a brute search through an angle of 90 degrees using the total intensity of the sum of the convolved images. The processor may then search the translation space independently. In some embodiments, a magnetometer may be used to reduce the number of rotations that need to be tested for matching for faster or more successful results. In some embodiments, the matching algorithm may include three steps. The first step may be a feature extraction step including using a previously stored map (e.g., global or local map stored on the cloud or SDRAM) and a partial map at a particular resolution (e.g., 0.2 m resolution), pre-cleaning the previously stored map, and using tryToOrder and Ramer-Douglas-Puecker simplifications (or other simplifications) to identify straight walls and corners as features. The second step may include coarse matching and a refinement step including brute force matching features in the previously stored map and the partial map starting at a particular resolution (e.g., 0.2 m or 0.4 m resolution), and then adaptively refining. Precomputed, low-resolution, obstacle-only matching may be used for this step. The third step may include the transition into a full scan matcher algorithm.

In some embodiments, the processor may re-localize the robot (e.g., globally or locally) by generating a temporary map from a current position of the robot, generating seeds for a seed set by matching corner and wall features of the temporary map and a stored map (e.g., global or local maps stored in SDRAM or cloud), choosing the seeds that result in the best matches with the features of the temporary map using a refining sample matcher, and choosing the seed that results in the best match using a full scan matcher algorithm. In some embodiments, the refining sample matcher algorithm may generate seeds for a seed set by identifying all places in the stored map that may match a feature (e.g., walls and corners) of the temporary map at a low resolution (i.e., down sampled seeds). For example, the processor may generate a temporary partial map from a current position of the robot. If the processor observes a corner at 2 m and 30 degrees in the temporary map, then the processor may add seeds for all corners in the stored map with the same distance and angle. In some embodiments, the seeds in local and global re-localization (i.e., re-localization against a local map versus against a global map) are chosen differently. For instance, in local re-localization, all points within a certain radius at a reasonable resolution may be chosen as seed. While for global re-localization, seeds may be chosen by matching corners and walls (e.g., to reduce computational complexity) as described above. In some embodiments, the refining sample matcher algorithm may iterate through the seed set and keep seeds that result in good matches and discard those that result in bad matches. In some embodiments, the refined matching algorithm determines a match between two maps (e.g., a feature in the temporary map and a feature of the stored map) by identifying a number of matching obstacle locations. In some embodiments, the algorithm assigns a score for each seed that reflects how well the seed matches the feature in the temporary map. In some embodiments, the algorithm saves the scores into a score sorted bin. In some embodiments, the algorithm may choose a predetermined percentage of the seeds providing the best matches (e.g., top 5%) to adaptively refine by resampling in the same vicinity at a higher resolution. In some embodiments, the seeds providing the best matches are chosen from different regions of the map. For instance, the seeds providing the best matches may be chosen as the local maximum from clustered seeds instead of choosing a predetermined percentage of the best matches. In some embodiments, the algorithm may locally identify clusters that seem promising, and then only refine the center of those clusters. In some embodiments, the refining sample matcher algorithm may increase the resolution and resample in the same vicinity of the seeds that resulted in good matches at a higher resolution. In some embodiments, the resolution of the temporary map may be different than the resolution of the stored map to which it is compared to (e.g., a point cloud at a certain resolution is matched to a down sampled map at double the resolution of the point cloud). In some embodiments, the resolution of the temporary map may be the same as the resolution of the stored map to which it is compared. In some embodiments, the walls of the stored map may be slightly inflated prior to comparing 1:1 resolution to help with separating seeds that provide good and bad matches earlier in the process. In some embodiments, the initial resolution of maps may be different for local and global re-localization. In some embodiments, local re-localization may start at a higher resolution as the processor may be more confident about the location of the robot while global re-localization may start at a very low resolution (e.g., 0.8 m). In some embodiments, each time map resolution is increased, some more seeds are locally added for each successful seed from the previous resolution. For example, for a map at resolution of 1 m per pixel with successful seed at (0 m, 0 m, 0 degrees) switching to a map with resolution 0.5 m per pixel will add more seeds, for example (0 m, 0 m, 0 degrees), (0.25 m, 0 m, 0 degrees), (0 m, 0.25 m, 0 degrees), (−0.25 m, 0 m, 0 degrees), etc. In some embodiments, the refining scan matcher algorithm may continue to increase the resolution until some limit and there are only very few possible matching locations between the temporary map and the stored map (e.g., global or local maps).

In some embodiments, the refining sample matcher algorithm may pass the few possible matching locations as a seed set to a full scan matcher algorithm. In some embodiments, the full scan matcher algorithm may choose a first seed as a match if the match score or probability of matching is above a predetermined threshold. In some embodiments, the full scan matcher determines a match between two maps using a gauss-newton method on a point cloud. In an example, the refining scan matcher algorithm may identify a wall in a first map (e.g., a map of a current location of the robot), then may match this wall with every wall in a second map (e.g., a stored global map), and compute a translation/angular offset for each of those matches. The algorithm may collect each of those offsets, called a seed, in a seed set. The algorithm may then iterate and reduce the seed set by identifying better matches and discarding worse matches among those seeds at increasingly higher resolutions. The algorithm may pass the reduced seed set to a full scan matcher algorithm that finds the best match among the seed set using gauss-newton method.

Details of localization methods (e.g., data collection, data processing, techniques for localizing the robot, etc.) and/or methods for measuring movement that may be used are described in U.S. patent application Ser. Nos. 16/297,508, 16/418,988, 16/554,040, 15/955,480, 15/425,130, 15/955,344, 16/509,099, 15/410,624, 16/353,019, and 16/504,012, the entire contents of which are hereby incorporated by reference. In embodiments, the mapping and localization methods described herein may be performed in dark areas of the environment based on the type of sensors used that allow accurate data collection in the dark.

For example, in some embodiments, the processor may use data from optoelectronic sensors to localize. In some embodiments, at least two optoelectronic sensors and a light emitting diode (LED) are positioned on the underside of the robot such that the optoelectronic sensors monitor the surface upon which the device drives. In some embodiments, an infrared laser diode or other types of light sources may be used. In some embodiments, the optoelectronic sensors are positioned such that they monitor another portion of the environment, such as the ceiling of the environment or another area. The at least two optoelectronic sensors may be positioned at some distance from one another on the underside of the robot. For example, two optoelectronic sensors may be positioned along a line passing through the center of the robot, each on opposite sides and at an equal distance from the center of the robot. In other instances, the optoelectronic sensors may be positioned differently on the underside of the robot, where for example, they may not be at equal distance from the center of the robot. The LED illuminates the surface upon which the robot drives and the optoelectronic sensors capture images of the driving surface as the robot moves through the environment. The images captured are sent to the processor and a technique such as, digital image correlation (DIC), may be used to determine the linear movement of each of the optoelectronic sensors in the x and y directions. Each optoelectronic sensor has an initial starting location that can be identified with a pair of x and y coordinates and using a technique such as DIC, a second location of each optoelectronic sensor can be identified by the processor by a second pair of x and y coordinates. In some embodiments, the processor detects patterns in images and is able to determine by how much the patterns have moved from one image to another, thereby providing the movement of each optoelectronic sensor in the x and y directions over a time from a first image being captured to a second image being captured. To detect these patterns and movement of each sensor in the x and y directions the processor processes the images using a technique such as cross correlation to determine how much each successive image is offset from the previous one. In some embodiments, finding the maximum of the correlation array between pixel intensities of two images may be used to determine the translational shift in the x-y plane or in the case of a robot, its driving surface plane. Cross correlation may be defined in various ways, such as two-dimensional discrete cross correlation $$r_{ij} = \frac{\Sigma_k \Sigma_l [s(k+i, l+j) - \bar{s}][q(k, l) - \bar{q}]}{\Sigma_k \Sigma_l [s(k, l) - \bar{s}]^2 \Sigma_k \Sigma_l [q(k, l) - \bar{q}]^2},$$

wherein s(k,l) is the pixel intensity at a point (k,l) in a first image and q(k,l) is the pixel intensity of a corresponding point in the translated image. $\bar{s}$ and $\bar{q}$ are the mean values of respective pixel intensity matrices s and q. The coordinates of the maximum $r_{ij}$ gives the pixel integer shift $$(\Delta x, \Delta y) = \underset{(i,j)}{\mathrm{argmax}}\{r\}.$$

In some embodiments, the correlation array may be determined faster using Fourier Transform techniques or other mathematical methods.

Given the movement of each optoelectronic sensor in the x and y directions, the linear and rotational movement of the robot may be determined by the processor. For example, if the robot is only moving linearly without any rotation, the translation of each optoelectronic sensor ($\Delta x, \Delta y$) over a time $\Delta t$ are the same in magnitude and sign and may be assumed to be the translation of the robot as well. If the robot rotates, the linear translations of each optoelectronic sensor determined from their respective images may be used by the processor to determine the rotation angle of the robot. For example, in some instances the robot rotates in place, about an instantaneous center of rotation (ICR) located at its center. This may occur when the velocity of one wheel is equal and opposite to the other wheel (i.e. $v_r = -v_l$, wherein r denotes right wheel and l left wheel). In embodiments wherein two optoelectronic sensors, for example, are placed at equal distances from the center of the robot along a line passing through its center, the magnitude of the translations in the x and y directions of the two optoelectronic sensors are the same and of opposite sign. The translations of either sensor may be used by the processor to determine the rotation angle of the robot about the ICR by applying Pythagorean theorem, given the distance of the sensor to the ICR is known. In embodiments wherein the optoelectronic sensors are placed along a line passing through the center of the robot and are not of equal distance from the center of the robot, translations of each sensor will not be of the same magnitude however, any set of translations corresponding to an optoelectronic sensor, will result in the same angle of rotation when applying Pythagorean theorem.

In some embodiments, the offset amounts at each optoelectronic sensor location may be used by the processor to determine the amount that the robot turned. Examples of determining rotation and linear translation of two optoelectronic sensors positioned on an underside of the robot, and hence the rotation and linear translation of the robot, based on images captured by the optoelectronic sensors as the robot moves from its initial position to a new position is described in U.S. patent application Ser. Nos. 16/554,040, 15/955,480, 15/425,130, and 15/955,344, the entire contents of which is hereby incorporated by reference. The methods of tracking linear and rotational movement of the robot described herein may be supplemental to other methods used for tracking movement and localizing the robot. For example, this method may be used with an optical encoder, gyroscope or both to improve accuracy of the estimated movement or may be used independently in other instances.

In some embodiments, given that the time $\Delta t$ between captured images is known, the linear velocities in the x ($v_x$) and y ($v_y$) directions and angular velocity ($\omega$) of the robot may be estimated by the processor using $$v_x = \frac{\Delta x}{\Delta t}, v_y = \frac{\Delta y}{\Delta t}, \text{ and } \omega = \frac{\Delta \theta}{\Delta t},$$

wherein $\Delta x$ and $\Delta y$ are the translations in the x and y directions, respectively, that occur over time $\Delta t$ and $\Delta \theta$ is the rotation that occurs over time $\Delta t$.

In some embodiments, one optoelectronic sensor may be used to determine linear and rotational movement of the robot using the same methods as described above. The use of at least two optoelectronic sensors is particularly useful when the location of ICR is unknown or the distance between each sensor and the ICR is unknown. However, rotational movement of the robot may be determined using one optoelectronic sensor when the distance between the sensor and ICR is known, such as in the case when the ICR is at the center of the robot and the robot rotates in place or the ICR is at a wheel of the robot and the robot rotates about the wheel.

In some embodiments, the optoelectronic sensors and light source, such as an LED, may be combined into a single unit device with an embedded processor or may be connected to any other separate processor, such as that of the robot. In some embodiments, each optoelectronic sensor has its own light source and in other embodiments optoelectronic sensors may a share light source. In some embodiments, a dedicated image processor may be used to process images and in other embodiments a separate processor coupled to the optoelectronic sensor(s) may be used, such as the processor of the robot. In some embodiments, each optoelectronic sensor, light source and processor may be installed as separate units. In some embodiments, a light source, such as an LED, may not be used.

In some embodiments, two-dimensional optoelectronic sensors may be used. In other embodiments, one-dimensional optoelectronic sensors may be used. In some embodiments, one-dimensional optoelectronic sensors may be combined to achieve readings in more dimensions. For example, to achieve similar results as two-dimensional optoelectronic sensors, two one-dimensional optoelectronic sensors may be positioned perpendicularly to one another. In some instances, one-dimensional and two dimensional optoelectronic sensors may be used together.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used. In some embodiments, a localization and mapping chip or a processing chip such as a CPU or MCU with a localization and mapping processing unit may be used.

In some embodiments, various bumps on a path of the robot may affect the map or localization. In some embodiments, an IMU may be used to measure a bump in the z-axis. In some embodiments, the processor detects a bump when the values in the z-axis suddenly increase beyond a predetermined threshold. In some embodiments, the processor filters out the readings captured while the robot was traversing across the bump. In some embodiments, the processor uses the last known good mapping and localization prior to the robot traversing the bump, generates an ensemble of eight (or another number) hypothesized robots, each hypothesized robot being approximately half a diameter of the robot apart from one another and located within the last known good map around the last known good localization, and determines which hypothesized robot fits best with readings collected after fully traversing over the bump. In some embodiments, the number of hypothesized robots and the distance between the hypothesized robots may vary. In some embodiments, the processor may choose a particular hypothesized robot and generate an ensemble around the hypothesized robot in iterative process until gaining localization back. In some embodiments, these methods may be performed in parallel or done in an iterative process. In some embodiments, the processor of the robot adjusts all of its motors, etc. to on, off, then maximum speed intermittently when the robot becomes stuck. In some embodiments, the processor stops its motors and announces an error code. In some embodiments, the GUI of the robot or an application of a communication device paired with the processor of the robot may suggest that the robot either abort the sweeping or drive back to the dock when the robot is stuck. In some embodiments, the processor adjusts all motors to maximum speed and drives at full speed to overcome being stuck and drives back to the dock when drive back to the dock is selected.

In some embodiments, the robot may attempt to make a determination as to whether or not it has visited a work area previously based on, for example, features of an environment. In some embodiments, a unique characteristic may appear slightly different when identified a second time, and the processor of a robot may need to manipulate the data of the unique characteristic captured in order to determine whether or not the characteristic accurately matches what was previously captured when determining whether or not a work area has previously been operated in. In some embodiments, if the processor of the robot recognizes an area as having been previously visited, the processor may alter the operations or path of the robot. In some embodiments, the robot may be ordered to skip operations in a work area. For example, a button on a user interface of the robot, or an application of a communications device that is paired with the robot may be used to command the processor of the robot to skip operations in a given work area. An example of a communications device includes, but is not limited to, a smart phone, smart watch, laptop, tablet, remote control, or the like. In some embodiments, if the robot enters a work area, the robot may be commanded to leave the work area. In some embodiments, the robot may attempt to return to the work area for operations at a later time. In some embodiments, the robot may be commanded to execute an action at a particular point in a working session. In some embodiments, a selection may be made as to when a work area is to be operated in based on the number of times a button is pressed commanding the robot to skip a work area. In some embodiments, the robot may be commanded to leave an area, where after the robot may attempt to operate in the area during a different operational cycle. In some embodiments, the robot may store data regarding commands to leave a work area and use this data for future operational cycles. In some embodiments, the robot may alter a schedule it has set for recurring services based on commands received to vacate an area. In some embodiments, a command may be set for the robot to vacate an area but to return at an unspecified future time. In some embodiments, a command may be set for the robot to vacate an area but to return at a specified predetermined time. In some embodiments, if a first robot obtains a command to leave a work area, the processor of the first robot may communicate with additional robots for the purposes of sharing this data in order to indicate that other robots should not operate in a given area at a particular time or for the purposes of sharing other data. In some embodiments, the processor of the robot may use historical data with regards to prior work operations when planning an operational session.

In some embodiments, the processor of the robot may fail in a localization capacity and not recognize where it is located in a work environment. In some embodiments, if localization fails, the robot may begin a new mapping of the working environment, operating in a new functional and mapping capacity, visiting each work area, such as, each room, and mapping these areas beginning with the work area in which localization first failed. In some embodiments, the failure of localization may include the loss of data pertaining to the location of the robot's initial navigational starting point, such as the location of a docking or base station of the robot to which the robot returns following each work session. In some embodiments, when localization fails the processor of the robot may immediately begin to search for the base station. In some embodiments, when localization fails the robot may operate and map work areas while simultaneously searching for the base station. In some embodiments, when localization fails the robot may complete a work session, mapping the environment as it does so, and return to each work area after the work session to search for the base station. In some embodiments, the processor of the robot may search for the base station by searching for an IR light emitted by a transmitter of the base station to be received by the robot which will signal the robot to return to the base station. In some embodiments, the processor of the robot may search for a base station by rotating in 360 degrees in each work area until a signal from the base station is received by the robot. In some embodiments, if the robot does not detect a signal from the base station in a work area, the robot may automatically navigate to a different work area. In some embodiments, if the robot detects a signal from the base station in a work area, the robot may automatically cease operations and navigate directly to the base station. In some embodiments, if the robot detects a signal from the base station in a work area, the robot may navigate to a new work area before navigating back to the base station. In some embodiments, if the base station is detected by the robot, and the robot thereafter navigates to a new work area, a path plan may be set by the processor for navigating back to the base station. In some embodiments, if a first robot's localization fails, a processor of the first robot may communicate with a centralized control system, a base station, other devices or processors of other robots to assist with the processor recovering a localization capacity. For example, if a first robot's localization fails, a processor of the first robot may send out, for example, a distress signal indicating that it has lost localization, and a processor of a second robot, may share data such as maps or other beneficial data with the processor of the first robot to assist the with recovering some form of a localization capacity. In an additional example, if the localization capacity of the processor of the robot fails, the processor may communicate with a centralized control system, base station, other devices or processors of other robots to attempt to recover data such as maps or other beneficial data to assist the with recovering some form of a localization capacity. In some embodiments, the signal transmitter used may be an omni-directional signal emitter such as, for example, an IR signal emitter. In some embodiments, the signal transmitter may be located on the robot and the signal may be received by the base station. In some embodiments, when localization fails, the robot may detect and mark obstacles encountered in the environment within a new map generated during the operational cycle as the robot navigates in the work environment. In some embodiments, features on the base station may be used for the processor of the robot to easily distinguish when searching for the base station. For example, unique angles or physical characteristics of a base station may be implemented in memory of the processor to help the processor easily identify the base station. Further, characteristics of a surface of a base station such as printing, painting, patterns, and the like may be used by the processor to easily identify the base station.

In some embodiments, the processor of a robot determines a movement path of the robot based on the map of the environment. For example, in some embodiments, the processor implements a path planning method that is responsive to stimulus from an observed environment. In some embodiments, the processor divides the environment into zones and then dynamically adjusts a movement path within each of those zones based on sensed attributes of the environment. In some embodiments, the processor represents a movement path using a topological graph, wherein the movement path is described with a set of vertices and edges, the vertices being linked by edges. Vertices may be represented as distinct points while edges may be lines, arcs or curves. The properties of each vertex and edge may be provided as arguments at run-time based on real-time sensory input of the environment. In some embodiments, the topological graph may define the next actions of the robot as it follows along edges linked at vertices. While executing the movement path, in some embodiments, the processor may assign rewards as the robot executes actions to transition between states (e.g., such as in a MDP). In some embodiments, the processor uses the net cumulative reward to evaluate a particular movement path comprised of actions and states. In some embodiments, the processor may iteratively calculate a state-action value function during execution of the movement path based on the current reward and maximum future reward at the next state. In some embodiments, a goal is to find optimal state-action value function and optimal policy by identifying the highest valued action for each state. As different topological graphs including vertices and edges with different properties are executed over time, the number of states experienced, actions taken from each state, and transitions increase. The movement path devised by the processor iteratively evolves to become more efficient by choosing transitions that result in most favorable outcomes and by avoiding situations that previously resulted in low net reward. After convergence, the evolved movement path is determined to be more efficient than alternate movement paths that may be devised using real-time sensory input of the environment.

In some embodiments, the movement path of the robot is a boustrophedon movement pattern. Details of a boustrophedon movement pattern that may be generated by the processor of the robot is described in U.S. patent application Ser. No. 16/920,328, the entire contents of which are hereby incorporated by reference.

Detailed examples of path planning methods are described in U.S. patent application Ser. Nos. 16/041,286, 16/422,234, 15/406,890, 16/796,719, 14/673,633, 15/676,888, 16/558,047, 15/449,531, and 16/446,574, the entire contents of which are hereby incorporated by reference. For example, in some embodiments, the processor of a robot may learn a path, such as a path between a first location and a second location, in a variety of ways. In some embodiments, the processor of the robot may be taught a path by directing the robot along the desired path by physically moving the robot or by using a remote control or an application of a communication device paired with the processor of the robot. Other methods of moving the robot along the desired path may also be used, such as voice commands. In some embodiments, a live video feed (or real-time images) of a camera mounted on the robot is transmitted to a remote operator that controls movement of the robot using an input device (e.g., joystick, keyboard, mouse, touchscreen of communication device, etc.). In some embodiments, the processor of the robot may be taught a path between the first location and second location by physically wheeling the robot from the first location, through the environment, to the second location. In some embodiments, the first location is the same as the second location. In some embodiments, the processor of the robot is taught the same path or different paths multiple times in the same area. In some embodiments, the processor of the robot is taught one or more paths for one or more different areas (e.g., kitchen, bathroom, bedroom, etc.) and paths to navigate between one or more areas. Over time, as the processor learns more and more paths, the processor becomes more efficient at covering areas or navigating between two areas or locations. In some embodiments, the processor collects data using one or more sensors during learning one or more paths and uses data collected to learn most efficient coverage of an area or navigation between areas or locations. In some embodiments, the processor of the robot uses similar methods and techniques as those described above for learning and converging to the most efficient movement path during manual training, wherein the robot is controlled to move along a particular path. In another example, a user may remotely guide the robot using an input device based on a live video feed from a camera of the robot transmitted to a communication device (e.g., laptop, smartphone, tablet, etc.) of the operator. In some embodiments, the operator directs the robot, from a first location to a second location. In some embodiments, the robot is manually navigated to a specific location a predetermined amount of times before it autonomously navigates to the specific location. In some embodiments, the details learned by a processor during path learning may be shared with one or more other processors of one or more robots, such that details learned by a single processor may improve SLAM of other processors of other robots. For example, during manual training a processor may learn to avoid a particular area due to high obstacle density and may mark it in the map. This may be shared with processors of other robots operating in the same environment.

In some embodiments path learning may be initiated by, for example, a user pressing a start button on the robot or on any other device capable of communicating with the processor of the robot, voice activation or autonomously upon startup, prior to beginning the process of teaching a path to a processor of the robot. In some embodiments, path learning may be completed by, for example, pressing an end button on the robot or on any other device capable of communicating with the processor of the robot, voice activation, or autonomously upon detecting no movement of the robot for a predetermined amount of time. Path learning may be initiated when the robot is positioned at a first location and completed after the robot has navigated along the desired path and returned back to the first location or any other location. In some embodiments, path learning may be initiated when the robot is positioned at a first location and completed after the robot has navigated along the desired path to the second location. Alternatively, in some embodiments, path learning may be initiated and completed using an application of a communication device, such as a mobile device, laptop or smart phone, capable of communicating with the robot. In some embodiments, an application of a communication device may be used to mark a path of the robot within a map of the working environment that may be shared with the processor of the robot and the processor actuates the robot to move along the path. During path learning, the processor of the robot may determine its location within an internal map of the working environment while simultaneously mapping the environment. In some instance, the processor of the robot may mark observed obstacles in the working environment within an internal map of the environment. In some embodiments, the robot includes an extendable handle that a user may use to physically wheel the robot along a path. In some embodiments, a communication device may be used to manually direct the robot along a path. In some embodiments, the communications device is part of the robot and it detachable and wireless. In some embodiments, the communication device is a personal device that executes an application paired with the processor of the robot. In some embodiments, the communication device is a user interface built into the robot.

In some embodiments, the robot executes a wall or perimeter follow path or another type of path that includes segments parallel to one or more walls or perimeters within the environment (e.g., boustrophedon). In some embodiments, the processor may choose a longest path that is parallel to a wall and hence the longest wall in the environment. This may reduce the number of U-turns of the robot and improve coverage efficiency. In some embodiments, the processor estimates a major wall-angle of a room to align the path of the robot with a wall in the room. In some embodiments, the processor determines a set of all obstacle locations (e.g., walls, furniture, etc.) in a current map of the environment (e.g., partial or full map) and divides the set of all obstacles locations into subsets including contiguous obstacle locations (i.e., connected obstacle locations). For example, a portion of obstacle locations within the set of all obstacle locations may correspond with a wall. The portion of obstacle locations corresponding with the wall of the environment may be contiguous as they are positioned immediately adjacent to one another and collectively form the wall, and thus may be a subset. In another example, a portion of obstacle locations corresponding with a piece of furniture may form a subset. In some embodiments, the processor determines the largest subset of contiguous obstacle locations and orders the obstacle locations within that subset (e.g., such that the contiguous obstacle locations are ordered from right to left or vice versa). In some embodiments, the processor executes a simplification algorithm (e.g., Ramer/Douglas/Puecker algorithm) over the ordered obstacle locations that eliminates obstacle locations from the subset that are within a predetermined distance from the line connecting a previous and next obstacle location. In some embodiments, the processor connects the obstacle locations remaining in the subset, resulting in one or more line segments. In some embodiments, the processor determines the angle of the longest line segment with respect to the coordinate system of the robot to estimate the room orientation such that it may follow a path parallel to one or more walls. In some embodiments, the processor may choose a longest path that is parallel to a wall and hence the longest wall in the environment. This may reduce the number of U-turns of the robot and improve coverage efficiency.

In embodiments, the robot may include various coverage functionalities. For example, FIGS. 8A-8C illustrate examples of coverage functionalities of the robot. FIG. 8A illustrates a first coverage functionality including coverage of an area 800. FIG. 8B illustrates a second coverage functionality including point-to-point and multipoint navigation 801. FIG. 8C illustrates a third coverage functionality including patrolling 802, wherein the robot navigates to different areas 803 of the environment and rotates in each area 803 for observation.

Traditionally, robots may initially execute a 360 degrees rotation and a wall follow during a first run or subsequent runs prior to performing work to build a map of the environment. However, some embodiments of the robot described herein begin performing work immediately during the first run and subsequent runs. FIGS. 9A and 9B illustrate traditional methods used in prior art, wherein the robot 900 executes a 360 degrees rotation and a wall follow prior to performing work in a boustrophedon pattern, the entire path plan indicated by 901. FIGS. 9C and 9D illustrate methods used by the robot described herein, wherein the robot 900 immediately begins performing work by navigating along path 902 without an initial 360 degrees rotation or wall follow.

In some embodiments, the robot executes a wall follow. However, the wall follow differs from traditional wall follow methods. In some embodiments, the robot may enter a patrol mode during an initial run and the processor of the robot may build a spatial representation of the environment while visiting perimeters. In traditional methods, the robot executes a wall follow by detecting the wall and maintaining a predetermined distance from a wall using a reactive approach that requires continuous sensor data monitoring for detection of the wall and maintain a particular distance from the wall. In the wall follow method described herein, the robot follows along perimeters in the spatial representation created by the processor of the robot by only using the spatial representation to navigate the path along the perimeters (i.e., without using sensors). This approach reduces the length of the path, and hence the time, required to map the environment. For example, FIG. 10A illustrates a spatial representation 1000 of an environment built by the processor of the robot during patrol mode. FIG. 10B illustrates a wall follow path 1001 of the robot generated by the processor based on the perimeters in the spatial representation 1000. FIG. 11A illustrates an example of a complex environment including obstacles 1100. FIG. 11B illustrates a map of the environment created with less than 15% coverage of the environment when using the techniques described herein. In some embodiments, the robot may execute a wall follow to disinfect walls using a disinfectant spray and/or UV light. In some embodiments, the robot may include at least one vertical pillar of UV light to disinfect surfaces such as walls and shopping isles in stores. In some embodiments, the robot may include wings with UV light aimed towards the driving surface and may drive along isles to disinfect the driving surface. In some embodiments, the robot may include UV light positioned underneath the robot and aimed at the driving surface.

In some embodiments, there may be various different wall follow modes depending on the application. For example, there may be a mapping wall follow mode and a disinfecting wall follow mode. In some embodiments, the robot may travel at a slower speed when executing the disinfecting wall follow mode.

Figure 12:
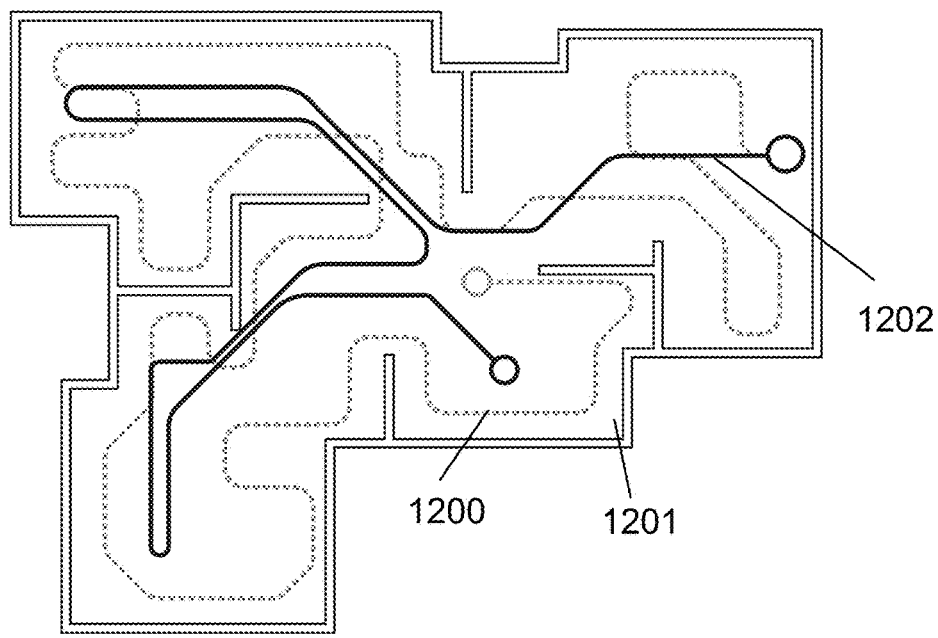
FIGS. 12 and 13A-13E illustrate examples of a movement path of a robot during coverage, according to some embodiments.
Figure 13A:
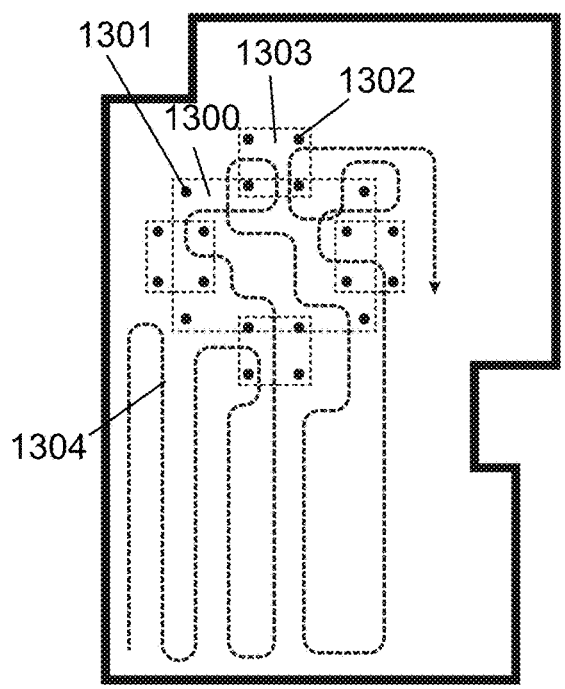
Figure 13B:
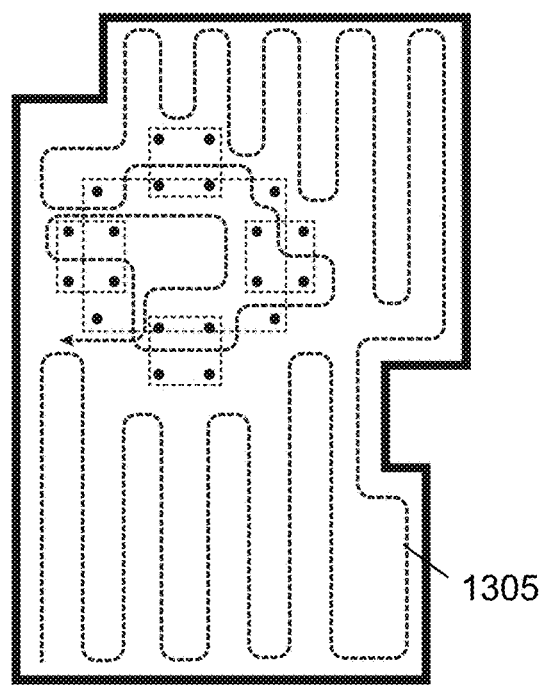
Figure 13C:
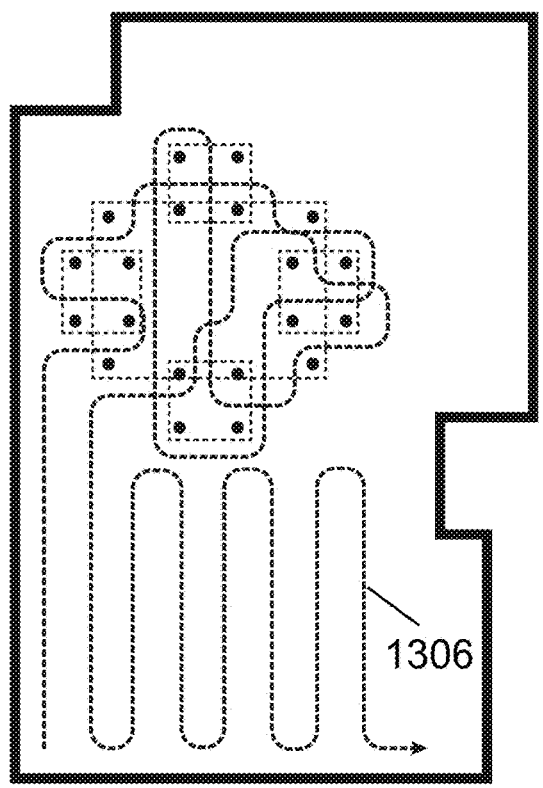
Figure 13D:
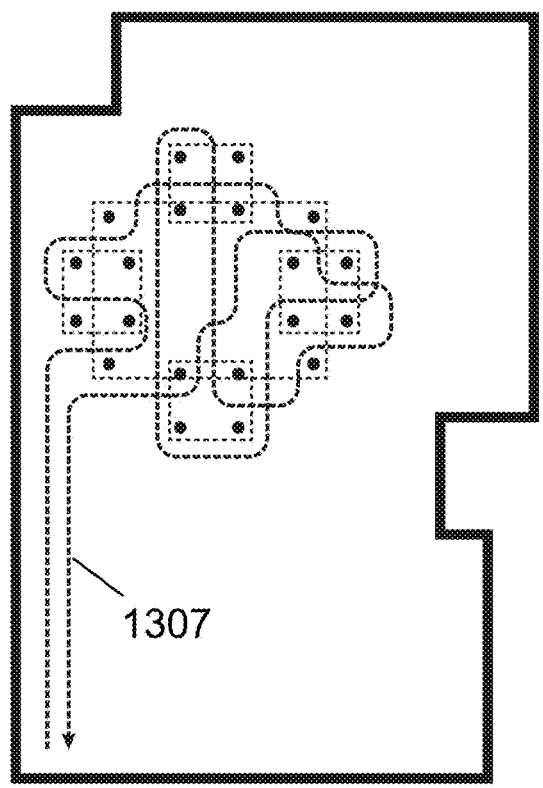
Figure 13E:
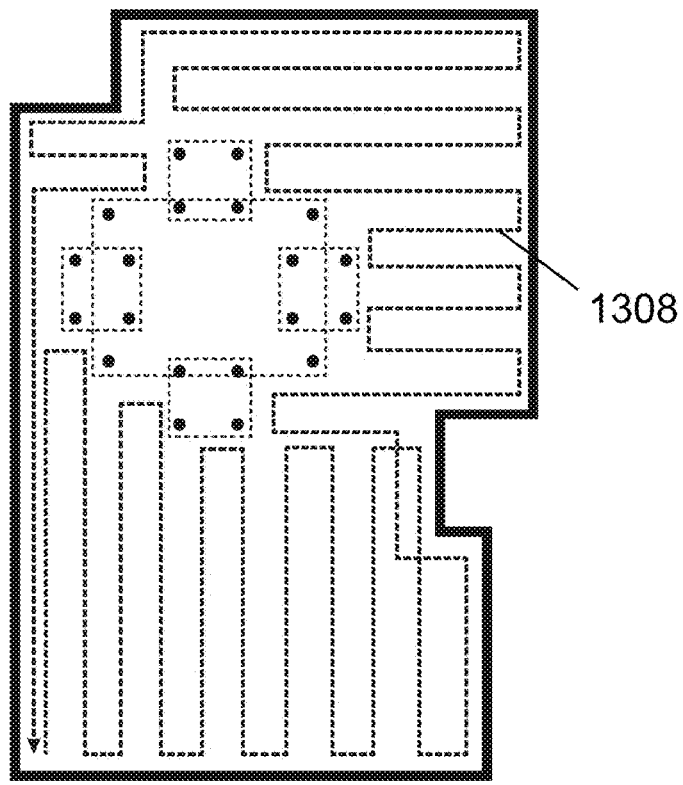

In some embodiments, the robot may initially enter a patrol mode wherein the robot observes the environment and generates a spatial representation of the environment. In some embodiments, the processor of the robot may use a cost function to minimize the length of the path of the robot required to generate the complete spatial representation of the environment. FIG. 12 illustrates an example of a path 1200 of the robot using a cost function to minimize the length of the path of the robot required to generate the complete spatial representation. The path 1200 is much shorter in length than the path 1201 generated using traditional path planning methods described in prior art. In some cases, path planning methods described in prior art cover open areas and high obstacle density areas simultaneously without distinguishing the two. However, this may result in inefficient coverage as different tactics may be required for covering open and high obstacle density areas and the robot may become stuck in the high obstacle density areas, leaving other parts of the environment uncovered. For example, FIG. 13A illustrates an example of an environment including a table 1300 with table legs 1301, four chairs 1302 with chair legs 1303, and a path 1304 generated using traditional path planning methods, wherein the arrowhead indicates a current or end location of the path. The path 1304 covers open areas and high obstacle density areas at the same time. This may result with a large portion of the open areas of the environment uncovered by the time the battery of the robot depletes as covering high obstacle density areas can be time consuming due to all the maneuvers required to move around the obstacles or the robot may become stuck in the high obstacle density areas. In some embodiments, the processor of the robot described herein may identify high obstacle density areas. In some embodiments, the robot may cover open or low obstacle density areas first then cover high obstacle density areas or vice versa. FIG. 13B illustrates an example of a path 1305 of the robot that covers open or low obstacle density areas first then high obstacle density areas. FIG. 13C illustrates an example of a path 1306 of the robot that covers high obstacle density areas first then open or low obstacle density areas. In some embodiments, the robot may only cover high obstacle density areas. FIG. 13D illustrates an example of a path 1307 of the robot that only covers high obstacle density areas. In some embodiments, the robot may only cover open or low obstacle density areas. FIG. 13E illustrates an example of a path 1308 of the robot that only covers open or low obstacle density areas. In another example, the robot covers the majority of areas initially, particularly open or low obstacle density areas, leaving high obstacle density areas uncovered. The robot may then execute a wall follow to cover all edges. The robot may finally cover high obstacle density areas (e.g., under tables and chairs). During initial coverage of open or low obstacle density areas, the robot avoids map fences (e.g., fences fencing in high obstacle density areas) but wall follows their perimeter.

In some embodiments, the processor of the robot may use the map (e.g., locations of rooms, layout of areas, etc.) to determine efficient coverage of the environment. In some embodiments, the processor may choose to operate in closer rooms first as traveling to distant rooms may be burdensome and/or may require more time and battery life. For example, the processor of a robot may choose to clean a first bedroom of a home upon determining that there is a high probability of a dynamic obstacle within the home office and a very low likelihood of a dynamic obstacle within the first bedroom. However, in a map layout of the home, the first bedroom is several rooms away from the robot. Therefore, in the interest of operating at peak efficiency, the processor may choose to clean the hallway, a washroom, and a second bedroom, each on the way to the first bedroom. In an alternative scenario, the processor may determine that the hallway and the washroom have a low probability of a dynamic obstacle and that second bedroom has a higher probability of a dynamic obstacle and may therefore choose to clean the hallway and the washroom before checking if there is a dynamic obstacle within the second bedroom. Alternatively, the processor may skip the second bedroom after cleaning the hallway and washroom, and after cleaning the first bedroom, may check if second bedroom should be cleaned.

In some embodiments, the robot covers areas with low obstacle density first and then performs a robust coverage. In some embodiments, a robust coverage includes covering areas with high obstacle density. In some embodiments, the robot may perform a robust coverage before performing a low density coverage. In some embodiments, the robot covers open areas (or areas with low obstacle density) one by one, executes a wall follow, covers areas with high obstacle density, and then navigates back to its charging station. In some embodiments, the processor of the robot may notify a user (e.g., via an application of a communication device) if an area is too complex for coverage and may suggest the user skip that area or manually operate navigation of the robot (e.g., manually drive an autonomous vehicle or manually operate a robotic surface cleaner using a remote).

In some embodiments, the processor may use an observed level of activity or an amount of debris historically collected or observed within areas of the environment when determining coverage. In some embodiments, the processor may use a traversability algorithm or other coverage methods when determining coverage by and a movement path of the robot, as described in U.S. patent application Ser. No. 16/920,328, the entire contents of which are hereby incorporated by reference. In some embodiments, the processor may divide the map into rooms and hallways for coverage, wherein the rooms and hallways may be categorized based on any of: an arrangement of areas within the environment, visual features recognized, an opening in the planar representation, and input received by the application. In some embodiments, the processor may detect a current room in a map including two or more rooms during coverage. In some embodiments, the processor may infer previously visited areas and unvisited areas during coverage. In some embodiments, the robot may skip previously visited areas and cover unvisited areas to achieve full coverage of the environment.

In some embodiments, the processor divides the map of the environment into a plurality of cells wherein each cell corresponds to a different location of the environment. In some embodiments, the processor divides the map into a plurality of zones, each zone having a subset of the plurality of cells. In some embodiments, the processor determines a sequence of the zones among a plurality of candidate sequences based on an effect of the sequence on a cost of a cost function that is based on travel distance of the robot through the sequence. In some embodiments, the robot traverses the zones in the determined sequence. In some embodiments, the cost function is based on other variables, such as actual surface coverage, repeat coverage, and total coverage time. In some embodiments, the processor represents the map of the environment by a plurality of cells, each cell representing a different location of the environment. In some embodiments, each cell is defined by an ordered pair representing an angle and a distance from an origin of a coordinate system. In some embodiments, each cell of the environment can only belong to a single zone, and overlap between zones is avoided by construction. In some embodiments, entries in the matrices of zones have a value of zero if the cell is empty or a value of one if the cell is occupied by an object (e.g., wall or furniture). In some embodiments, the processor executes the following iteration for each zone of a sequence of zones, beginning with the first zone to optimize division of zones: expansion of the zone if neighbor cells are empty, movement of the robot to a point in the zone closest to the current position of the robot, addition of a new zone coinciding with the movement path of the robot from its current position to a point in the zone closest to the robot if the length of travel from its current position is significant, execution of a movement path within the zone, and removal of any uncovered cells from the zone.

In another embodiment, the processor determines optimal division of the environment by minimizing a cost function. In some embodiments, the cost function depends on distance travelled between zones, coverage, and coverage time. In some embodiments, the cost function is minimized by removing, adding, shrinking, expanding, moving and switching the order of coverage of the zones. In some embodiments, the processor uses gradient descent to compute the division of zones that results in minimal cost by iteratively modifying division of zones based on a partial derivative of the cost function with respect to each respective parameter defining the zones. In some embodiments, this is repeated until the cost is below a predetermined threshold.

In yet another embodiment, the processor determines optimal division of zones by modeling zones as emulsions of liquid. Behaviors of emulsions of liquid, such as minimization of surface tension and surface area and expansion and contraction of the emulsion driven by an internal pressure, are used by the processor in modeling the zones. In some embodiments, the processor represents the environment using a grid map divided into zones. In some embodiments, the processor converts the grid map into a routing graph consisting of nodes connected by edges. In some embodiments, the processor represents a zone by a set of nodes, wherein the nodes are connected and represent an area on the grid map. In some embodiments, the processor assigns a zone a set of boundary edges wherein a boundary edge connects two nodes. The set of boundary edges define the set of boundary nodes and give information about which are just inside and outside a zone. In some embodiments, the processor may expand or reduce a zone by adding or removing nodes. In some embodiments, the processor determines a numerical value assigned to each node. In some embodiments, the value of each node indicates whether to add or remove the node from a zone. In some embodiments, the numerical value computed is dependent on growth and decay of the zone, distance of the node from the center of the zone, order of zone coverage, and a surface smoother score. In some embodiments, the processor determines an order score for each node to determine order of coverage based on the distance between the boundary node of interest and the closest boundary node in the next zone to be covered, the distance between the closest boundary nodes between the current zone and the next zone to be covered, and the distance between the furthest boundary nodes between the current zone and the next zone to be covered.

Further details of methods and techniques for efficient coverage an environment and determining a path of the robot that may be used are described in U.S. patent application Ser. Nos. 16/041,286, 16/422,234, 15/406,890, 16/796,719, 14/673,633, 15/676,888, 16/558,047, 15/449,531, 16/446,574, 16/219,647, and 16/920,328, the entire contents of which are hereby incorporated by reference.

In some embodiments, the processor of the robot uses a motion model to predict the position of the robot within the environment. In some embodiments, the processor determines parameters of the motion model of the robot that improve predictions of the motion model. In some embodiments, the processor uses a parametrized model $\hat{y}_{t+1}$=model $(y_t, p_t)$ to predict output $\hat{y}_{t+1}$ at time t+1 given observed output $y_t$ at time t and parameters $p_t$. In some embodiments, the processor estimates the parameters that minimize a prediction error $y_{t+1}-\hat{y}_{t+1}$, wherein $y_{t+1}$ is the actual observed output at time t+1. In some embodiments, the processor uses recursive estimation $p_{t+1}=p_t+K_{t+1}(y_{t+1}-\hat{y}_{t+1})$ to estimate parameter $p_{t+1}$ at time t+1. In some embodiments, the processor uses the gain $K_{t+1}$ to determine how much the current prediction error $y_{t+1}-\hat{y}_{t+1}$ affects the update of the parameter estimate. In some embodiments, the processor updates the parameter in the direction of the gradient of the error by, for example, $K_{t+1}=Q_{t+1}\Psi_{t+1}$ with $Q_{t+1}$ suitably chosen, and the gradient $$\Psi_{t+1}^T = \frac{\partial \hat{y}_{t+1}}{\partial p_t},$$

wherein $Q_{t+1}$ is a weighting factor used to determine how much to correct the parameter estimate. In some embodiments, the processor uses tracking error gradient descent wherein $Q_{t+1}$=constant. In some embodiments, the processor uses tracking error gradient descent with normalized gradient wherein $$Q_{t+1} = \frac{\gamma}{\|\Psi_{t+1}\|^2 + \text{Bias}},$$

wherein $\gamma$ is a constant. In some embodiments, $Q_{t+1}$ is chosen as a forgetting factor. In some embodiments, $K_{t+1}$ is chosen as Kalman gain of a Kalman filter.

In some embodiments, the processor of the robot predicts where the robot is going to be positioned $\hat{x}_{t+1}$=model $(x_t, u_t, \Delta t)$ at time t+1 given an input state $x_t$ (i.e., previous position estimate) and sensor measurements $u_t$ (e.g., wheel encoder) at time t and a time step $\Delta t$. In some embodiments, the processor implements the model in a Kalman filter and the prediction step is an explicit Euler step in time. In some embodiments, the processor receives feedback on the computed state estimate (e.g., through sensor pose updates) and corrects the pose to $x_{t+1}$ at time t+1. In some embodiments, the processor determines a tracking error using $e=x_{t+1}-\hat{x}_{t+1}$.

In some embodiments, the processor uses tracking error gradient descent to reduce the tracking error. In some embodiments, the processor adds parameters to the model $\hat{x}_{t+1}$=model $(x_t, u_t, \Delta t, p_t)$ to improve the performance of the model. Examples of parameters include wheel radii, wheel distance, sensor position, etc. In some embodiments, the processor incrementally perturbs the parameters in the direction that reduces the tracking error the most, or otherwise in the direction of the descent on the tracking error function $$E = \frac{1}{2}e^T e.$$

In some embodiments, the processor updates the parameters using $$p_{t+1} = p_t + h\left(\frac{\partial \hat{x}_{t+1}}{\partial p_t}\right)^T e,$$

where h is a small step size. This is the same update rule as described above with $$Q_{t+1} = h \text{ and } \Psi_{t+1}^T = \frac{\partial \hat{x}_{t+1}}{\partial p_t}.$$

In some embodiments, the processor uses hyperparameters for fine tuning the model. In some embodiments, the processor uses an adaptive step size h(t), wherein $$Q_{t+1} = \frac{\gamma}{\|\Psi_{t+1}\|^2 + \text{Bias}},$$

for example. In some embodiments, the processor models uncertainty by premultiplying Q with a matrix M to, for example, do larger updates in directions with higher certainty and smaller updates in directions of uncertainty, or by taking the Kalman update instead as it is already corrected by both covariance matrices. In some embodiments, the processor improves stability of the model by, for example, detecting outliers and eliminating them or by delayed updates, or by delayed updates on a separate set of parameters.

In some embodiments, the processor uses an extended Kalman filter with augmented state space in modeling the motion of the robot. In some embodiments, the processor uses the augmented state space $$\tilde{x}_t = \begin{pmatrix} x_t \\ p_t \end{pmatrix}$$

and applies to the Kalman filter to $\tilde{x}$. In some embodiments, the parameters are taken as time-invariant and the processor models zero noise on the parameter portion of the state. Therefore, in some embodiments, the processor models dynamics using $$\tilde{x}_{t+1} = \tilde{\Phi}(\ldots) = \begin{pmatrix} \text{model}(x_t, u_t, \Delta t, p_t) \\ p_t \end{pmatrix}.$$

In some embodiments, the processor updates the Jacobian F from the non-augmented Kalman process using $$\tilde{F} = \frac{\partial \tilde{\Phi}}{\partial \tilde{x}_t} = \begin{pmatrix} F & \Psi_{t+1}^T \\ 0 & I \end{pmatrix}, \text{ wherein } \Psi_{t+1}^T$$

is the model derivative with respect to the parameters as defined above.

For example, in some embodiments, the processor models motion of the robot using $\dot{x}=v \cos \omega$; $\dot{y}=v \sin \omega$; $\dot{\theta}=\omega$, with initial conditions such as $x(t_0)=x_0$, and wherein v is translational velocity and $\omega$ is rotational velocity. In some embodiments, the processor uses a forward model including $x_{t+1}=x_t+v\Delta t \cos \theta_t$; $y_{t+1}=y_t+v\Delta t \sin \theta_t$; $\theta_{t+1}=\theta_t+\omega\Delta t$, to compute the motion of the robot. In some embodiments, the processor determines translational and rotational velocities v and w based on observed right and left wheel velocities $\omega_R$ and $\omega_L$ of the robot using $$\begin{pmatrix} v \\ \omega \end{pmatrix} = J\begin{pmatrix} \omega_L \\ \omega_R \end{pmatrix}, \text{ wherein } J = \begin{pmatrix} r_L/2 & r_R/2 \\ -r_L/b & r_R/b \end{pmatrix}$$

and $r_R$ and $r_L$ are right and left wheel radii and b is the distance between the right and left wheels. In some embodiments, the processor uses wheel sizes as parameters $p_t=[r_L, r_R]^T$ and $J=J(p_t)$. In some embodiments, the processor estimates parameters p for observed left and right wheel velocities $u_t=[\omega_L, \omega_R]^T$ to improve the forward model. Given abbreviated state vector $$x_t = \begin{pmatrix} x_t \\ y_t \\ \theta_t \end{pmatrix},$$

the processor uses forward model $$\hat{x}_{t+1} = \text{model}(x_t, u_t, \Delta t, p_t) = \begin{pmatrix} x_t + v_t \Delta t \cos\theta_t \\ y_t + v_t \Delta t \sin\theta_t \\ \theta_t + \omega_t \Delta t \end{pmatrix}$$

with $$\begin{pmatrix} v_t \\ \omega_t \end{pmatrix} = J(p_t)u_t.$$

In some embodiments, the processor determines the gradient for a single time step in the direction of the model parameters using $$\Psi_{t+1}^T = \frac{\partial \hat{x}_{t+1}}{\partial p_t} = \frac{1}{2}\Delta t \begin{pmatrix} \omega_L \cos\theta_t & \omega_R \cos\theta_t \\ \omega_L \sin\theta_t & \omega_R \sin\theta_t \\ -2\omega_L/b & 2\omega_R/b \end{pmatrix}.$$

In some embodiments, the processor updates parameters $p_t$ in the direction of steepest descent of a single time step error function. In some embodiments, upon receiving a scan match the processor estimates the position of the robot using EKF before the scan match and the position of the robot based on the scan match. In some embodiments, the processor determines an error $e_{t+1}$=pose from scan match−pose from EKF before scan match and uses the error to update the parameters $p_{t+1}=p_t+Q_{t+1}\Psi_{t+1}e_{t+1}$.

In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the processor uses feedforward networks to learn a motion model for the robot. In some embodiments, different hierarchy and training process are used to construct different possible motion models. For example, a first motion model uses previous pose and measure velocity to determine new pose. The first motion model takes position into account and is therefore capable of mapping coordinate dependent parameters (e.g., slightly tilted driving surface). In another example, a second motion model uses initial position and measured velocity to determine change in pose. The second motion model does not take position into account and therefore may only account for internal/general mismatches. Neither model 1 or 2 take previous velocities into account. In embodiments, previous velocities could be added but would increase the dimension of the neural network. While neural networks may be trained to a high degree of accuracy, they do not take previous measurements into account. Further, there is the challenge of online calibration with neural networks as calibration requires frequently running backpropagation. Depending on the size of the network, this may result in significant computational cost. Freezing the network and only updating the network with respect to a few parameters (e.g. additional tuning input parameters) may be considered conceptually similar to the methods described above.

In some embodiments, the processor uses a recurrent neural network as it is a time-aware type of neural network. Recurrent neural networks are able to keep states hidden from time step to time step. In contrast to feedforward neural networks, the input of recurrent neural networks includes not only the current input but also information perceived in previous steps. Internally, recurrent units have an internal state. This internal state also influences the output. With each input, this hidden state is updated. This mechanism provides a feedback loop at every time step in the input series. In some embodiments, the processor uses continuous time recurrent neural networks to account for slight mismatch in sampling speed of velocities. Different recurrent neural network hierarchies for modeling dynamics of the robot may be used. In some embodiments, the recurrent neural network feeds back the output from one time step as input to the next time step. In some embodiments, the processor uses a time integration recurrent neural network to estimate a new state of the robot. In one embodiment, the recurrent neural network receives state and sensor measurements as input and outputs a new state and feeds back the output as the state input. In another embodiment, the recurrent neural network outputs how much the state changed and the change is fed back and added to the state input. In some embodiments, the model is updated by backpropagating the error. In some embodiments, the error is backpropagated using iterative closest point matching.

In some embodiments, the processor uses a modular structure to estimate a new state of the robot wherein the recurrent neural network receives state, odometer measurements and IMU readings as input and the output position and velocity of the recurrent neural network is used input into a non-linear ground-truth model (e.g., classical motion model), in addition to state, describing physics of the robot. The ground truth model outputs a new state. In some embodiments, the processor updates the model by determining the hard-coded gradient of the ground truth model and directly backpropagating the gradient through the recurrent neural network.

In some embodiments, the processor estimates a new state of the robot by learning to map observations to parameters p of a forward model (e.g., as described above). The recurrent neural network receives state, odometer measurements, and IMU readings as input and outputs parameters p, which are received as input into the forward model. The forward model also receives state and odometer measurements as input and outputs a new state. In some embodiments, the processor uses $p_{t+1}=p_t+Q_{t+1}\Psi_{t+1}e_{t+1}$ as described above to determine parameters instead of the recurrent neural network. Further description of the estimation of model parameters is provided in U.S. patent application Ser. Nos. 16/041,286 and 16/353,019, the entire contents of which are hereby incorporated by reference.

In some embodiments, the processor determines which tools to use and autonomously adjusts settings based on characteristics of the environment using methods (e.g., methods of inferring environmental characteristics and actions taken as a result of inferring particular environmental characteristics, actions taken after inferring environmental characteristics such as marking the map) such as those described in U.S. patent application Ser. Nos. 16/239,410 and 16/163,530, the entire contents of which are hereby incorporated by reference. For example, in some embodiments, the robot uses the processor and one or more environmental sensors (e.g., sensors that sense attributes or can observe or provide data from which inferences can be made about characteristics of an environment, such as those of a floor, a wall, or a surface of an object). Examples of sensors include, but are not limited to, floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, hardness, color, acoustic reflectivity, optical reflectivity, planarity, and the like. In some embodiments, the sensor takes readings of the environment and the processor obtains the sensor data. In some embodiments, the sensed data is associated with location data of the robot indicating the location of the robot at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, or second or third order time derivatives of the same. For instance, some embodiments adjust the speed of components (e.g., wheel motor, impeller motor, brush motor, etc.) based on the environmental characteristics inferred. In some embodiments, the processor activates or deactivates (or modulates intensity of) functions (e.g., impeller, fluid dispenser, etc.) based on the environmental characteristics inferred. In other instances, the processor adjusts a path, operational schedule (e.g., time when various designated areas are worked upon), and the like based on sensory data. Examples of environmental characteristics include floor type, obstacle density, room or area type, level of debris accumulation, level of user activity, time of user activity, etc.

In some embodiments, processors of robots collaborate by sharing intelligence to accomplish one or more tasks. Examples of collaborative methods are described in U.S. patent application Ser. Nos. 15/048,827, 16/185,000, 15/981,643, 16/747,334, 15/986,670, 16/568,367, 16/130,880, 14/948,620, 16/920,328, and 16/402,122, the entire contents of which is hereby incorporated by reference. In some embodiments, processors of robots employ collaborative intelligence and artificial intelligence. In some embodiments, collaborative intelligence includes robots learning from one another and artificial intelligence includes the processor of a robot learning from the environment (e.g., user feedback). For instance, a processor of a home control unit capable of learning preferences of a user (e.g. home temperature, music genre, cleaning schedule, alarm setting, etc.) based on their actions over time may be an example of artificial intelligence. Based on the preferences of the user learned over time, the processor of the home control unit may therefore, play a specific genre of music or set the shower to a specific temperature. If a second home control unit was introduced into the home, the processor of the first home control unit may share its intelligence with the processor of the second home control unit such that the processor of the second home control unit may learn the preferences of the user from the processor of the first home control unit, which may be considered collaborative intelligence. In some embodiments, the processor of each robot operating within the environment may learn from the environment (e.g., user feedback) and in some embodiments, may share their learned intelligence with the processors of other robots to complete tasks more efficiently. For example, the processor of the second home control unit may learn from the processor of the first home control unit that the user prefers playing jazz music in the evening while the processor of the first home control unit may learn from the processor of the second home control unit what time the user prefers to wake up. In some embodiments, the processors of robots may autonomously split tasks. For example, the processor of one home control unit may control home temperature while the processor of the other home control unit may control lighting in the home. In another example, a processor of a first surface cleaning robot shares its intelligence (e.g., user preferences learned, a map of the environment, the location of obstacles, etc.) with a processor of a second surface cleaning robot and vice versa. In particular, the processor of the first surface cleaning robot may share with the processor of the second surface cleaning robot that the user likes the house cleaned at 8:00 AM on Monday and Thursday. In one example, the processor of a first robot learns that user A prefers a home temperature of 75° F. while the processor of a second robot learns that a user B prefers the home temperate at 73° F. The processors of the robots may autonomously share intelligence and collaborate and may infer based on shared intelligence that a home temperature of 74° F. is best when both users are present and to set the temperature to the preferred temperature of each individual user when they are only present. In other instances, a processor of a robot may receive one or more settings and may share the one or more settings with processors of other robots. In some embodiments, the processor of a robot receives the one or more settings from an application of a communication device, by voice command, by input on a graphical user interface of the robot, a remote control, a home assistant, etc. For example, processors of two cleaning robots introduced into a same environment and with separate user preferences stored may share their respective stored user preferences with one another however a user may choose the new preferences if preferences chosen by the collaborating robots are not desired. The processors of the robots may then learn the new user preferences for the future.

In some embodiments, a processor of a first robot transmits a signal to the processor of a second robot (or vice versa) before, during, or after completing a task. In some embodiments, the transmitted signal may include one or more of an instruction to execute an action or a task, a movement path of the first or second robot, actions previously executed by the first or second robot, current or upcoming actions of the first or second robot, a map of an environment, zones of an environment, order of zone coverage by the first or second robot, areas within which a task is to be executed or within which a task was executed by the first or second robot, progress of a task executed by the first or second robot, a schedule for executing a task by the first or second robot, cleaning preferences (e.g., suction power, number of passes of an area, robot speed, detailed or light cleaning, brush speed, etc.) for the first or second robot, capabilities of the first or second robot, debris data, floor type data, object (or obstacle) data, distance readings, road conditions, weather conditions, traffic conditions, power level, status (e.g., task being executed, charging, etc.), etc. In some embodiments, the receipt of a signal triggers the robot to execute one or more actions. In some embodiments, the one or more actions is a new task, a continuation of a task executed by the robot from which the signal was received, or is a second part of a task of which the first part is executed by the robot from which the signal was received. For example, a processor of a robotic vacuum may transmit a signal to a processor of a robotic mop before, during, or after vacuuming at least a portion of an environment, the receipt of the signal by the processor of the robotic mop triggering the robotic mop to mop at least a portion the environment. The areas vacuumed and mopped may be the same or may be different or may partially overlap. The processor of the robotic vacuum and robotic mop may strategically plan the order of coverage of areas such that overlapping areas for cleaning by both the robotic vacuum and mop are first vacuumed and then mopped. In another example, the processor of a robotic vacuum transmits a signal to a processor of a robotic mop before beginning vacuuming at least a portion of the environment, the receipt of the signal by the processor of the robotic mop triggering the robotic mop to mop while following along the same movement path of the robotic vacuum. In some cases, the robotic mop follows behind the robotic vacuum by a predetermined distance, immediately mopping vacuumed areas. In one example, a processor of a first robotic vacuum transmits a signal to the processor of a second robotic vacuum during execution of a task when the power level of the first robotic vacuum is below a predetermined threshold (or when the bin is above a predetermined threshold), the signal triggering the second robotic vacuum to complete the remainder of the task. The first robotic vacuum may navigate to a charging station to recharge. In some embodiments, the processor of a robot transmits a signal to search for a robot capable of executing a particular function. In some embodiments, the particular function may be complementary to the function of the robot transmitting the signal. For example, a processor of a robotic vacuum may transmit a signal in search of a robotic mop within the vicinity of the robotic vacuum to mop areas that may or may not be vacuumed by the robotic vacuum. In some embodiments, processors of the robots with complementary tasks collaborate to divide tasks within the environment. For example, the processor of a robotic vacuum and a robotic mop may collaborate to clean an environment. The processors divide the cleaning tasks such that the robotic vacuum cleans areas with carpet and the robotic mop cleans areas with hard flooring simultaneously. In some embodiments, the robot autonomously navigates to a charging station upon completion of a task or when a power level is below a predetermined threshold. In some embodiments, the robot may resume a task after recharging a power source. In some embodiments, two or more robots share a charging station, a bin emptying station, a cleaning fluid replenishment station, etc. In other embodiments, the robotic vacuum and robotic mop used in these examples may be replaced with other types of robots and are solely used for illustration purposes. In some embodiments, processors of robots transmit signals to one another to autonomously collaborate. In some embodiments, the transmitted signals may include a movement path, actions or tasks previously executed, current and upcoming actions or tasks, a map of an environment, zones of an environment, order of zone coverage, areas within which an task is to be executed or within which an task was executed, progress of a task, delegation of a task, a schedule for executing a task, cleaning preferences (e.g., suction power, number of passes of an area, robot speed, detailed or light cleaning, brush speed, etc.), capabilities of the robot, debris data, floor type data, object (or obstacle) data, distance readings, road conditions, weather conditions, traffic conditions, power level, status (e.g., task being executed, charging, etc.), etc. In some embodiments, processors of robots collaborate by dividing a task. For example, processors of two robotic vacuums may collaborate to clean an area by determining which areas each robot is to clean and by sharing areas covered in real-time with one another to avoid repeat coverage during execution of the task. In another example, a processor of a robot transmits traffic conditions to processors of nearby robots with whom a connection has been established such that the nearby robots can avoid the high trafficked area. In one example, a processor of a robot unable to complete garbage pickup of an area due to low battery level communicates with a processor of another nearby robot capable of performing garbage pickup, providing the robot with current progress of the task and a map of the area such that it may complete the task. In some embodiments, processors of robots exchange intelligence relating to the environment (e.g., traffic data, object data, etc.) or results of historical actions such that individual processors can optimize actions at a faster rate.

In some embodiments, the processor of a robot may make inferences from shared intelligence. For instance, a processor of a robotic coffee machine may learn that a user typically gets home from a jog every morning at 5:00 AM and to therefore brew a cup of the coffee preferred by the user at 5:00 AM. If one day at 4:45 AM the processor of a collaborating robotic vacuum cleaner detects the front door opening, it may share this data with the processor of the robotic coffee machine and the processor of the robotic coffee machine may infer that the user is home early from their jog and may therefor brew a cup of coffee earlier than usual. The processor of the robotic coffee machine may then adjust the likelihood of the user arriving home at 5:00 AM. In another example, the processor of a robotic tooth brush may collaborate with the processor of a robotic coffee maker, such that operation of the robotic tooth brush in the morning may be shared with the processor of the robotic coffee maker. The robotic coffee maker may therefore infer the user is awake and brew a cup of the preferred coffee of the user before the user reaches the kitchen. If there are two users within the home, the processor of the robotic coffee machine may infer the user based on probabilities and statistics (e.g., toothbrush settings, length of toothbrush operation, the toothbrush from which the signal was received, etc.) of information in order to maximize comfort without wasting energy. For instance, if the processor of the robotic coffee machine infers both users are awake it may brew a medium roast in order to appease both users if one prefers light roast and the other dark roast. In some embodiments, processors of robots may share data of multiple users in order to learn to make decisions benefiting all present users. For example, if two users prefer a robot to clean at 8:00 AM but one prefers mopping while the other prefers sweeping, the processor of the robot may decide to clean at 8:00 AM using both cleaning functionalities to benefit both users. In another example, an AI system that suggests movies based on learned movie preferences of a user may compile movie preferences of all present users in order to suggest movies that all users may enjoy.

In some embodiments, the processor of a robot may provide suggestions to a user based on learned preferences of the user. For example, a processor of a robot may combine music preferences of a large group of individuals attending an event and suggest songs to play. In another example, processors of housekeeping robots working at separate locations of a hotel chain may learn room preferences of an individual that often travels for work and stays within the same hotel chain and may prepare the room for the individual based on statistical information and probabilities from shared data collected by sensors of the housekeeping robots (e.g., pillow type preference, lighting preference, alarm settings, etc.) or may provide suggestions to the user. For instance, the processor of a robot may decide to turn on a warm shower for the user at 6:15 AM based on previous intelligence on the time the user woke up and the temperature of the shower the user used. Or the processor of the robot may provide the user with a suggestion to set the alarm for 6:15 AM based on previous intelligence on the time the user woke up.

In some embodiments, the processor of a robot may connect with various electronic devices within the environment, including static and mobile devices. In some embodiments, the processor of the robot may be pre-paired with particular electronic devices. In some embodiments, the processor of the robot may search for one or more electronic devices with which it may establish a connection. In some embodiments, a user may be notified if the processor is unable to establish a connection with a particular electronic device. In some embodiments, a user may provide commands to the robot and the processor of the robot may process the commands, and if applicable relay the commands to the paired electronic devices to which the commands are directed. In some embodiments, the commands are relayed using RF, Bluetooth, Wi-Fi, or other wireless transmission method. For example, a user may provide an instruction to wash the laundry to a robot. Although the robot does not have the ability to wash the laundry, the processor of the robot may connect with a control unit of a robotic washing machine and may transmit the instruction provided by the user to the control unit of the robotic washing machine. In another example, a user may provide an instruction to vacuum and mop the floors of an environment to a robotic vacuum. A processor of the robotic vacuum may connect with a processor of a robotic mop and after finishing vacuuming may transmit a signal to the processor of the robotic mop notifying the robotic mop to begin mopping the environment. In another case, the processor of the robotic vacuum may transmit a signal to the processor of the robotic mop prior to beginning vacuuming, instructing the robotic mop to follow along a movement path of the robotic vacuum while mopping and remaining a predetermined distance behind the robotic vacuum. In some cases, the robotic mop follows a predetermined distance behind the robotic vacuum by detecting a signal transmitted from the robotic vacuum. In other examples, more than two robots may collaborate in completing complementary tasks. For example, a robotic sweeper may move along a path while sweeping, a robotic mop may follow along the same path immediately behind the robotic sweeper and mop the floors, and a robotic floor polisher may follow along the same path immediately behind the robotic mop while polishing the floors. In other cases, different complementary tasks may be executed by different types of robots. In one example, a user may instruct a robot to turn a shower on ten minutes prior to an alarm sounding. A processor of the robot may connect to a control unit of both the alarm and the shower and may determine a time that the alarm is set to sound and may therefore provide the required instructions to the control unit of the shower. In another example, a user may request a robot to water the lawn. A processor of the robot may connect to a control unit of the sprinklers and transmit the instructions thereby actuating the sprinklers to turn on. In one example, a user may ask a robot to dim, turn off, or turn on, lights in a particular room. A processor of the robot may connect with a control unit of the lights and may transmit the instruction to dim, turn off, or turn on to the control unit of the lights. In some cases, the processor of the robot may connect with a control system of a home, wherein the control system of the home may control light settings, fan settings, blind settings, alarm settings, shower settings, bath settings, surface cleaning robot settings, temperature settings, coffee maker settings, laundry machine settings, oven settings, stove settings, refrigerator settings, microwave settings, sprinkler settings, security system settings, and other settings of the home. A user may request the robot to adjust one of these settings and the processor of the robot may transmit the instruction to the control system of the home. The above are provided as examples, however many possibilities are available. In some embodiments, a user may be notified when a task or action is completed or incomplete. In some embodiments, the notification is provided to the user through an application of a communication device, a user interface of the robot, audio, etc.

In some embodiments, the processor of a robot may interact with the user or another device by answering an asked question or asking a question (e.g., what is the weather outside?), providing particular information when asked or asking for particular information (e.g., provide a joke, play music or a particular song, etc.), playing a game, and by other ways. In some embodiments, the processor of a robot uses information stored internally to respond to an interaction provided by a user or another device. In some embodiments, the robot connects with the internet and searches the internet to respond to an interaction provided by a user or another device. In some embodiments, the robot may follow a user around the environment when not executing an intended function (e.g., cleaning) such that the user may relay commands from any location within the environment. In some embodiments, a user remotely provides instructions to the processor of the robot using a user interface of an application of a communication device. In some embodiments, the processor of robot may understand speech of a user, formulate sentences that a user may understand, and communicate using a computer simulated voice.

Some embodiments include one or more of: broadcasting a signal by a transmitter of a first robot, detecting the signal by a receiver of a second robot, sending a second robot identifier by a transmitter of the second robot, receiving the second robot identifier by a receiver of the first robot, sending confirmation of receipt of the second robot identifier and sending a first robot identifier by the transmitter of the first robot, receiving the first robot identifier by the receiver of the second robot, sending confirmation of receipt of the first robot identifier by the transmitter of the second robot, establishing a data transfer channel (DTC) link between the first and second robots by a processor of the first robot and a processor of the second robot, transferring information (e.g., by transmitting signals) between robots through the DTC link by the processor of the first robot and the processor of the second robot and, performing an action by at least one robot based on the transferred information. The DTC link may be, for example, a secure wireless connection (e.g. Wi-Fi, Bluetooth, or RF) between the first and second robot. In some embodiments, collaborating robots, are actuators that take action or observers that observe the surroundings. In some embodiments, the DTC link is between two actuators, two observers or an actuator and an observer. In some embodiments, the processor of a robot establishes more than one DTC link. Different configurations of connections between collaborating robots may exist. For example, connection between two robots, connection from one robot to multiple robots, connection from multiple robots to one robot, etc. In some embodiments, DTC links are one-way connections wherein transfer of information is unidirectional, are two-way wherein information is bidirectional, or are more complex. In some embodiments, the processor of a robot assigns a measure of strength to a DTC link with another collaborating robot. In some embodiments, the processor adjusts the measure of strength based on the outcome of the collaboration. For example, if shared intelligence between two surface cleaning robots results in reduced time to clean an area, the respective processors increase the measure of strength of the DTC link. In some embodiments, the measure of strength of the DTC link is a probability of the action resulting in a maximum reward. In some embodiments, the DTC link is a vector with magnitude and direction. In some embodiments, the absolute value of the magnitude denotes the strength of the link and represents a probability between 0 and 1 of the action or collaboration resulting in a maximum reward, wherein a value of 1 signifies a very strong link. In some embodiments, if the collaboration between robots is useful for both robots, then the respective processors increase the measure of strength of the DTC link as well as the level of confidence in the information received from the collaborating robot. If the exchange of information is useless to the collaborating robots, the respective processors reduce the measure of strength of DTC link and, if collaboration is repeatedly useless, the shared information may eventually be discarded and the DTC link terminated by the respective processors. For example, if sensor measurements of the environment from a first robot indicate a hallway that allows a second robot to reach a room faster and the second robot with whom the information has been shared travels to the hallway and finds it is blocked, then the exchange of information was not helpful and the processor of the second robot decreases the measure of strength of the DTC link as well as the level of confidence of the information received from the first robot.

In some embodiments, a reward may be assigned by the processor of each collaborating robot or may be assigned by the processor of one robot and back propagated to the other based on the outcome of the collaborative action. In some embodiments, the reward assigned to each robot may be unproportioned. In some embodiments, one goal may be to preform actions that maximize the reward. In some embodiments, the processor of a robot may form, strengthen, weaken or terminate DTC links with other robots, with the goal of forming coalitions that maximize the reward. For example, for a DTC link between an observer and actuator, the strength of the DTC link may be reinforced by the processor when $\exists o(t) \in O \wedge \exists a(t) \in A$, $a(t)|o(t-1) \Rightarrow P[r^*(t) > r(t)]$, wherein o(t) is an observation within the set of observations O, a(t) is an action within the set of actions A, and $r^*(t)$ is the optimal reward compared to all rewards in $\{r\}$, $\forall r \in \{r\} | P[r^* > r]$. For two actuators with actions $aa_1$ and $a_2$, $\exists a_1(t) \in U \wedge \exists a_2(t) \in A$ maximum reward may be assigned by the processor by, for example, saving time. The sum of the reward of $r_1$ and $r_2$ at time t is larger than the sum of $r_1$ at time t and $r_2$ at time t+1, i.e., $(r_1+r_2)(t)|(a_1+a_2)(t) > r_1(t) + r_2(t+1)|(a_1(t) + a_2(t+1))$. For two observers, maximum reward may be assigned by the processor for, for example, useful information gain. This may be quantified by the processor using conditional entropy $H(O_1|O_2) = H(O_1|O_2) - H(O_1) + H(O_2)$, wherein the combination of observations $O_1$ and $O_2$ should reduce the entropy H of observation $O_1$ given its combination with observation $O_2$ for useful information gain. For example, the data captured from a sensor of a first robot and a sensor of a second robot may be combined with one another to produce a higher resolution image or portion of an image. In some embodiments, the DTC link may be terminated by the processor if the strength of the DTC link is below a predetermined threshold. In some embodiments, one goal is to form relationships that provide the most reward and hence have the strongest DTC links.

In some embodiments, a MDP may be used by the processor of a robot to learn with which robots a strong DTC link may be formed and hence with which robots may the most useful coalitions be formed. A MDP consists of a sequence of states and actions followed by rewards. For example, an action may be to combine sensor data from one robot with sensor data from a second robot. If the action of combining the sensor data results in readings with higher confidence level, a reward with greater value may be assigned as compared to the value of the reward assigned if the combination of sensor data results in readings with lower confidence level. A greater reward assigned by the processors of collaborating robots as a result of collaboration between the robots may translate to a stronger DTC link between the two. For example, the magnitude of a DTC link between an observer and actuator with an absolute value of one may signify a strong link and that the actions taken by the actuator given the observations from the observer generate maximum reward with a probability of one. In some embodiments, actions may be taken by a robot to transition from one state to another and after transitioning to each new state the processor may assign a reward to the robot. For two collaborating robots, for example, both may transition to a new state after taking an action to collaborate. The reward may be assigned to both collaborators by their respective processors in one embodiment or may be assigned to one robot by its processor and back propagated to the other robot. In some embodiments, the reward may be divided unevenly between collaborating robots.

In embodiments, a MDP includes a sequence of observed states s and actions a followed by rewards r, i.e., $s_t$, $a_t$, $r_{t+1}$, $s_{t+1}$, $a_{t+1}$, $r_{t+2}$, $s_{t+2}$, $a_{t+2}$, $r_{t+3}$, ... $a_T$, $r_T$, $s_T$. The goal of the robot is to maximize the net reward $R_T$ to be expected in the future. The net reward $R_T = r_{t-1} + \gamma^1 r_{t+2} + \ldots + \gamma^{T-t-1} r_T$ is the sum of the rewards received for the sequence of states and actions experienced beginning from state $s_t$ and ending with terminal state $s_T$, wherein $\gamma$ is a discount factor applied with value $0 \leq \gamma < 1$. In some embodiments, the processor may solve the MDP by using Q-learning, a method based on estimating the expected total net reward in the future of each state-action pair. In some embodiments, the expected net reward for the execution of a sequence of states and actions may be given by a state-action value function. In some embodiments, one goal is for the processor to find an optimal state-action value function by identifying the sequence of states and actions with highest net reward. Since multiple actions may be taken from each state, over time as the number of states experienced, actions, and transitions increase, a goal of the processor is to also find an optimal policy which includes the action from each state with highest reward value. The value of a state-action pair $Q(s,a) = E[R_T | s_t = s, a_t = a]$, also known as the Q-function, may be defined as equivalent to the expected net reward $R_T$ for the sequence of states and actions beginning with state $s_t$ and action $a_t$ and ending with terminal state $s_T$. By finding the sequence of states and actions which maximize the state-action value function $Q(s,a)$, the processor may identify the optimal value function $Q^*(s,a) = \max E[R_T | s_t = s, a_t = a]$. In some embodiments, the processor may derive the optimal policy for each state $\pi^*(s) = \text{argmax } Q^*(s,a)$ by identifying the highest valued action that may be taken from each state. To iteratively calculate the state-action value function for a given state s and action a, the processor may apply the Bellman Optimality equation. The optimal value function obeys Bellman Optimality equation $Q^*(s,a) = E[r + \gamma \max Q^*(s', a')]$. The equation expresses that the value for a given state s and action a is dependent on the current reward r observed at state s and the maximum discounted γ future reward for the next state s' the robot would end up in. The processor may use the equation to iteratively determine the state-action value for a given state s and action a using $Q_{i+1}(s,a)=E[r+\gamma \max Q_i(s', a')]$ as the sequence of states and actions are executed, wherein i is the iteration number beginning at i=0, with $Q_0(s', a')$ being initially guessed. In this particular context, the sequence of states and actions may correspond to the states visited and actions taken (e.g., collaborative actions or individual actions) during a work session or over some time period. Over time, as more states are visited and different actions from each state are evaluated by the processor, the system converges to find the most optimal action to take from each state thereby forming an optimal policy. Further, as different sequences of states and actions are evaluated over time, the system converges to the most optimal sequence of states and actions.

In some embodiments, the processor uses Hebbian Learning to measure the strength of the DTC link W using W'(OA,AA)=W+η(R'−R), wherein W is the strength of the link before collaboration, W' is the strength of the link after collaboration, η is the learning rate, R' is the reward received as a result of collaboration and R is an integration of previous rewards or the expected reward had collaboration between robots not occurred.

In some embodiments, the processor of a robot determines a probability of termination of a DTC link using the Gittins index. In some embodiments, the Gittins index may be a value associated to the state of a stochastic process with a reward function and probability of termination. In some embodiments, the Gittins index may be a measure of the reward that may be achieved by a random process with a termination state and evolving from its present state, with the option of terminating the process at every later stage with the accrual of the probabilistic expected reward from that stage up to the termination state.

In some embodiments, there may be noise in the data of the observer and the action taken by the actuator. In some embodiments, the processor determines conditional entropy of two events $H(AA|OA)=\Sigma_{ij} p(OA_i,AA_j) \log p(OA_i)/p(OA_i,AA_j)$, wherein $p(OA_i,AA_j)$ is the probability that $AA=AA_j$ and $Y=OA_i$. The entropy may be interpreted as the amount of randomness in the outcome of the action executed by the actuator based on the sensory input provided by the observer. For example, there may be a chance that the observation of the observer is the wrong observation or that the action taken by the actuator is not executed as expected. Therefore, in some embodiments, the processor determines a probability $$P(AA|OA) = \frac{P(OA|AA)P(AA)}{P(OA)}$$

for the accuracy of observation of the observer (OA) and the action of the actuator (AA) when determining the expected reward. P(OA|AA) is the probability of the observer making an observation given that the actuator executes a particular action, P(AA) is the probability of the actuator taking a particular action independent of the observation, and P(OA) is the probability of the observer having made an observation.

In some embodiments, the processor balances exploration of new DTC links and exploitation of existing DTC links. For example, actuators may be encouraged to find better sources of information, such as robots with better sensors or ideally positioned sensors, and observers may be encouraged to find actuators that have better use of their information. In some embodiments, the processor uses a regret analysis when determining exploration or exploitation. For example, the processor may determine a regret function $$\rho = T\mu^* - \sum_{t=1}^{T} r_t$$

which is the difference between the reward sum associated with an optimal policy and the sum of the collected rewards, wherein ρ is the regret after T rounds, $r_t$ is the reward in round t, and μ* is the maximum reward mean. In some embodiments, the processor minimizes the regret by defining a cost function, for example $$C(w, b) \equiv \frac{1}{2n} \sum_x \|y(x) - a\|^2,$$

and minimizing the cost function using gradient descent. In this way, at each state, the processor chooses a policy that has a state-action value function at least equal to the previous state. In some embodiments, the processor uses a multi-armed bandit model wherein in a finite and countable state space and action space, the strategy is based on starting the sampling process on a uniform basis over a set of available actions and progressively focuses on the best actions according to previously observed rewards. Given k arms, n rounds with n≥k, and unknown probability distributions P(R|a) for each action, the processor chooses action $a_t \in \{1, 2, \ldots, k\}$ and provides reward $R_t$ according to P(R|a). Given Q(a)=E[R|a], one goal is to maximize the cumulative reward while equivalently minimizing the regret function $\rho=\Sigma_t(Q^*-Q(a_t))$. The regret function quantifies the exploration and exploitation dilemma of a multi-armed bandit problem in the search for the most optimal connections. In fact, regret is an integration of all small unearned rewards. Therefore, the data type is the same as the reward which is a multivariate function. In some cases, the processor solves the squared error of the cost function using stochastic gradient descent to minimize the regret. This ensures at each state a policy that has a value function at least equal to the previous state is chosen.

In some embodiments, the processor uses Monte Carlo Tree Search (MCTS) to maximize the reward. MCTS uses a statistics tree comprised of nodes connected by branches wherein value of nodes are given. Nodes of highest value are of top priority. Nodes may represent different states. The tree begins at the root node, then connects to child nodes and further onwards leaf nodes. The path from the root to a leaf node may represent, for example, states visited and actions taken to transition between states. There are four main steps in MCTS comprising selection, expansion, play-out, and backpropagation. In some embodiments, the processor may iteratively choose different paths and determine associated rewards. In some embodiments, the processor may use Lehmer random number generator to randomize actions chosen. In some embodiments, the processor may backpropagate the result of each path in the tree to reflect the outcome of the actions taken. In some embodiments, the processor may simulate possible actions from a state and choose the action that results in a reward equal to or greater than the previous states.

In some embodiments, collaborative robots may have active or passive status, wherein during active status the transmitter of the robot may broadcast its presence and capabilities to other robots and during passive status the receiver of the robot may monitor broadcasts while the transmitter responds to broadcasts from other robots. In some embodiments, active and passive statuses are not mutex. For example, robots may alternate between active and passive statuses, wherein robots may be active or passive at different times or robots may become active when DTC links weaken or robots may become passive or active depending on the number of DTC links that have been formed. In some embodiments, active and passive mat have different statuses for in-bound DTC links and out-bound DTC links. In some embodiments, there may be a maximum number of links set. In some embodiments, there may be a threshold from which point on the robot transitions from active to passive.

In some embodiments, information shared between processors of robots may be time stamped and contain a header with an identifier of the robot sharing the information. In some instances, wherein the information is passed between processors of multiple robots, the processor of each robot sharing the information may add their identifier to the header. This may be used to prevent information looping, wherein the processor of a robot may disregard incoming information if the header contains their identifier. In some embodiments, processors of intermediary robots may be bypassed. For example, the processor of an actuator robot connected to a processor of an observer robot directly and also indirectly through a processor of an intermediary observer robot may discard the indirect connection with the intermediary observer robot. As a further example, a processor of an actuator robot connected indirectly to a processor of a first observer robot through the processor of an intermediary second observer robot may initiate a broadcast and request direct connection to the processor of the first observer robot in instances where, for example, the processor of the actuator robot is often receiving useful information from the processor of the first observer robot.

In some embodiments, the processor of the robot may keep track of the other robots within their vicinity or with which a DTC link is established, including information on the model, type, functionality, capability, role, status, operating system, security privileges, and approximate proximity of the other robots. In some embodiments, robots may be distributed over a network, such as a network in the cloud, wherein robots may be present at various locations. In such cases of remote collaboration, the processor may account for parameters such as latency. For example, latency may be considered when using satellite images to locate a moving vehicle. In some embodiments, there may be a threshold latency time after which the processor may render the information useless.

In some embodiments, as multiple robots interact with each other, the processor of each robot may establish a different level of trust with each robot it may interact with. In some embodiments, the level of trust may increase or decrease with each interaction depending on the outcome of the interaction. In some embodiments, information shared with the processor of a robot may be ranked at different levels of priority depending on the source of the information, the type of information, and the level of trust established with the source at the time. For example, a processor of a robot receiving information from processors of multiple robots may rank the priority of information received based on the level of trust established with each robot. As a further example, a processor of a robot receiving conflicting information from processors of two separate robots may give higher priority and importance to the information received from the processor of the robot with higher level of trust.

In some embodiments, processors of robots collaborate to generate a map of the environment, localize themselves within the environment, and make decisions (e.g., tasks to be assigned to each robot based on factors such as battery level, physical characteristics such as size, specifications such as maximum speed, functional capabilities, etc.). In some embodiments, the simultaneous collaboration, localization, and mapping is otherwise known as Quantum SLAM. For example, consider the environment of robotic vacuums K and L represented by a grid world and described by a m×n matrix G comprising all state spaces available to the robotic vacuums. In a two-dimensional world, each entry of the matrix may represent a cell of the grid world and have a value (x,y). Robotic vacuum K may be considered an observer while robotic vacuum L may be considered an actuator. Robotic vacuums K and L may understand the environment based on environment matrices $G_k$ and $G_L$, respectively. Coverage matrices $C_k$ and $C_L$ may correspond to environment matrices $G_k$ and $G_L$, respectively, and may be used to indicate coverage of the environment. Each entry of a coverage matrix C may correspond to an entry of an environment matrix G such that each time a cell of the environment in matrix G is covered, a corresponding entry in the coverage matrix C is increased by a value of 1, with all entries of the coverage matrix initially having a value of 0. As such, the coverage matrices may allow the processors of the robotic vacuums to keep track of covered areas of the environment. Initially, each robotic vacuum may begin cleaning the environment individually. At some point, robotic vacuums K and L may meet and establish a DTC link such that the processor of robotic vacuum K, the observer, may share its coverage matrix $C_k$ with the processor of robotic vacuum L, the actuator. The processor of robotic vacuum L may convolve coverage matrices $C_k$ and $C_L$ to combine areas already covered by both robotic vacuums. Since this is an example of cooperative game theory, the processor of robotic vacuum L may devise a policy that distributes coverage of the remaining uncovered cells among the two robotic vacuums considering the maximum reward it may receive itself and the maximum reward it may leave for robotic vacuum K to collect. In some embodiments, wherein the DTC is a two-way link between robots, messages may be exchanged back and forth to ensure the reward function, accounting for the reward received by both robots, is maximized. The uncovered cells of the environment, when divided for coverage by robotic vacuums K and L, may reduce cleaning time of the environment and thereby increase the reward received, assuming the reward is dependent on cleaning time. Further, if total cleaning time of the environment is reduced as a result of collaboration with robotic vacuum K, the processor of robotic vacuum L may reinforce the measure of strength of the DTC link with robotic vacuum K. In some embodiments, wherein non-cooperative game theory is applied and the processors of robotic vacuums K and L each attempt to maximize their own reward individually at the expense of one another, Nash equilibrium may apply. When each robotic vacuum has chosen a strategy and no robotic vacuums can benefit by changing strategies while all other robotic vacuums keep their strategies unchanged, then the current set of strategies and corresponding payoffs constitute a Nash equilibrium. For example, robotic vacuums K and L are in Nash equilibrium if the processor of robotic vacuum K chooses the best strategy to execute for coverage of the environment, taking into account the policy chosen by the processor of robotic vacuum L and the processor of robotic vacuum L chooses the best policy to execute for coverage of the environment, taking into account the strategy chosen by the processor of robotic vacuum K. Since our case is an instance of cooperative Game Theory, the processor of robotic vacuum L may calculate a heuristic policy, calculating the path of robotic vacuum K from its current location to its base location (as well as its own path) and devises a policy that distributes the remaining work among them considering that maximum reward it would get and the maximum reward it would leave for robotic vacuum K to collect. If this was a two-way link, the processors of both robots may exchange a few messages to achieve arg max $(R_L+R_K)$, wherein $R_L$, $R_K$ are the rewards. If robotic vacuum L finishes the task earlier, thus receiving a reward with less cost (i.e., time is a penalty), it reinforces its link to robotic vacuum K with a W factor (Hebbian Learning) proportional to the probability of earning more rewards the next round. In in this example robotic surface cleaners collaborate to cover an area for cleaning more efficiently by dividing the surface area for cleaning and avoiding repeat coverage by sharing their respective coverage matrices. This same example may be applied to various types of collaborating robots.

For two or more robots, the problem of reinforcement learning (RL) may become more complex. In some embodiments, RL such as Q-learning, may be combined with deep learning (DL). RL may be used to define the objectives while DL may learn the complex representations to achieve such objectives. DL is a general framework for learning the representation of complex models and may be composed of linear transformations, convolution operations, non-linear activation functions, such as ReLU, and loss functions such as, mean square error (MSE) and log likelihood. The combination of RL and DL may be known as Deep Reinforcement Learning (DRL). In instances wherein Q-learning is used, the process may be known as Deep Q-learning (DQL) wherein deep neural networks represent the state-action value function (or Q-function) $Q(s, a; w)$. For example, a Deep Q-Network (DQN) may be a combination of a convolutional neural network (CNN) for learning feature representations with Q-learning algorithm. The DQN may represent the state-action value function $Q(s, a; w)$ wherein w is the network parameters. Given that the optimal value function $Q^*(s, a; w)=E[r+\gamma \max Q^*(s', a'; w')]$ obeys Bellman Optimality equation, a loss function $L(w)=[r+y \max Q^*(s', a'; w')-Q(s, a; w)]^2$ may be defined. In some embodiments, the processor minimizes the MSE of the loss function $L(w)$ by gradient descent in the DQN to find the optimal state-action value function. In some embodiments, the processor uses a separate target network with parameters w', as above, m in estimating the maximum state-action value function. In some embodiments, the processor balances exploitation of current optimal policy and exploration of potentially better policies by employing a greedy approach that ensures the processor samples a random action some percentage of the time. To avoid suboptimal connections resulting from randomly generated events the processor may terminate some connections and for each terminated connection may redistribute its weight to other intact random connections. In some embodiments, the processor may use experience replay wherein all experiences (s, a, r, s') may be stored in a replay memory and random mini-batches from the replay memory may be used instead of the most recent transition when training the network. This provides stability as RL may be unstable when a nonlinear function, such as a neural network, is used to approximate the value function.

In some embodiments, processors of robots use a Deep Collaborative Reinforcement Learning framework for collaborative intelligence, the framework being a combination of a deep convolutional neural network (CNN), a deep Q-network (DQN), and a reward function for action and communication selection. For example, for collaborative robotic vacuums, the input to a CNN by may be a grid map in the form of a two-dimensional array wherein each entry of the array corresponds with a cell of the grid map and an entry having a value of one indicates coverage of the cell while a value of zero indicates no coverage of the cell. The output of the CNN may be merged with a feature of action history and used as input to a DQN. The output of the DQN may be possible actions of the robotic vacuum, such as, move forward, move backward, move right, move left, and stop. Followed by each action, the processor may update the grid map and may share the updated information with processors of at least some cooperative robots. In an example of a Deep Collaborative Reinforcement Learning framework used by processors of robotic vacuums, as in the example described above, a grid map is provided as input into a CNN. Output feature vector of the grid map and action history are provided as input into a DQN which outputs an action. The action is passed to outbound DTC which may then be shared with processors of collaborating robots receiving the information through an inbound DTC to update their grid map accordingly. Further details of the example are provided in U.S. patent application Ser. Nos. 15/981,643 and 16/747,334, the entire contents of which are hereby incorporated by reference. In some embodiments, the grid map (with values of zero and one for uncovered and covered cells, respectively) provided as input into the CNN is in the form of a 2D input array. In some embodiments, the CNN architecture includes a cascade of convolutions and ReLU functions. For example, the basic architecture used for the CNN may include: a first layer that convolves 32 filters of 8×8 with a stride of 4 and applies a ReLU activation function; a second layer that convolves 64 filters of 4×4 with a stride of 2 and applies ReLU activation function; and a third layer that convolves 64 filters of 3×3 with a stride of 1 and applies a ReLU activation function. In some embodiments, the DQN architecture includes two fully connected layers which map the input feature map to the output actions, the first layer including a fully-connected layer consisting of 512 rectifier units and the second layer including a fully-connected linear layer with a single output for each valid action (e.g., a total of 5 outputs). In some embodiments, the reward function may be proportional to the whole area that has been covered by the robots. In some instances, a goal of collaboration is to cover an area in the shortest time. For the example of collaborative robotic vacuums described above, the reward function may be based on the total area covered and the total time. To consider both factors in the reward function the processor of a robotic vacuum may assign a reward of one when the robot finishes operation in a cell and negative one when it operates in a cell that has already been cleaned. In some embodiments, the processor incorporates the reward function in a reinforcement learning setting to learn a covering policy, based on the DQN algorithm. In some embodiments, the reward function used by the DQN may be based on various factors depending on the desired goals of the collaborative robots. In some embodiments, different CNN and/or DQN configurations may be used. In some embodiments, modifications in the model may be made to fit temporal difference learning and Q-learning, depending on the real-world applications of the collaborative robots.

In some embodiments, the processor of a robot may train the neural network comprised of a CNN and DQN using Q-learning to learn a policy that maximizes future expected reward as described above. For example, for robotic surface cleaning devices, input into the network may be a feature map in the form of a two-dimensional array and the output Q-values for each possible action. The network may then decide the best action to execute based on the Q-value for each possible action. In some embodiments, the network may be trained millions of times (or another number of times) via Q-learning to maximize the future expected reward. In some embodiments, Q-values may be any real values that the processor may optimize with simple squared error loss $L(w)=[r+\gamma \max_u Q(s',u'; w')-Q(s,u;w)]^2$ using backpropagation. In some embodiments, given a transition (s, u, r, s'), backpropagation includes providing a feed forward pass for the current state s to get predicted Q-value Q(s, a; w) for all actions, providing a feed forward pass for the next state s' to calculate the maximum overall network output max Q*(s',a';w'), setting the Q-value target for the corresponding action to r+γ max Q* (s', a'; w'), setting, for all other actions, the Q-value target to the predicted Q-value Q(s, a; w), thereby making the loss zero for those outputs, and updating the weights of the network using back propagation.

In some embodiments, the processor of a robot employs experience replay wherein all experiences (s, a, r, s') may be stored in a replay memory and random mini-batches from the replay memory may be used by the processor instead of the most recent transition when training the network. This provides stability as RL may be unstable when a nonlinear function, such as a neural network, is used to approximate the value function. In an example of a method used by a processor for training a single surface cleaning robot a grid map is provided as input to the network. A current state is provided to a predictor DQN and a predicted Q-value is determined for a selected action. A next state is provided to an estimator DQN to determine the maximum overall network output max Q*(s', a'; w') and a set Q-value target for the corresponding action to r+γ max Q* (s', a'; w'). Based on a loss between the target Q-value and the predicted Q-value, the processor uses gradient descent to minimize the loss and hence optimize the actions of the robot over time. Another example includes testing of a trained network of a single surface cleaning robot, wherein a grid map is provided as input into a trained DQN and an action selection is provided as output from the DQN. A random action generator simultaneously outputs a random action. Both the action selected by the DQN and the random action from the random action generator are provided as input into a greedy algorithm that chooses either the action output from the DQN or the random action. This allows for a balance between exploration and exploitation. Further details of these examples are provided in U.S. patent application Ser. Nos. 15/981,643 and 16/747,334, the entire contents of which are hereby incorporated by reference.

In some embodiments, decentralized learning may be used wherein the processor of each robot learns its own Q-network parameters, treating the other robots as part of the environment, thereby using the environment as the sole source of interaction between robots. In this case, message passing is accomplished using DTC links to share information. In some embodiments, the processor of a robot trains a single network (e.g., its own network) and shares the parameters with processors of other robots. However, execution remains decentralized, at which point processors of robots receive different observations leading to different behavior. For example, processors of two floor cleaning robots may share grid map information through a DTC link. Followed by each action, the processor of each robot may update their grid map and share their updated grip map with the processor of the collaborating robot. At the same time, only the processor of one robot is training its DQN and sharing the DQN weights with the processor of the other robot while processors of both robots are testing their own DQN. In some embodiments, decentralized learning for covering areas (e.g., operating in areas) within a map may be beneficial as only one DQN needs to be trained for coverage areas within the map which makes the training faster and less complicated, and the number of collaborative robots is not required wherein at execution time any number of robots may be collaborated for coverage of areas within the map. In one example of decentralized learning of a single DQN of a robotic vacuum, the network of the first robotic vacuum is being trained and its DQN weights are shared with the processor of a second robotic vacuum. Processors of the first and second robotic vacuums update their grid map after each action and share their respective grid map information with each other. In such an approach execution is decentralized, processors of collaborating robots receive different observations leading to different behaviors. In another example of decentralized learning of a DQN, processors of two collaborating robotic vacuums, each learn their own network parameters. The processor of a first robotic vacuum may share its action selection with the processor, and hence DQN, of a second robotic vacuum. The processor of the second robotic vacuum may receive the action of the first robotic vacuum as input into its DQN and consider it in deciding an action. In this approach, the processor of each robot learns its own Q-network parameters, treating the other robots as part of the environment. In this case, message passing is accomplished using DTC links to share information. Followed by each action, the processor of each robot updates its respective grid map and shares the information with the processors of cooperative robots. In this approach, the execution remains decentralized, at which point the processors of robots receive different observations leading to different behaviors.

In some embodiments, the processor of a robot may use centralized learning wherein information may be passed between processors of robots. As a result, gradients may be pushed through DTC links, yielding a system that is end-to-end trainable, even across robots. For example, for each robot a, one Q-network $Q(s^a,u^a;w^a)$ is instantiated. In the setting of multi-robot RL, processors of robots may use a Q-function that facilitates inter-robot communication $Q(s^a, u^a im^a om^a;w^a)$ wherein $im^a$ and $om^a$ denote inbound messages and outbound messages for robot a, respectively, through a DTC link. In each time-step, the processors of robots select an environment action $u \in U$ that affects the environment, and a communication action $m \in M$ that is observed by other robots but has no direct impact on the environment or reward. In an example of centralized learning for multiple collaborative robots, processors of robots may pass messages between one another during learning. As such, gradients may be pushed through DTC links, yielding a system that is end-to-end trainable across robots. In some embodiments, real-valued messages are discretized by the processors during execution and mapped to the discrete set of communication actions allowed by the task.

In one example, a hierarchical approach employing decentralized training may be used by processors of surface cleaning robots to collaboratively clean all areas within the map of the environment. In this approach, a model may be trained (e.g., by an external processor or a processor of one or more robots) for cleaning a map with size of 10×10. At execution time, processors of robots may use the trained model for cleaning a map with size of 100×100. In other embodiments, the model may be used for cleaning a map with any size. In some embodiments, the hierarchical approach employing decentralized training includes: 1) training a DQN on a 10×10 map, which may be efficient in terms of time and complexity, 2) applying the trained DQN to a larger map size such as 100×100, without training for a large map size, and 3) training of the DQN for a single robotic vacuum, while testing of the DQN may be done for multiple collaborative robotic vacuums. In some embodiments, the hierarchical method is composed of two layers. In the first layer, a virtual map (VMap) with size of 10×10 and virtual robotic vacuums are defined. In the second layer, the real large map (LMap) with size of 100×100 and actual robotic vacuums are defined. In some embodiments, the actual robots move in the LMap based on 1) the movement of the robots of the first layer and 2) their own DQN network. In some embodiments, the LMap may be considered as 100 small maps (SMap) with size of 10×10. In some embodiments, each SMap in the LMap may be equivalent to one cell in the VMap of the first layer. In some embodiments, the VMap (with size 10×10) may be considered as a low-resolution version of the LMap (with size 100×100) and each cell in the VMap may be equivalent to a 10×10 block in the LMap. In some embodiments, the DQN for cleaning of the VMap is initially executed for virtual robotic vacuums. In some embodiments, the trained DQN of a single robot on a 10×10 map is used. In some embodiments, the output of the executed DQN for cleaning of the VMap in the first layer are the cleaning paths (and hence cells covered) of all virtual robotic vacuums. In some embodiments, these cleaning paths indicate how the actual robotic vacuums should move in the LMap of the second layer and which SMap should be cleaned by each robot. For example, if a virtual robot 1 cleans locations (2,3), (3,3), (3,4), etc. in the VMap, the actual robot 1 should clean SMaps at locations (2,3), (3,3), (3,4), etc. in the LMap, respectively. In some embodiments, in the second layer, for each SMap, the DQN for each actual robotic vacuum is executed to clean the Lmap. In some embodiments, at the second layer, each SMap is cleaned by only one of the actual robots, while the whole LMap is cleaned by all the actual robots. Therefore, in some embodiments, the first layer indicates which blocks of the second layer should be cleaned by each robot.

In some embodiments, decentralized learning with a single DQN may be used in the training and testing (execution) phases, as described above. In some embodiments, the single DQN may be trained (e.g., by the processor of a robot or an external processor) using a map with size of 10×10, and then in the testing phase, the trained network may be used by processors of collaborative robotic vacuums for cleaning a map with size of 100×100. In other embodiments, other sizes of maps may be used. In the training phase, the processor of a single robotic vacuum may use a single DQN for cleaning of a map with size of 10×10. In some embodiments, 'VacuumRobot' and 'Environment' classes may be used to define a robotic vacuum and a map with size of 10×10, respectively. Followed by the training, the training weights that may be used by processors of robotic vacuums for cleaning of a new map are obtained. In the testing phase, the trained DQN may be used by processors of multiple robotic vacuums for cleaning of a new map. In this approach, the single trained DQN may be used and its parameters shared among processors of all robotic vacuums. In some embodiments, a list of objects may be defined from the 'VacuumRobot' class to represent the collaborative robotic vacuums and the 'Environment' class may be used to define a map with size of 100×100.

In some embodiments, objects are added to the map by defining a new variable obstacle in the 'Environment' class. The obstacle variable may be defined as a matrix of the same size as the map, each matrix entry corresponding with a cell (i.e., location) in the map. The values of each entry in matrix may be zero to indicate no object or one to indicate the presence of an object. In some embodiments, the robots clean the cells of the map based on the values of the entries in the matrix defining the obstacle variable. If a cell is occupied by an object, the robot may not move into that location. In some embodiments, the DQN makes decision about the next movement of the robot based on the current state of the robot. In some embodiments, a post-processing check is implemented to make sure the next location of a robot is not occupied by an object. If the next location is occupied by an object, the robot does not move to that location.

In some embodiments, to collaboratively clean a 100×100 map, each robotic vacuum cleans a SMap with size of 10×10 and then moves to the next SMap. In some embodiments, there is a jump from the ending point in the current SMap to the starting point of the next SMap because in each SMap the initial and final locations of the robot are random. In some embodiments, the initial location is selected by a random function and the final location is indicated based on the decision of DQN. Therefore, in some embodiments, movement of the robot between the SMaps may not be continuous. In some embodiments, when a robot finishes cleaning of the current SMap, the initial location of the next SMap is randomly indicated. In some embodiments, the processor of a robot implements a path finder method to find the shortest path from the last location in the current SMap to the initial location in the next SMap and avoid jumps. In some embodiments, the robot moves along the path to the next SMap and starts cleaning of the next SMap. In some embodiments, the path finder method may be based on Dijkstra method to find the shortest path by considering the objects (or otherwise obstacles).

In some embodiments, semi-autonomous or autonomous vehicles may collaborate to travel more efficiently and safely by sharing intelligence. For example, U.S. patent application Ser. No. 14/948,620, hereby incorporated by reference, describes a method for a guiding vehicle to collaborate with semi-autonomous or autonomous follower vehicles by sharing real-time intelligence on destination, route, navigation, obstacles, traffic, etc. using transmitters and receivers of vehicles. In some embodiments, vehicles with at least a portion of the same route of the guiding vehicle may join the driving group wherein the processor of follower vehicles use shared intelligence as well as information gathered by their sensors to control navigation and maneuver the vehicle. In some embodiments, follower vehicles may relay information to one another using transmitters and receivers after establishing a DTC link. In some embodiments, the guiding vehicle may broadcast signals from a transmitter including at least its destination, planned route, and unique identifier. In some embodiments, follower vehicles may receive the signal by a receiver and the processor may determine whether to join the driving group. For example, a follower vehicle may join the driving group when the processor detects that they share at least a portion of the same route as the guiding vehicle. In some embodiments, follower vehicles may be arranged behind the guiding vehicle in lines and maintain a particular distance between themselves and adjacent vehicles using distance sensors or the like. In some embodiments, the guiding vehicle may share information such as, clock or time, velocity, steering position, rate of acceleration, rate deceleration, location, planned route, obstacle data, road condition data, weather data, map, depth data, traffic data, capabilities, virtual lane data, accident reports, or any other useful information using a transmitter. In some embodiments, receipt of driving information from a guiding vehicle may cause the processor of a follower vehicle to activate its actuators. For example, a follower vehicle may be actuated by the processor to accelerate if the guiding vehicle accelerates or adjust its steering position given the steering position of the guiding vehicle. In some embodiments, processors of autonomous vehicles and/or fixed sensing devices monitoring the environment may collaborate and share observations of the environment with one another to be able to observe areas beyond their current field of view. This may be useful when the current field of view of an autonomous vehicle is obstructed by, for example, a sloped road or a stationary object. The ability to observe the environment beyond the current field of view of the sensors of an autonomous vehicle may be beneficial in embodiments wherein the speed of the autonomous vehicle may be limited by their current field of view. In some embodiments, autonomous vehicles driving within the same vicinity may collaborate to determine virtual lanes, driving direction of lanes, driving speed, space between adjacent vehicles, arrangement of vehicles, etc. given observations of the environment such as traffic in both driving directions, size of vehicles, road space, and capabilities of the autonomous vehicles.

Some embodiments may include a collaborative artificial intelligence technology (CAIT) system wherein connections and shared intelligence between devices span across one or more environments. CAIT may be employed in making smart decisions based on collective artificial intelligence of its environment. CAIT may use a complex network of AI systems and devices to derive conclusions. In some cases, there may be manual settings and the manual settings may influence decisions made (e.g., the level of likelihood of saving at least a predetermined amount of money that should trigger providing a suggestion to the user). In embodiments, collective artificial intelligence technology (CAIT) may be applied to various types of robots, such as robot vacuums, personal passenger pods with or without a chassis, and an autonomous car. For example, an autonomous battery-operated car may save power based on optimal charging times, learning patterns in historical travel times and distances, expected travels, battery level, and cost of charging. In one case, the autonomous car may arrive at home 7 PM with an empty battery and given that the user is not likely to leave home after 7 PM, may determine how much charge to provide the car with using expensive electricity in the evening (evening) and cheaper electricity (daytime) during the following day and how much charge to attempt to obtain from sunlight the following morning. The autonomous vehicle may consider factors such as what time the user is likely to need the autonomous car (e.g., 8, 10, or 12 PM or after 2 PM since it is the weekend and the user is not likely to use the car until late afternoon). CAIT may be employed in making decisions and may save power consumption by deciding to obtain a small amount of charge using expensive electricity given that there is a small chance of an emergency occurring at 10 PM. In some cases, the autonomous car may always have enough battery charge to reach an emergency room. Or the autonomous car may know that the user needs to run out around 8:30 PM to buy something from a nearby convenience store and may consider that in determining how and when to charge the autonomous car. In another example, CAIT may be used in hybrid or fuel-powered cars. CAIT may be used in determining and suggesting that a user of the car fill up gas at the gas station approaching at it has cheaper gas than the gas station the user usually fuels up at. For instance, CAIT may determine that the user normally buys gas somewhere close to work, that the user is now passing a gas station that is cheaper than the gas the user usually buys, that the car currently has a quarter tank of fuel, that the user is two minutes from home, that the user currently has 15 minutes of free time in their calendar, and that the lineup at the cheaper gas station is 5 minutes which is not more than the average wait time the user is used to. Based on these determinations CAIT may be used in determining if the user should be notified or provided with the suggestion to stop at the cheaper gas station for fueling. Further examples and details of CAIT that may be used is described in U.S. patent application Ser. No. 16/920,328, the entire contents of which are hereby incorporated by reference. For instance, transportation sharing services, food delivery services, online shopping delivery services, and other types of services may employ CAIT.

In some embodiments, the relationship between collaborating robots (or a user and a robot) may be assigned a loyalty index by the processors of the robots, the value of which indicates the strength of the relationship. For example, U.S. patent application Ser. Nos. 15/986,670, 16/568,367, 14/820,505, 15/986,670, and 16/221,425, the entire contents of which is hereby incorporated by reference, describes a loyalty index that may be assigned to collaborating robots by their respective processors. In some embodiments, the loyalty index may be increased or decreased by the processors of the robots depending on the number of times the robots have authenticated one another, the outcomes of their interactions, the length of their relationship, and other factors. For example, if a first robot commands a second robot to vacuum a hallway and the second robot fails to or does a poor job of vacuuming the hallway the processor of the first robot may consider the second robot unreliable and therefore lower its loyalty index. Alternatively, if the second robot succeeds at cleaning the hallway the processor of the first robot may increase its loyalty index. In some embodiments, the value of the loyalty index may determine the type of interaction permitted between the robots. In some embodiments, processors of robots use loyalty index thresholds to determine the type of interactions permitted with other collaborating robots. For example, a low loyalty index between robots may permit authentication and the exchange of information while a high loyalty index may additionally permit robots to collaborate to complete a task together or permit one robot to command the other. In some embodiments, wherein a robot interacts with multiple other robots, the robot with whom the highest loyalty index is established is considered to have the highest level of trust. For example, if a robot interacts with two other robots having conflicting commands, the robot with whom the higher loyalty index is established is trusted by the processor of the robot. In some embodiments, the loyalty index may act a security measure against intruding robots as interactions between robots are limited until different levels of loyalty index thresholds are achieved.

In some embodiments, processors of collaborating robots use a block chain algorithm to protect against authorization over a network device or endpoint device. In some embodiments, the loyalty-based security system may give more weight and confidence to a stream of devices that have not been swapped for longer periods of times. In some embodiments, the loyalty-based security system may establish increased loyalty between a chain of devices such that more traffic is transmitted over the most trusted paths and such that sensitive information is not transmitted over paths that include new devices. In some instances, the decisions follow a machine learned algorithm to identify what happens in each situation. The algorithm may be trained and a deep neural network may be used to follow the same pattern for making the future decisions. In some embodiments, if a network device is swapped due to maintenance needs, the trust of the path including the new device reduces as it is initially unknown if the swap is an attack or legitimate maintenance. However, the trust of the path including the new robot increases with time and as more communication is executed through the path without any report of a security breach. In some embodiments, this allows time for reaction to a possible man in the middle attack. In some embodiments, a graph is defined with various nodes and vertices, wherein each node represents a device in the network and is assigned a mac address, an IP address, and some other network identification parameters. In some embodiments, a block chain may initiate a seed encryption on the first node (or first device) and pass the key onto the next node, continuing to the last node (or last device). In some embodiments, the structure of the nodes form a spanning tree. In some embodiments, in a converged network of devices, the life of the block chain is approximately homogenous. In some embodiments, if a device is inserted, swapped, or taken out of the network, the block chain is re-calculated and is hence a new block chain. In some embodiments, it may be unlikely that a hash is recreated within a timely manner because of the properties of block chain and the decryption time. In some embodiments, a loyalty counter proportional to the time it takes a hash to be brute forced by a powerful computer is implemented. As long as the increase in the loyalty counter is less than the expected time of brute force of a hash with a powerful computer, there is reasonable security. This may act as a barrier against an intruder attempting to achieve control over one or more end point devices. This feature may particularly be important for security robots and autonomous driving cars, where unauthorized control over the robot could endanger lives or jeopardize an operation. In some embodiments, the value of the loyalty index determines the level of control over the robot, where a very high loyalty index allows complete control over the robot system. In some embodiments, the loyalty counter of users may be programmed to decay over time. This may be effective and resistant against manipulation of a time sensitive data accumulation process.

In some embodiments, a control system may manage multiple collaborating robots. An example of a control system for managing one or more robots is described in U.S. patent application Ser. Nos. 16/130,880, 16/245,998, and 16/920,328, the entire contents of which is hereby incorporated by reference. In some embodiments, a follower robot follows a robot using methods such as those described in U.S. patent application Ser. Nos. 14/948,620 and 16/402,122, the entire contents of which is hereby incorporated by reference. In embodiments, any of the methods and techniques for collaboration between robots and/or electronic devices (including communication methods) described in U.S. patent application Ser. No. 16/920,328 may be used, the entire contents of which are hereby incorporated.

In some embodiments, the processor of the robot may pair with an application of a communication device, using methods such as those described in U.S. patent application Ser. No. 16/109,617, the entire contents of which is hereby incorporated by reference. In some embodiments, the processor of the robot may transmit the map of the environment to the application of a communication device (e.g., for a user to access and view). In some embodiments, the map of the environment may be accessed through the application of a communication device and displayed on a screen of the communication device, e.g., on a touchscreen. In some embodiments, the processor of the robot may send the map of the environment to the application at various stages of completion of the map or after completion. In some embodiments, the application may receive a variety of inputs indicating commands using a user interface of the application (e.g., a native application) displayed on the screen of the communication device. Some embodiments may present the map to the user in special-purpose software, a web application, or the like. In some embodiments, the user interface may include inputs by which the user adjusts or corrects the map perimeters displayed on the screen or applies one or more of the various options to the perimeter line using their finger or by providing verbal instructions, or in some embodiments, an input device, such as a cursor, pointer, stylus, mouse, button or buttons, or other input methods may serve as a user-interface element by which input is received. In some embodiments, after selecting all or a portion of a perimeter line, the user may be provided by embodiments with various options, such as deleting, trimming, rotating, elongating, shortening, redrawing, moving (in four or more directions), flipping, or curving, the selected perimeter line. In some embodiments, the user may add perimeter lines by drawing new perimeter lines. In some embodiments, the application may identify unlikely boundaries created (newly added or by modification of a previous perimeter) by the user using the user interface. In some embodiments, the user interface presents drawing tools available through the application of the communication device. In some embodiments, a user interface may receive commands to make adjustments to settings of the robot and any of its structures or components. In some embodiments, the application of the communication device sends the updated map and settings to the processor of the robot using a wireless communication channel, such as Wi-Fi or Bluetooth.

In some embodiments, the map of the area, including but not limited to doorways, sub areas, perimeter openings, and information such as coverage pattern, room tags, order of rooms, etc. is available to the user through a graphical user interface (GUI) of the application of a communication device, such as a smartphone, computer, tablet, dedicated remote control, or any device that may display output data from the robot and receive inputs from a user. Through the GUI, a user may review, accept, decline, or make changes to, for example, the map of the environment and settings, functions and operations of the robot within the environment, which may include, but are not limited to, type of coverage of the entire area or each subarea, correcting or adjusting map boundaries and the location of doorways, creating or adjusting subareas, order of cleaning subareas, scheduled cleaning of the entire area or each subarea (date, time, frequency, cleaning settings, etc.), activating or deactivating tools such as UV light, suction and mopping, tool settings such as impeller power. Examples of robot scheduling methods that may be used are described in U.S. patent application Ser. Nos. 16/051,328, 15/449,660, and 16/667,206, the entire contents of which are hereby incorporated by reference. User inputs are sent from the application to the robot for implementation. For example, the user may use the application to create boundary zones or virtual barriers and cleaning areas. In some embodiments, the application suggests a correcting perimeter.

In some embodiments, the user may create different areas within the environment via the user interface (which may be a single screen, or a sequence of displays that unfold over time). In some embodiments, the user may select areas within the map of the environment displayed on the screen using their finger or providing verbal instructions, or in some embodiments, an input device, such as a cursor, pointer, stylus, mouse, button or buttons, or other input methods. In some embodiments, the user may label different areas of the environment using the user interface of the application. In some embodiments, the user may use the user interface to select any size area (e.g., the selected area may be comprised of a small portion of the environment or could encompass the entire environment) or zone within a map displayed on a screen of the communication device and the desired settings for the selected area. For example, in some embodiments, a user selects any of: cleaning modes, frequency of cleaning, intensity of cleaning, power level, navigation methods, driving speed, etc. In some embodiments, the processor autonomously divides the environment into different areas and in some instances, the user may adjust the areas of the environment created by the processor using the user interface.

In some embodiments, the user may adjust or choose tool settings of the robot using the user interface of the application and may designate areas in which the tool is to be applied with the adjustment. Examples of tools of a surface cleaning robot include a suction tool (e.g., a vacuum), a mopping tool (e.g., a mop), a sweeping tool (e.g., a rotating brush), a main brush tool, a side brush tool, and an ultraviolet (UV) light capable of killing bacteria. Tool settings that the user may adjust using the user interface may include activating or deactivating various tools, impeller motor speed or power for suction control, fluid release speed for mopping control, brush motor speed for vacuuming control, and sweeper motor speed for sweeping control. In some embodiments, the user may choose different tool settings for different areas within the environment or may schedule particular tool settings at specific times using the user interface. In some embodiments, the user may adjust or choose robot cleaning settings using the user interface. Robot cleaning settings may include, but are not limited to, robot speed settings, movement pattern settings, cleaning frequency settings, cleaning schedule settings, etc. In some embodiments, the user may choose different robot cleaning settings for different areas within the environment or may schedule particular robot cleaning settings at specific times using the user interface. In some embodiments, the user may choose the order of covering or operating in the areas of the environment using the user interface. In some embodiments, the user may choose areas to be excluded using the user interface. In some embodiments, the user may adjust or create a coverage path of the robot using the user interface. For example, the user adds, deletes, trims, rotates, elongates, redraws, moves (in all four directions), flips, or curves a selected portion of the coverage path. In some embodiments, the user may adjust the path created by the processor using the user interface. In some embodiments, the user may choose an area of the map using the user interface and may apply particular tool and/or operational settings to the area. In other embodiments, the user may choose an area of the environment from a drop-down list or some other method of displaying different areas of the environment.

In some embodiments, the user interface may indicate in the map a path the robot is about to take or has taken (e.g., according to a routing algorithm) between two points, to cover an area, or to perform some other task. In some embodiments, via the user interface or automatically without user input, a starting and an ending point for a path to be traversed by the robot may be indicated on the user interface of the application executing on the communication device. In some embodiments, the map may include information such as debris or bacteria accumulation in different areas, stalls encountered in different areas, obstacles, driving surface type, driving surface transitions, coverage area, robot path, etc. In some embodiments, the user may use user interface of the application to adjust the map by adding, deleting, or modifying information (e.g., obstacles) within the map. For example, the user may add information to the map using the user interface such as debris or bacteria accumulation in different areas, stalls encountered in different areas, obstacles, driving surface type, driving surface transitions, etc.

In some embodiments, the application of the communication device may display the spatial representation of the environment as its being built and after completion; a movement path of the robot; a current position of the robot; a current position of a charging station of the robot; robot status; a current quantity of total area cleaned; a total area cleaned after completion of a task; a battery level; a current cleaning duration; an estimated total cleaning duration required to complete a task; an estimated total battery power required to complete a task, a time of completion of a task; obstacles within the spatial representation including object type of the obstacle and percent confidence of the object type; obstacles within the spatial representation including obstacles with unidentified object type; issues requiring user attention within the spatial representation; a fluid flow rate for different areas within the spatial representation; a notification that the robot has reached a particular location; cleaning history; user manual; maintenance information; and firmware information.

In some embodiments, the application of the communication device may receive an input designating an object type of an obstacle with unidentified object type; a schedule for cleaning different areas within the spatial representation; vacuuming or mopping or vacuuming and mopping for cleaning different areas within the spatial representation; a suction level for cleaning different areas within the spatial representation; a no-entry zone; a no-mopping zone; a virtual wall; a modification to the spatial representation; a fluid flow rate level for mopping different areas within the spatial representation; an order of cleaning different areas of the environment; deletion or addition of a robot paired with the application; an instruction to find the robot; an instruction to contact customer service; an instruction to update firmware; a driving speed of the robot; a volume of the robot; a voice type of the robot; pet details; deletion of an obstacle within the spatial representation; an instruction for a charging station of the robot; an instruction for the charging station of the robot to empty a bin of the robot into a bin of the charging station; and an instruction for the charging station of the robot to fill a fluid reservoir of the robot. In some embodiments, the application may receive an input enacting an instruction for the robot to pause a current task; start mopping or vacuuming; dock at the charging station; start cleaning; spot clean; navigate to a particular location; and move or rotate in a particular direction.

In some embodiments, the map formed by the processor of the robot during traversal of the working environment may have various artifacts like those described herein. Using techniques like the line simplification algorithms and convolution will smoothing and filtering, some embodiments may remove clutter from the map, like artifacts from reflections or small objects like chair legs to simplify the map, or a version thereof in lower resolution to be depicted on a user interface of the application executed by the communication device. In some cases, this may include removing duplicate borders, for instance, by detecting border segments surrounded on two sides by areas of the working environment and removing those segments.

In some embodiments, the application of the communication device may display the spatial representation of the environment as its being built and after completion; a movement path of the robot; a current position of the robot; a current position of a charging station of the robot; robot status (e.g., cleaning, charging, sleeping, etc.); a current quantity of total area cleaned; a total area cleaned after completion of a task; coverage statistics; a battery level; a current cleaning duration; an estimated total cleaning duration required to complete a task; an estimated total battery power required to complete a task; a time of completion of a task; a number of bin empties; a number of reservoir refills; obstacles within the spatial representation including object type of the obstacle and percent confidence of the object type; obstacles within the spatial representation including obstacles with unidentified object type; issues requiring user attention within the spatial representation; a fluid flow rate for different areas within the spatial representation; a notification that the robot has reached a particular location; cleaning history; user manual; maintenance information; and firmware information. In some embodiments, the cleaning history may include a total number of operation hours per work session or historically, total number of charging hours per charging session or historically, total coverage per work session or historically, a surface coverage map per work session, issues encountered (e.g., stuck, entanglement, etc.) per work session or historically, location of issues encountered (e.g., displayed in a map) per work session or historically, collisions encountered per work session or historically, software or structural issues recorded historically, and components replaced historically.

In some embodiments, the application of the communication device may receive an input designating an object type of an obstacle with unidentified object type; a schedule for cleaning different areas within the spatial representation; vacuuming or mopping or vacuuming and mopping for cleaning different areas within the spatial representation; a suction level for cleaning different areas within the spatial representation; a no-entry zone; a no-mopping zone; a virtual wall; a modification to the spatial representation; a fluid flow rate level for mopping different areas within the spatial representation; an order of cleaning different areas of the environment; deletion or addition of a robot paired with the application; an instruction to find the robot; an instruction to contact customer service; an instruction to update firmware; an instruction to register a warranty; an instruction to connect with customer service; a driving speed of the robot; a volume of the robot; a voice type of the robot; pet details; deletion of an obstacle within the spatial representation; an instruction for a charging station of the robot; an instruction for the charging station of the robot to empty a bin of the robot into a bin of the charging station; and an instruction for the charging station of the robot to fill a fluid reservoir of the robot. In some embodiments, the application may receive an input enacting an instruction for the robot to pause a current task; start mopping or vacuuming; dock at the charging station; start cleaning; spot clean; navigate to a particular location; and move or rotate in a particular direction. Further details of an application of a communication device that may be used with the robot are described in U.S. patent application Ser. Nos. 15/272,752, 15/949,708, 16/667,461, and 16/277,991, the entire contents of each of which are hereby incorporated by reference.

In embodiments, the robot may implement any of the methods and techniques (e.g., mapping, localization, coverage, path planning, an application of a communication device paired with the robot, and anything related to the operation of the robot) described in U.S. patent application Ser. No. 16/920,328, the entire contents of which are hereby incorporated by reference. In embodiments, the robot may include any of the components (e.g., hardware, mopping mechanism, charging station, etc.) described in U.S. patent application Ser. No. 16/920,328, the entire contents of which are hereby incorporated by reference. In some embodiments, the methods and techniques described herein and in U.S. patent application Ser. No. 16/920,328, the entire contents of which is hereby incorporated by reference, may be used for virtual reality and augmented reality applications. Other methods and techniques (e.g., mapping, localization, path planning, zone division, application of a communication device, virtual reality, augmented reality, etc.) that may be used are described in U.S. patent application Ser. Nos. 16/127,038, 16/129,757, 16/389,797, 16/427,317, 16/509,099, 16/832,180, 16/832,221, 16/179,855, and 16/850,269, the entire contents of which are hereby incorporated by reference.

Other examples of types of robots that may implement the methods and techniques described herein include a signal boosting robotic device, as described in U.S. patent application Ser. No. 16/243,524, an autonomous versatile mobile robotic chassis, as described in U.S. patent application Ser. Nos. 16/230,805, 16/578,549, and 16/411,771, a robotic towing device, as described in U.S. patent application Ser. No. 16/244,833, an autonomous refuse container, as described in U.S. patent application Ser. No. 16/129,757, a robotic hospital bed, as described in U.S. patent application Ser. No. 16/399,368, and a commercial robot, as described in U.S. patent application Ser. Nos. 14/997,801 and 16/726,471, the entire contents of which are hereby incorporated by reference. Further, the techniques and methods described in these different robotic devices may be used by the robot described herein. In some embodiments, at least a portion of processing operations of the robot are offloaded from the robot to the cloud.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network. It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A method for coverage by a robot, comprising:
   detecting, with a plurality of sensors of the robot, an object in a line of sight of at least one of the plurality of sensors;
   adjusting, with a processor of the robot, a current path of the robot to include a detour path around the object, wherein:
      the current path comprises at least one segment parallel to a wall;
      each of the at least one segment parallel to the wall is positioned a predetermined distance from the wall;
      each of the at least one segment parallel to the wall is positioned such that areas covered by the robot when driving along two adjacent segments parallel to the wall partially overlap;
   instructing, with the processor of the robot, the robot to resume along the current path after avoiding the object;
   discarding, with the processor of the robot, at least some data collected by sensors of the robot in overlapping areas covered;
   inferring, with the processor of the robot, previously visited areas and unvisited areas;
   generating, with the processor of the robot, a planar representation of a workspace of the robot by stitching data collected by at least some sensors of the robot at overlapping points; and
   presenting, with an application of a communication device, at least the planar representation and coverage statistics.

2. The method of claim 1, wherein:
   the processor uses data from at least one primary sensor type to perform operations; and
   the processor uses data from other sensor types to perform operations when the at least one primary sensor type is occluded, obstructed, or malfunctioning.

3. The method of claim 1, further comprising:
   capturing, with a camera of the robot, a plurality of images of the workspace;
   inferring, with the processor of the robot, distances to objects in the workspace based on at least some pixels of the plurality of images captured;
   determining, with the processor of the robot, an angle of a surface in the plurality of images captured based on at least some of the inferred distances; and
   adjusting, with the processor of the robot, a heading angle of the robot relative to the angle of the surface.

4. The method of claim 1, wherein the planar representation is based on at least inferred distances to objects within the workspace.

5. The method of claim 1, further comprising:
   marking, with the processor of the robot, a location of detected objects within the planar representation; and
   determining, with the processor of the robot, a path of the robot based on the location of the detected objects.

6. The method of claim 1, further comprising:
   detecting, with a floor sensor of the robot, a cliff within the workspace;
   marking, with the processor of the robot, a location of detected cliffs within the planar representation; and
   determining, with the processor of the robot, a path of the robot based on the location of the detected cliffs.

7. The method of claim 1, wherein the robot comprises at least a camera and a depth sensor.

8. The method of claim 1, wherein the robot patrols at least one area of the workspace or drives from a first point to a second point.

9. The method of claim 1, wherein the at least one segment of the current path is the longest possible segment that is parallel to a wall within the workspace.

10. The method of claim 1, wherein at least a portion of processing operations are offloaded from the robot to the cloud.

11. The method of claim 1, wherein the robot is configured to at least one of: execute a collaborative task with at least one other robot and instruct at least one other robot to begin performing a task.

12. The method of claim 1, wherein the robot is wirelessly connected with an application of a communication device.

13. The method of claim 1, wherein the application is configured to:
   display at least on of: the planar or a spatial representation of the workspace as its being built and after completion; a movement path of the robot; a current position of the robot; a current position of a charging station of the robot; robot status; a current quantity of total area cleaned; a total area cleaned after completion of a task; a battery level; a current cleaning duration; an estimated total cleaning duration required to complete a task; an estimated total battery power required to complete a task, a time of completion of a task; obstacles within the planar representation including object type of the object and percent confidence of the object type; objects within the planar representation including objects with unidentified object type; issues requiring user attention within the planar representation; a fluid flow rate for different areas within the planar representation; a notification that the robot has reached a particular location; cleaning history; user manual; maintenance information; and firmware information;
   receive an input designating at least one of: an object type of an object with unidentified object type; a schedule for cleaning different areas within the planar representation; vacuuming or mopping or vacuuming and mopping for cleaning different areas within the planar representation; a suction level for cleaning different areas within the planar representation; a no-entry zone; a no-mopping zone; a virtual wall; a modification to the planar representation; a fluid flow rate level for mopping different areas within the planar representation; an order of cleaning different areas of the workspace; deletion or addition of a robot paired with the application; an instruction to find the robot; an instruction to contact customer service; an instruction to update firmware; a driving speed of the robot; a volume of the robot; a voice type of the robot; pet details; deletion of an object within the planar representation; an instruction for a charging station of the robot; an instruction for the charging station of the robot to empty a bin of the robot into a bin of the charging station; and an instruction for the charging station of the robot to fill a fluid reservoir of the robot; and
   receive an input enacting an instruction for the robot to at least one of: pause a current task; start mopping or vacuuming; dock at the charging station; start cleaning; spot clean; navigate to a particular location; and move or rotate in a particular direction.

14. The method of claim 1, further comprising:
   determining, with the processor of the robot, a location, a height, a width, and a depth of the object.

15. The method of claim 1, further comprising:
  determining, with the processor of the robot, an object type of a detected obstacle, wherein the object type includes at least one of cables, cords, wires, toys, jewelry, garments, socks, shoes, shoelaces, feces, liquids, keys, food items, remote controls, plastic bags, purses, backpacks, earphones, cell phones, tablets, laptops, chargers, animals, fridges, televisions, chairs, tables, light fixtures, lamps, fan fixtures, cutlery, dishware, dishwashers, microwaves, coffee makers, smoke alarms, plants, books, washing machines, dryers, watches, blood pressure monitors, blood glucose monitors, first aid items, and Wi-Fi routers; and
  storing, with the processor of the robot, an object type of an object identified by a user using the application in an object types dictionary for future recognition.

16. The method of claim 1, wherein:
  the planar representation comprises two or more rooms of the workspace; and
  the method further comprises:
    detecting, with the processor of the robot, a current room;
    dividing, with the processor of the robot, the planar representation into rooms and hallways, wherein the rooms and hallways are categorized based on any of: an arrangement of areas within the workspace, visual features recognized, an opening in the planar representation, and input received by the application.

17. The method of claim 1, wherein generating the planar representation comprises:
  minimizing, with the processor of the robot, a total time or total distance required to complete the planar representation of the workspace.

18. The method of claim 1, further comprising:
  identifying, with the processor of the robot, a location of the charging station; and
  marking, with the processor of the robot, the location of the charging station in the planar representation.

19. The method of claim 1, further comprising:
  perceiving, with the processor of the robot, a displacement of the robot from a first position and orientation to a second position and orientation by:
    comparing, with the processor of the robot, a set of possible outcomes resulting from the displacement of the robot against newly collected sensor data;
    selecting, with the processor of the robot, a subset of the possible outcomes that are the most feasibly the second position and orientation based on the newly collected sensor data; and
    using the subset of the possible outcomes to generate a next set of possible outcomes for perceiving a next displacement of the robot.

20. A robot, comprising:
sensors;
a processor; and
memory storing instructions that when executed by the processor effectuates operations comprising:
  detecting, with a plurality of sensors, an object in a line of sight of at least one of the plurality of sensors;
  adjusting, with the processor, a current path of the robot to include a detour path around the object, wherein:
    the current path comprises at least one segment parallel to a wall;
    each of the at least one segment parallel to the wall is positioned a predetermined distance from the wall;
    each of the at least one segment parallel to the wall is positioned such that areas covered by the robot when driving along two adjacent segments parallel to the wall partially overlap;
  instructing, with the processor, the robot to resume along the current path after avoiding the object;
  discarding, with the processor, at least some data collected by the sensors of the robot in overlapping areas covered;
  inferring, with the processor, previously visited areas and unvisited areas;
  generating, with the processor, a planar representation of a workspace of the robot by stitching data collected by at least some sensors of the robot at overlapping points; and
  presenting, with an application of a communication device, at least the planar representation and coverage statistics.

* * * * *